US011242170B2

(12) United States Patent
Chudy et al.

(10) Patent No.: US 11,242,170 B2
(45) Date of Patent: *Feb. 8, 2022

(54) COMPARTMENTALIZED CONTAINER LOADING AND MANAGEMENT SYSTEM

(71) Applicant: CHUDY GROUP, LLC, Powers Lake, WI (US)

(72) Inventors: Duane S. Chudy, Lincolnshire, IL (US); Michael Jehn, Waukesha, WI (US)

(73) Assignee: Chudy Group, LLC, Powers Lake, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/077,481

(22) Filed: Oct. 22, 2020

(65) Prior Publication Data

US 2021/0070487 A1  Mar. 11, 2021

Related U.S. Application Data

(63) Continuation of application No. 16/514,454, filed on Jul. 17, 2019, now Pat. No. 10,829,258, which is a
(Continued)

(51) Int. Cl.
*B65B 67/02* (2006.01)
*B65B 5/10* (2006.01)
(Continued)

(52) U.S. Cl.
CPC ............... *B65B 67/02* (2013.01); *A61J 1/035* (2013.01); *A61J 7/04* (2013.01); *B65B 5/103* (2013.01);
(Continued)

(58) Field of Classification Search
CPC ......... B65B 5/003; B65B 5/103; B65B 57/00; B65B 67/02; B65B 7/2871; G09B 5/003; A61J 1/035; A61J 7/04; G09G 5/003
(Continued)

(56) References Cited

U.S. PATENT DOCUMENTS 4,685,271 A   8/1987  Ringer et al.
4,695,954 A   9/1987  Rose et al.
(Continued)

FOREIGN PATENT DOCUMENTS

CA   2609055   12/2006
CA   2628789    8/2009
(Continued)

OTHER PUBLICATIONS

"Bastian Material Handling, LLC, Indianapolis, Indiana. www.bastiansolutions.com. "Controls and Automation Interfaces" brochure. Date: Undated."
(Continued)

*Primary Examiner* — Michael Collins
(74) *Attorney, Agent, or Firm* — Myers Bigel, P.A.

(57) ABSTRACT

A compartmentalized container loading and management system for loading compartmentalized containers, such as blister cards. A single system may be utilized to hand-load many different types of blister cards having different numbers of wells arranged in different patterns. Systems of the types described herein may include a docking station, a container locator, and a controller. The docking station may include visible information locations which provide visible information proximate wells of a docked blister card to indicate the well which should be loaded. The visible information locations may be changed to match the number, arrangement and pattern of the wells. A container locator may locate the blister card with wells at known positions of
(Continued)

the docking station so that visible information may be associated with each well. A controller may control the visible information locations to provide visible information matching the pattern of the wells of each blister card.

18 Claims, 43 Drawing Sheets

Related U.S. Application Data continuation of application No. 15/796,479, filed on Oct. 27, 2017, now Pat. No. 10,358,247.

(51) Int. Cl.
| | |
|---|---|
| G09G 5/00 | (2006.01) |
| B65B 7/28 | (2006.01) |
| A61J 1/03 | (2006.01) |
| B65B 57/00 | (2006.01) |
| A61J 7/04 | (2006.01) |

(52) U.S. Cl.
CPC ............ *B65B 7/2871* (2013.01); *B65B 57/00* (2013.01); *G09G 5/003* (2013.01)

(58) Field of Classification Search
USPC .................................................. 700/231–244
See application file for complete search history.

(56) References Cited

U.S. PATENT DOCUMENTS

| | | | |
|---|---|---|---|
| 4,717,042 A | 1/1988 | McLaughlin | |
| 4,763,810 A | 8/1988 | Christiansen | |
| 4,771,912 A | 9/1988 | Van Wingerden | |
| 4,838,453 A | 6/1989 | Luckstead | |
| 5,408,443 A | 4/1995 | Weinberger | |
| 5,502,944 A | 4/1996 | Kraft et al. | |
| 5,915,589 A | 6/1999 | Lim | |
| 6,011,999 A | 1/2000 | Holmes | |
| 6,021,392 A | 2/2000 | Lester et al. | |
| 6,021,918 A | 2/2000 | Dumont et al. | |
| 6,102,855 A | 8/2000 | Kehr et al. | |
| 6,170,699 B1 | 1/2001 | Kim | |
| 6,294,999 B1 | 9/2001 | Yarin et al. | |
| 6,338,007 B1 | 1/2002 | Broadfield et al. | |
| 6,349,848 B1 | 2/2002 | Uema et al. | |
| 6,457,611 B1 | 10/2002 | Koehler | |
| 6,581,356 B2 | 6/2003 | Kim | |
| 6,658,322 B1 | 12/2003 | Frederick et al. | |
| 6,702,146 B2 | 3/2004 | Varis | |
| 6,705,487 B2 | 3/2004 | Kim | |
| 6,762,681 B1 | 7/2004 | Danielski | |
| 6,779,663 B1 | 8/2004 | Pocsi | |
| 6,925,783 B1 | 8/2005 | Pearson | |
| 6,975,922 B2 | 12/2005 | Duncan et al. | |
| 6,994,409 B2 | 2/2006 | Godlewski | |
| 7,142,944 B2 | 11/2006 | Holmes et al. | |
| 7,177,721 B2 | 2/2007 | Kirsch et al. | |
| 7,178,688 B2 | 2/2007 | Naufel et al. | |
| 7,195,156 B2 | 3/2007 | Venema et al. | |
| 7,203,571 B2 | 4/2007 | Kirsch et al. | |
| 7,228,988 B2 | 6/2007 | Inamura | |
| 7,369,919 B2 | 5/2008 | Vonk et al. | |
| 7,472,526 B2 | 1/2009 | Pearson | |
| 7,502,666 B2 | 3/2009 | Siegel et al. | |
| 7,515,981 B2 | 4/2009 | Ryznar et al. | |
| 7,516,848 B1 | 4/2009 | Shakes et al. | |
| 7,537,155 B2 | 5/2009 | Denenberg et al. | |
| 7,587,878 B2 | 9/2009 | Kim | |
| 7,657,344 B2 | 2/2010 | Holmes et al. | |
| 7,805,217 B2 | 9/2010 | Chudy et al. | |
| 7,809,470 B2 | 10/2010 | Shoenfield | |
| 7,818,950 B1 | 10/2010 | McGonagle et al. | |
| 7,848,846 B2 | 12/2010 | Uema et al. | |
| 7,856,794 B2 | 12/2010 | Zieher | |
| 7,861,495 B2 | 1/2011 | Yuyama et al. | |
| 7,886,506 B2 | 2/2011 | Knoth et al. | |
| 7,922,037 B2 | 4/2011 | Ohmura et al. | |
| 7,946,101 B1 | 5/2011 | McGonagle et al. | |
| 7,971,414 B1 | 7/2011 | McGonagle et al. | |
| 7,997,417 B2 | 8/2011 | Saether | |
| 8,200,366 B2* | 6/2012 | Ali | G06Q 10/08 |
| | | | 700/240 |
| 8,261,939 B2 | 9/2012 | Knoth | |
| 8,301,294 B1 | 10/2012 | Shakes et al. | |
| 8,380,346 B2 | 2/2013 | Chudy et al. | |
| 8,600,548 B2 | 12/2013 | Bossi et al. | |
| 8,744,620 B2 | 6/2014 | Shavelsky et al. | |
| 9,002,510 B2 | 4/2015 | Chudy et al. | |
| 9,355,222 B2 | 5/2016 | Chudy et al. | |
| 9,477,816 B2 | 10/2016 | Dent et al. | |
| 9,626,822 B2 | 4/2017 | Yuyama et al. | |
| 9,672,327 B2 | 6/2017 | Chudy et al. | |
| 10,358,247 B2* | 7/2019 | Chudy | B65B 5/103 |
| 10,427,819 B2* | 10/2019 | Chudy | B65B 5/067 |
| 10,829,258 B2* | 11/2020 | Chudy | A61J 7/04 |
| 2003/0057231 A1 | 3/2003 | Kim | |
| 2004/0134043 A1 | 7/2004 | Uema et al. | |
| 2005/0145644 A1 | 7/2005 | Mori et al. | |
| 2006/0021900 A1 | 2/2006 | Feodoroff | |
| 2006/0086638 A1 | 4/2006 | Priebe et al. | |
| 2006/0129272 A1 | 6/2006 | Kirsch et al. | |
| 2006/0184271 A1 | 8/2006 | Loveless | |
| 2007/0073560 A1 | 3/2007 | Walker et al. | |
| 2009/0014461 A1 | 1/2009 | Omura et al. | |
| 2009/0120042 A1 | 5/2009 | Zieher | |
| 2009/0152291 A1 | 6/2009 | Ohmura et al. | |
| 2009/0188937 A1 | 7/2009 | Kim | |
| 2009/0210247 A1* | 8/2009 | Chudy | B65G 1/02 |
| | | | 705/2 |
| 2009/0281657 A1 | 11/2009 | Gak et al. | |
| 2013/0126545 A1 | 5/2013 | Chudy et al. | |
| 2013/0158706 A1 | 6/2013 | Chudy et al. | |
| 2013/0218330 A1 | 8/2013 | Chudy et al. | |
| 2014/0230376 A1 | 8/2014 | Knoth | |
| 2014/0261881 A1 | 9/2014 | Chudy | |
| 2014/0261883 A1 | 9/2014 | Dent et al. | |
| 2015/0290084 A1 | 10/2015 | Kim | |
| 2017/0017775 A1 | 1/2017 | Dent et al. | |

FOREIGN PATENT DOCUMENTS

| | | |
|---|---|---|
| DE | 102006007136 | 12/2006 |
| DE | 102011086575 A1 | 5/2013 |
| EP | 1433457 | 6/2004 |
| EP | 2093722 | 5/2013 |
| JP | 2007209600 | 8/2007 |
| JP | 2007297066 | 11/2007 |
| WO | 2004088463 | 10/2004 |
| WO | 2006128443 | 12/2006 |
| WO | 2007091375 | 8/2007 |
| WO | 2014159697 | 10/2014 |
| WO | 2014198648 A1 | 12/2014 |

OTHER PUBLICATIONS

"Chudy Group, LLC, Powers Lake, WI. "The ATP-Series Automated Tablet Packaging Solutions" brochure, pp. 5 and 8. Date: Jul. 2010".
"European Search Report. EPO Application No. 09152723.4. Date: Jun. 16, 2009."
"Examination Report corresponding to Australian Application No. 2017436670 dated Jul. 10, 2020".
"Innovative Picking Technologies, Inc., Ixonia, Wisconsin, www.ipti.net. "Pick-Max 2" brochure. Date: Undated."
"International Application No. PCT/US17/58841, Search Report, dated Dec. 27, 2017."
"International Application No. PCT/US17/58841, Written Opinion, dated Dec. 27, 2017."
"Omnicell, Inc., St. Petersburg, FL. "Omnicell BlisterCard Catalog vol. 3" brochure. Date: 2016."

(56) References Cited

OTHER PUBLICATIONS

"Parata, Durham, NC. "Parata PASS Safe Loader Special Tablet System" brochure. Date: 2014."
"Photograph of medicament loading device including medicaments. Date: 2007 and earlier."
"Photograph of medicament loading device not including medicaments. Date: 2007 and earlier."
"Tosho, Tokyo, Japan. "U2 Xana-4001U2" brochure. Date: Undated."
"Warehouse Equipment, Inc., Elk Grove, Illinois. www.weinet.com. WEI Material Handling Solutions webpage. Date: Copyright 2005."
"Extended European Search Report corresponding to European Application No. 17929863.3, dated Jun. 1, 2021".
"Office Action corresponding to Canadian Application No. 3,080,049 dated May 26, 2021".

\* cited by examiner

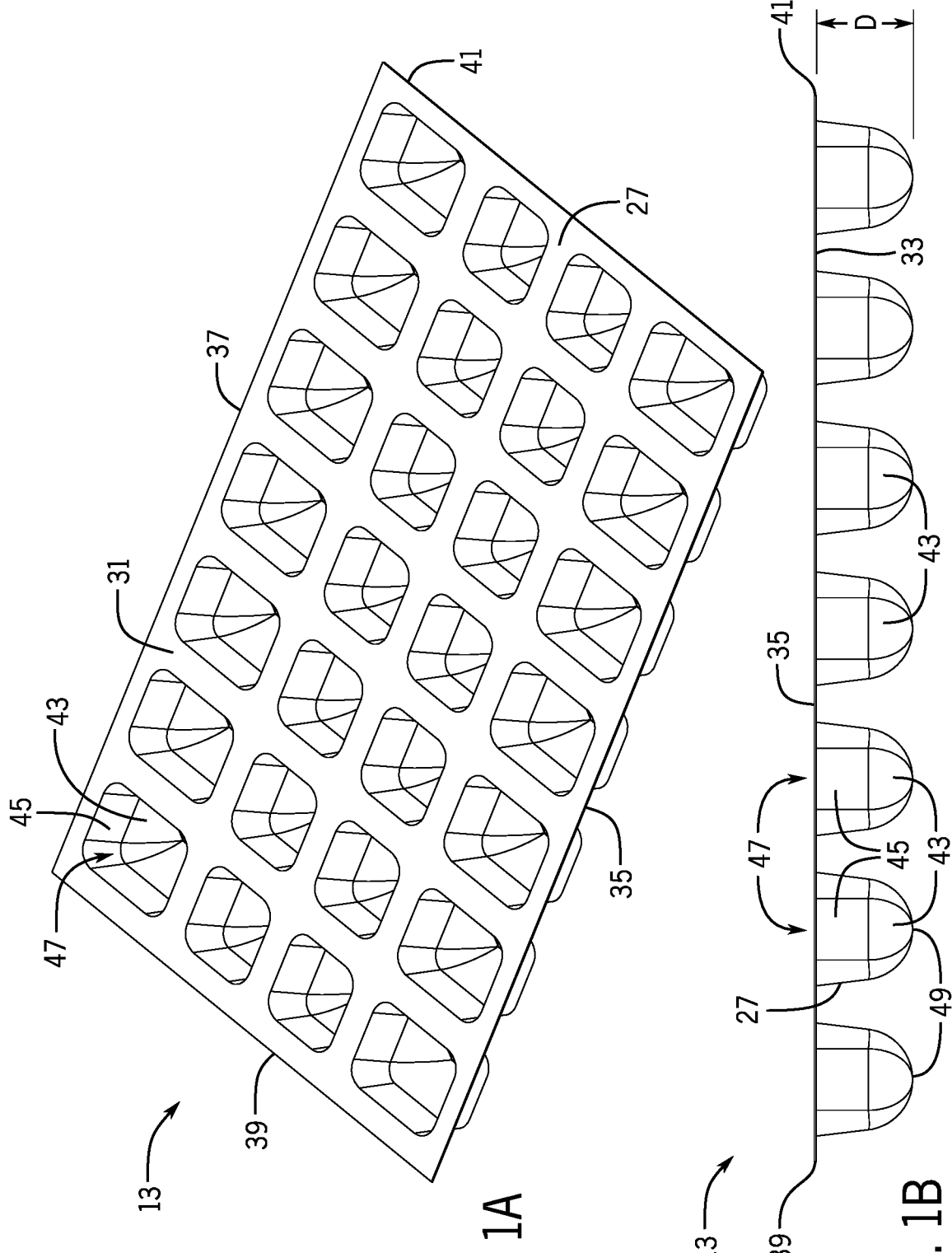

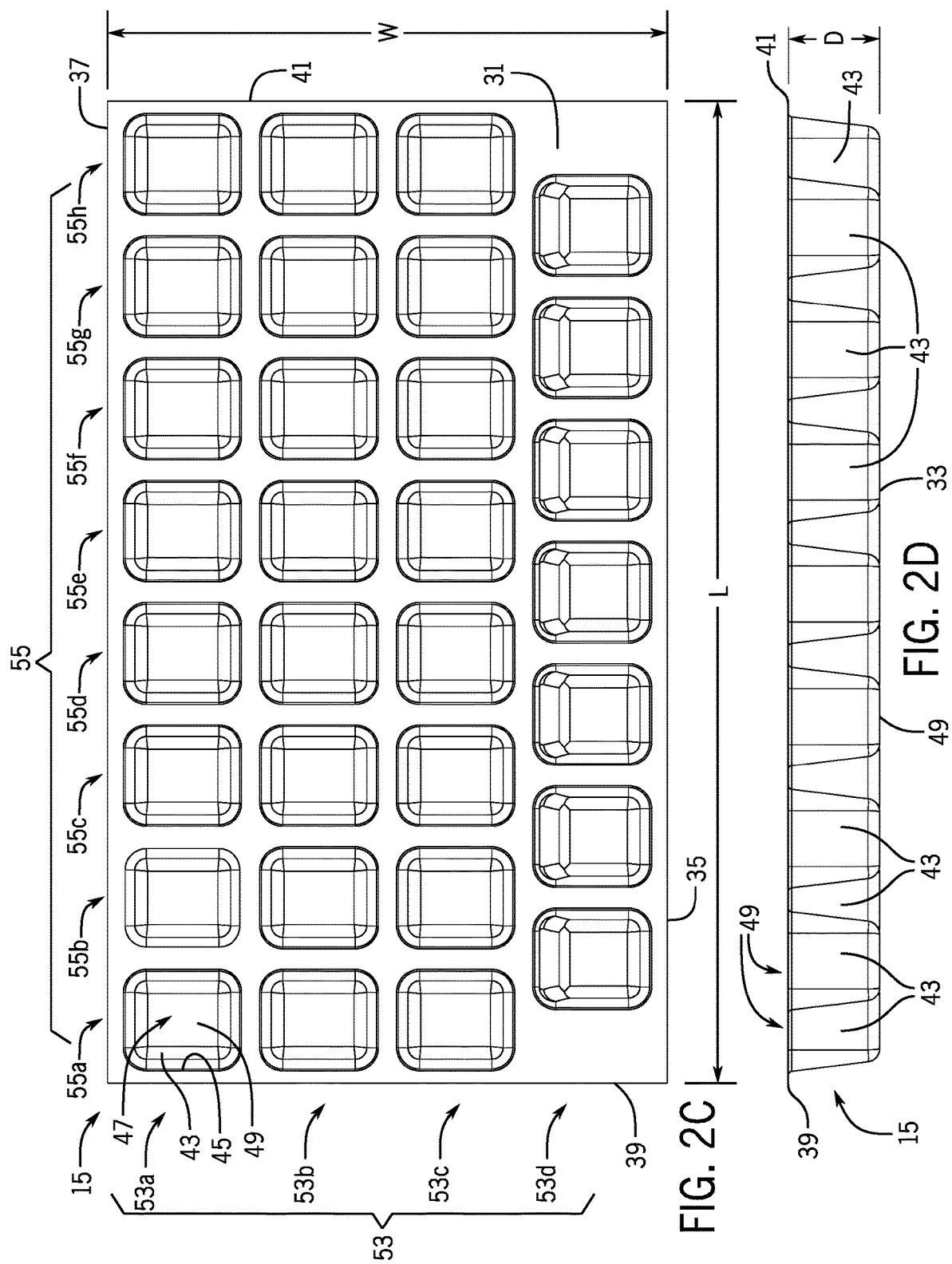

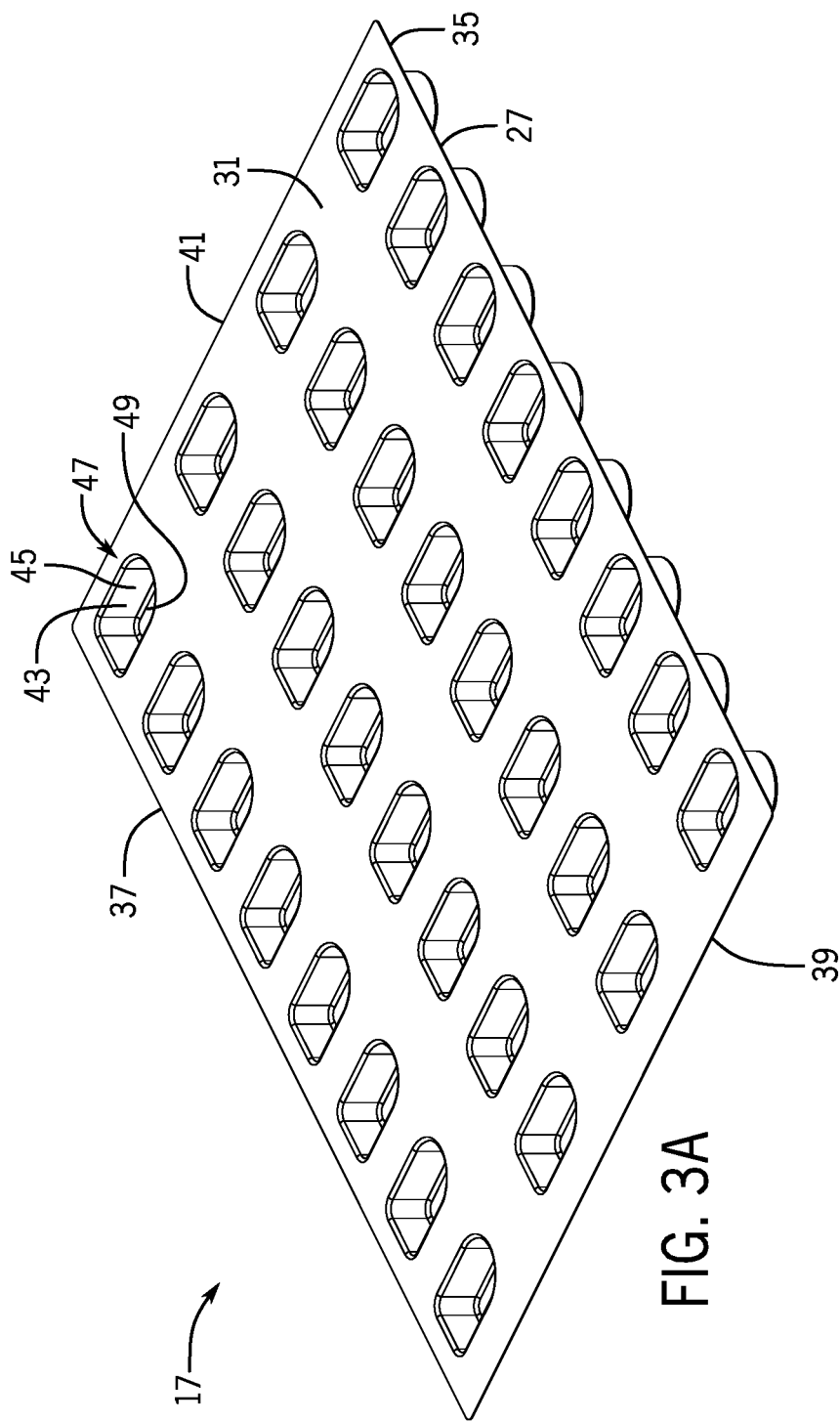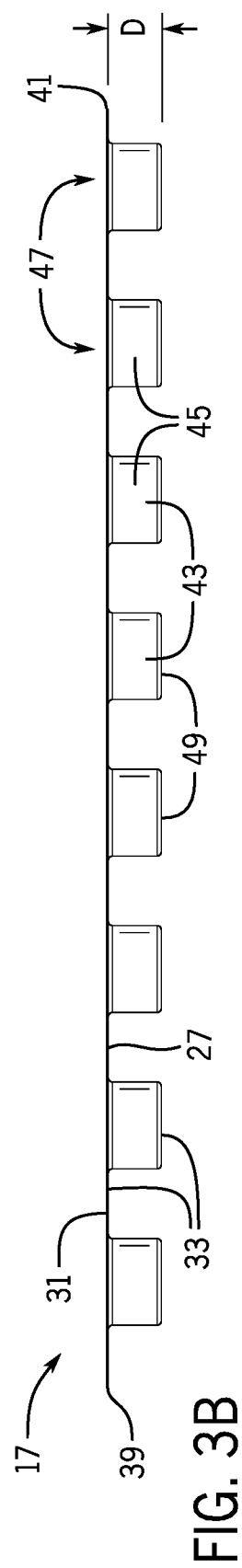
FIG. 3A
FIG. 3B

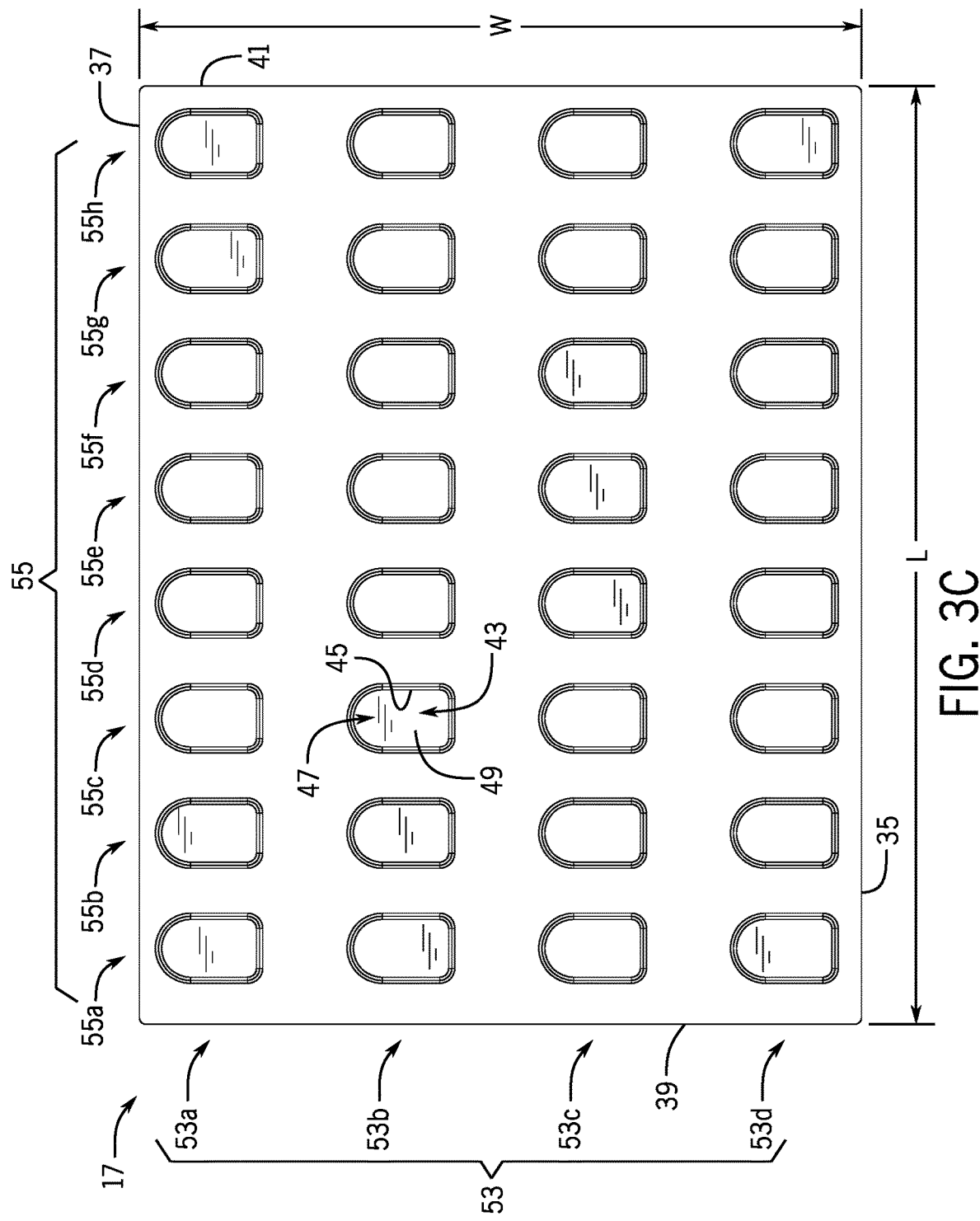

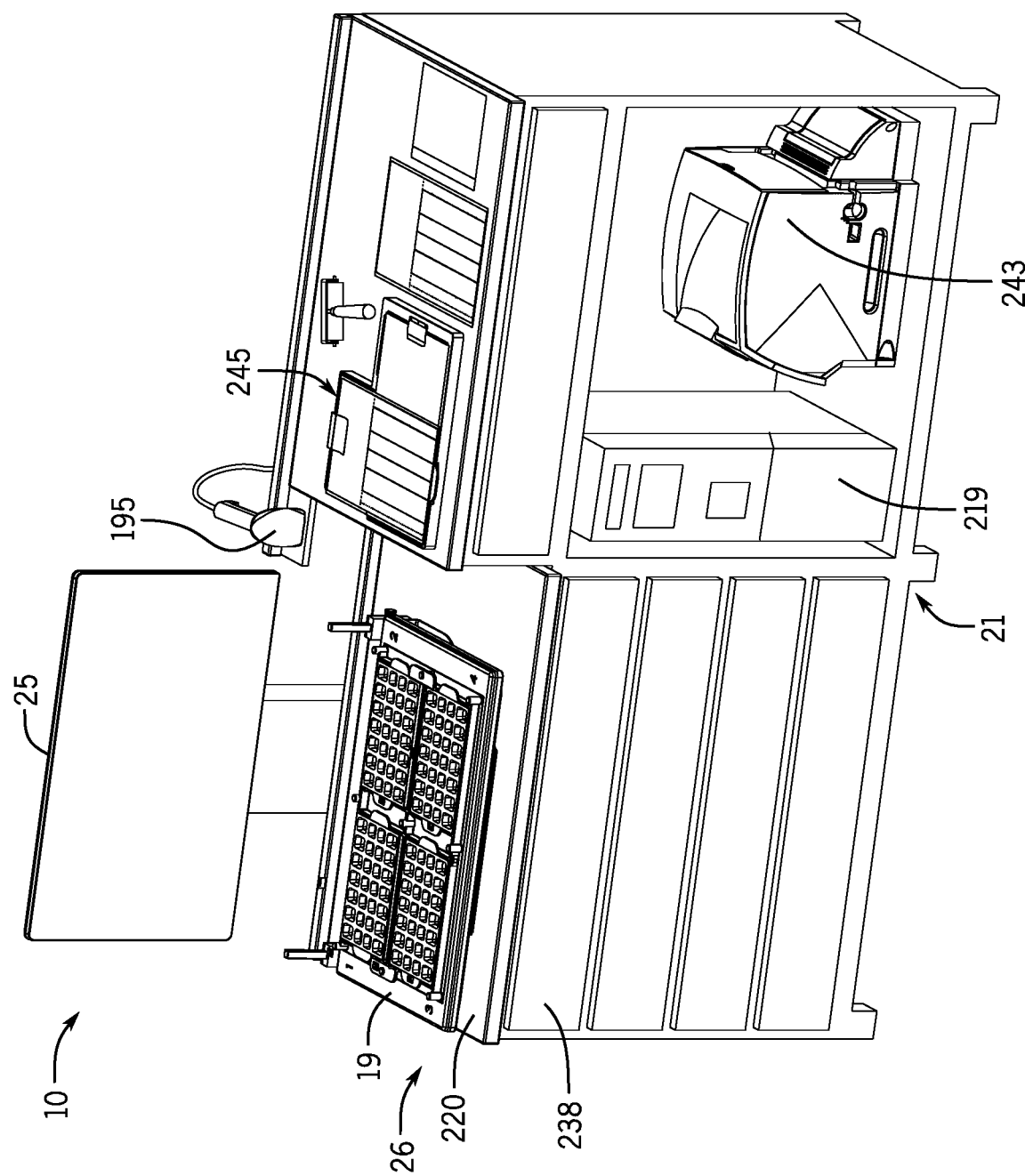

| PATIENT NAME: | DOE, JOHN | SELECTED ORDER: | 14367 | | | | | MAIN TRAY NUMBER: | 1 | SELECTED TRAY: | | | | | |
|---|---|---|---|---|---|---|---|---|---|---|---|---|---|---|---|
| PASS TIME | SUNDAY | MONDAY | TUESDAY | WEDNESDAY | THURSDAY | FRIDAY | SATURDAY | PASS TIME | SUNDAY | MONDAY | TUESDAY | WEDNESDAY | THURSDAY | FRIDAY | SATURDAY |
| BEDTIME | | | | | | | | BEDTIME | | | | | | | |
| DINNER | | | | | | 375 | | DINNER | | | | | | 379 | |
| NOON | 375 | | 375 | 375 | | | | NOON | | | | | | | 379 |
| MORNING | | | | | | | | MORNING | | | | | | | |
| PASS TIME | SUNDAY | MONDAY | TUESDAY | WEDNESDAY | THURSDAY | FRIDAY | SATURDAY | PASS TIME | SUNDAY | MONDAY | TUESDAY | WEDNESDAY | THURSDAY | FRIDAY | SATURDAY |
| BEDTIME | | | | | | | | BEDTIME | | | | | | | |
| DINNER | | | | | | 379 | | DINNER | | | | | | | |
| NOON | 375 | | | | | | | NOON | | | | | | | |
| MORNING | | | | | | | | MORNING | | | | | | | |

0 OF 7 FILLED

| PRIMARY NAME | SECONDARY NAME | STRENGTH | NDC | CUSTOMER NDC | MANUFACTURER | QTY | FILLED |
|---|---|---|---|---|---|---|---|
| MEMANTINE HCL | NAMENDA | 10 MG | 0045632106O | 0045632106O | FOREST PHARM INC | 56 | ✗ |
| GABAPENTIN | PROTONIX | 40 MG | 00008060701 | 00008060701 | ESI LEDERLE | 28 | ✗ |
| NAMENDA | NEURONTIN | 100 MG | 5976250260I | 5976250260I | GREENSTONE LLC. | 112 | ✗ |
| | | | | | | | ✗ |

DESCRIPTION: OVL/BLU/TAB (SKIP) (FILLED) (PICK LIST) (PRINT LABEL) (TRAY FILLED) (TRAY CANCEL)

USER NAME: ADMIN — FILL SCREEN — VERSION: 0.0.0.3 — 00/00/2017 00:00:00 PM

COMPARTMENTALIZED CONTAINER LOADING AND MANAGEMENT SYSTEM

FIELD

The field relates generally to compartmentalized containers, and more particularly, to systems, apparatus and methods for improved efficiency in compartment loading and management of the container and compartment contents.

BACKGROUND

Compartmentalized containers are an increasingly-used type of container used for holding items such as prescription and non-prescription medicaments, nutriceuticals, and other things, such as parts. Each compartment of a compartmentalized container may be sized and shaped as desired to hold one or more item and may, for example, be arranged in a pattern enabling the compartmentalized container to hold the items in a desired order or sequence.

For instance in the healthcare field, a pharmacy such as a retail pharmacy, a hospital pharmacy, a long-term care facility pharmacy, and/or a mail order pharmacy, may utilize compartmentalized containers for fulfillment of patient prescription orders. The pharmacy may load compartments of the compartmentalized container with medicaments in accordance with a patient prescription order and may arrange the medicaments in the sequence in which the medicaments should be taken by the patient according to the prescription order, for example at breakfast, lunch, dinner and bedtime. Once closed, the compartmentalized container may be provided to the patient as a single, convenient package.

Blister cards are a well-known type of compartmentalized container used, for example, by pharmacies for fulfillment of patient prescription orders and for providing pre-loaded unit-of-use type packages of medicaments, nutriceuticals, and potentially other items. A blister card may consist of a thin sheet of material with a plurality of cells, referred to generally as wells, provided therein. The well bottom and side walls provide a compartment for holding one or more medicament or other item. The wells may be of any desired shape and volumetric size, and may be of any number and arrangement. Each well may have an upper opening through which one or more medicament is loaded into the well. Typically, a closure, such as of paperboard, foil, or other material(s) is placed over all of the wells to close the blister card to provide a closed package. The closed blister card is then ready for delivery to the patient or other person, providing a convenient package for the medicaments or other items therein. The material used to make the blister card and wells is typically transparent, translucent, or otherwise light-transmissive, enabling a person to view the medicaments or other items within each well without removing the closure.

Certain blister cards are referred to as push-through packs. In a push-through pack, the material in which the wells are formed is collapsible by pushing with a human finger. The closure of the blister card may be breakable so that the medicament or other item within the well can be pushed through the closure and out of the blister card for use.

In the healthcare field, blister cards may be used as compliance or adherence containers to facilitate compliance and adherence with prescription instructions provided by the patient's physician. For this purpose, the blister card wells may be provided in a quantity and an arrangement or pattern to correspond with a period of days, such as the days of a week, the days of a month, or the days of multiple months. The patient can access the content(s) of each well at the appropriate date and time, increasing the likelihood that the patient will follow the physician's prescription instructions.

As an illustration, a blister card with wells arranged for days of a week may include 28 wells arranged in four rows and seven columns. Each row may correspond to the time of day at which the medicament is to be taken (e.g., breakfast, lunch, dinner, bedtime) while each of the seven columns may correspond to a separate day of the week (e.g., Sunday-Saturday). The volume of the wells may be sized to hold any quantity of medicaments. As mentioned, information applied to the closure may indicate in text or symbolic form the time and day of the week at which the medicaments are to be taken. Such a blister card may conveniently provide an entire week's prescription medicaments arranged by time and day at which the medicaments are to be taken by the patient.

By way of further example, a blister card with wells provided for a single medication dose for each day of a month may include 32 wells arranged in a pattern of four rows and eight columns. A sufficient number of wells may be filled to meet the patient's needs for the month. The medicaments may be taken in the sequence in which the wells are arranged. Wells may be skipped or unfilled for days on which a dose is not required. More than one medicament type may be provided in each well if desired and the wells may be volumetrically sized accordingly.

Similarly, blister cards for multiple months may be provided with, for example, 60 wells arranged in a pattern of ten rows and six columns or 90 wells arranged in an offset pattern of ten rows and nine columns. In other embodiments, wells of a blister card may be arranged in a ring-shaped pattern, a rectangular-shape pattern, or in any other pattern. Near limitless patterns and arrangements of wells and well sizes may be utilized depending on the needs of the pharmacy or other provider.

In fields outside of pharmacy healthcare, it may be desirable to provide a blister card with any number and arrangement of wells for packaging of items such as nutriceuticals, vitamins, mechanical parts, decorative items or other things.

A disadvantage of blister cards in the healthcare field is that blister cards cannot be used easily as compliance or adherence containers, or as packaging generally, if more than one type of medicament is required to be in the blister card. This is because of the complexity of loading potentially different medicaments into the different wells of the same blister card. As can be appreciated, a typical blister card may include many adjacent look-alike wells and great care must be taken to ensure that the proper medicament is placed in the correct well, especially if there is a required order or sequence in which the medicaments are to be taken by the patient. Consequently, blister cards utilized in the healthcare field are frequently limited to use with just a single type of medicament in each well so that the blister card can be filled by an automated packager, such as a form-fill-seal machine.

It is the practice of some pharmacies to provide compliance or adherence containers by hand-loading different types of medicaments into a single blister card. Frequently, the instructions for such hand-loading are on written instructions printed sheet of paper. The technician or pharmacist must read the instructions, obtain the needed medicament(s), and then follow the instructions to load the medicaments into the appropriate well. This process must be performed for each well and each medicament for each blister card.

From a human factors standpoint, hand-loading of a blister card with different medicament types using printed instructions is tedious and time consuming requiring many repetitive actions by the person responsible for loading the blister card. And, while quite unlikely, errors could occur because of the number of repetitive actions required and the need to take one's eyes away from the blister card to read the instructions.

Indicator-directed systems exist to increase the efficiency of hand-loading of blister cards with different types of medicaments. Examples are described in U.S. Pat. No. 9,672,327 (Chudy et al.) and U.S. Pat. No. 7,856,327 (Zieher). The pharmacist or technician follows the light(s) provided by the system and places a medicament into each well indicated by each light.

An important limitation of these types of systems, however, is that they are incapable of meeting a pharmacy's full range of needs with respect to fulfilling prescription orders. More specifically, the foregoing types of systems are limited to use with a single type of blister card. As discussed above, numerous different types of blister cards exist to meet the important need of providing a compliance or adherence container tailored to the unique prescription requirements of each patient. Existing indicator-directed systems are limited because the indicators are spaced apart from one another in a fixed position with the fixed positions in an arrangement matching the location of the well or cell which is to be loaded. If the blister card wells do not match the arrangement of the indicators, then the indicators are inoperative to instruct the user with respect to which well is to be loaded, verified, or possibly unloaded, and the blister card cannot be used with the system. This limitation effectively limits use of the existing indicator-directed systems to a single type of blister card, which is unsatisfactory for a pharmacy needing to utilize different types of blister cards to meet the varied needs of its many patient customers.

There is a need for a compartmentalized container loading system, apparatus, and methods which would improve the process of loading medicaments and other items into a compartmentalized container, which would facilitate more accurate loading of medicaments and other items into a compartmentalized container, which could be used with more than one type of compartmentalized container, and which in a pharmacy setting, would reduce the time needed to manage medicaments and other items, thereby freeing personnel for other important healthcare-related tasks and providing an opportunity to improve the quality of care which can be offered.

SUMMARY

Systems, apparatus and methods for compartmentalized container loading and management are described herein. The systems, apparatus, and methods may facilitate rapid and accurate hand-loading of compartmentalized containers as well as management and organization of items, such as medicaments, to be loaded into the containers. In a pharmacy setting, the systems, apparatus, and methods may be used, for example, to efficiently create compliance or adherence containers to improve patient compliance with a physician's prescription instructions. In settings other than in a pharmacy, the systems, apparatus, and methods may be used, for example, to efficiently perform tasks such as loading, verifying, unloading, and closing of compartmentalized containers. Therefore, systems as described herein have potential application in a variety of different fields.

In general, embodiments of a system used to load the compartmentalized containers may include a docking station, a container locator, and a controller. Other components such as a video display and user input devices, may be included. In embodiments, the docking station may provide visible information cues which prompt a user to load a medicament or other item into a designated compartment of a container docked at the docking station. The cues can be provided for compartmentalized containers having many different arrangements and patterns of compartments, thereby enabling a single system to function with many different types and styles of containers.

In embodiments, the compartmentalized containers used with the system may have a light-transmissive body and compartments which may be of a well type. Blister cards are an example of one type of compartmentalized container meeting this description and which can be utilized by the system. The blister card wells may be selected to have any required number of wells and the wells may be arranged in a plurality of different patterns.

In embodiments, the visible information cues may be provided by a video display of the docking station and the blister cards or other containers may overlie the screen of the video display for the container loading. Examples of video displays may include a light emitting diode (LED) display, an organic light emitting diode (OLED) display, a liquid crystal display (LCD) display, and a plasma display.

The video display may provide visible information locations anywhere across a screen of the display and the visible information locations may provide visible information to a user. The visible information locations of the display may be changed and may be operable across the screen in a plurality of different patterns, including the well pattern of a selected blister card when such container overlies the display. The visible information locations provide visible information in the selected pattern to provide visible information which may be viewable through the body of the blister card or other container proximate each well or other compartment. The controller may control the visible information locations of the display to match any desired pattern of wells or other compartments and to provide light, image or other visible information proximate each well to provide the visible prompt to the user with respect to the well to be loaded, verified, unloaded or otherwise acted upon. A further video display operatively connected to the controller may display information replicating the visible information provided by the docking station.

In order for the system to control the required visible information locations, the wells or other compartments must be at locations, or positions, across the video display which are known to the system. To accomplish this a container locator may be associated with the docking station and display. The locator may provide at least one container-locating position which locates the blister card wells or other container compartments at the known positions of the docking station and display.

In an embodiment, a container locator may consist of a fixture and at least one portable tray, which may be a blister card tray. The fixture may be associated with a single location of the docking station and may have at least one tray-locating position overlying the display. The tray-locating position may receive at least one portable tray with a blister card supported thereon at a single position with the wells of the blister card over known positions of the display. Each tray-locating position may be defined by a plurality of fixture walls and the blister card tray may be sized to fit within the walls in the single position. With the tray and its blister card supported at a known position over video display, the location of each well or other compartment is known to the system. Visible information can then be provided at the known positions of the wells so that the visible information may be viewable through the wells.

Fixtures used with the system may be interchangeable. For example, certain fixtures may have two tray-locating positions and other fixtures could have four tray-locating positions. One of these fixtures could be interchanged with another of these fixtures. In embodiments where a plurality of tray-locating positions are provided, the fixture enables plural blister card trays to be simultaneously located over different portions of the display. In embodiments, the fixtures may be portable so that they, and any trays thereon, can be easily carried by a user.

In embodiments, the trays may include a top side and a bottom. The top side may support a blister card and define well-receiving openings in a pattern matching the pattern of the wells and through which the wells are inserted. The bottom may be open under each opening, thereby enabling the visible information to be viewed through the opening when the tray is over the display. The trays may be interchangeable with other blister card trays sized to be received in a respective tray-locating position of a fixture.

Unique machine-readable identification elements may be used to quickly and accurately identify a particular type of blister card or other container being used with the system and to make a record. For example, a unique machine-readable identification element may be associated with each of the fixture, the at least one tray-locating position, and each tray such that an association of a particular tray with the at least one tray-locating position and fixture may be made. Once the association is made, the system can access a record which identifies the exact location of each well over the display and can operate the visible information sources proximate or associated with each such location.

Also disclosed is a sealing workstation which may be used to apply a tri-panel closure to a blister card loaded with the system. The tri-panel closure may include patient-specific information describing medicament items in the blister card and the date and time at which the medicaments are to be taken by the patient.

Other aspects of the inventions are described and illustrated herein.

BRIEF DESCRIPTION OF THE DRAWINGS

Exemplary compartmentalized container loading and container management systems may be understood by reference to the following description taken in conjunction with the accompanying drawings, in which like reference numerals identify like elements throughout the different views. The drawings are not necessarily to scale, emphasis instead being placed upon illustrating the principles of the invention. The drawings depict only embodiments of the invention and are not therefore to be considered as limiting the scope of the invention. In the accompanying drawings:

FIGS. 1A-1C illustrate a first embodiment of a compartmentalized container in the form of a blister card having 28 wells;

FIGS. 2A-2D illustrate a second embodiment of a compartmentalized container in the form of a blister card having 31 wells;

FIGS. 3A-3C illustrate a third embodiment of a compartmentalized container in the form of a blister card having 32 wells;

FIG. 5 is a perspective view of a workstation and an embodiment of a compartmentalized container loading system according to the invention;

FIGS. 26-37 are exemplary video display screen displays for selected workflow processes which may be implemented according to the invention;

DETAILED DESCRIPTION

Referring to FIGS. 1-25, there are shown embodiments of an exemplary system 10 for compartmentalized container loading. In embodiments, system 10 may also provide for verification, unloading and other tasks relating to the containers and their contents. System 10 provides information to assist human users with rapid and accurate hand-loading of items, such as medicaments 11, into compartmentalized containers, such as blister-card-type containers, three examples of which 13, 15, 17 are illustrated in FIGS. 1A-3C and described herein. The information provided by system 10 may also be utilized to verify the contents of each compartment, for unloading of the contents from each compartment and for other tasks.

Figure 25:
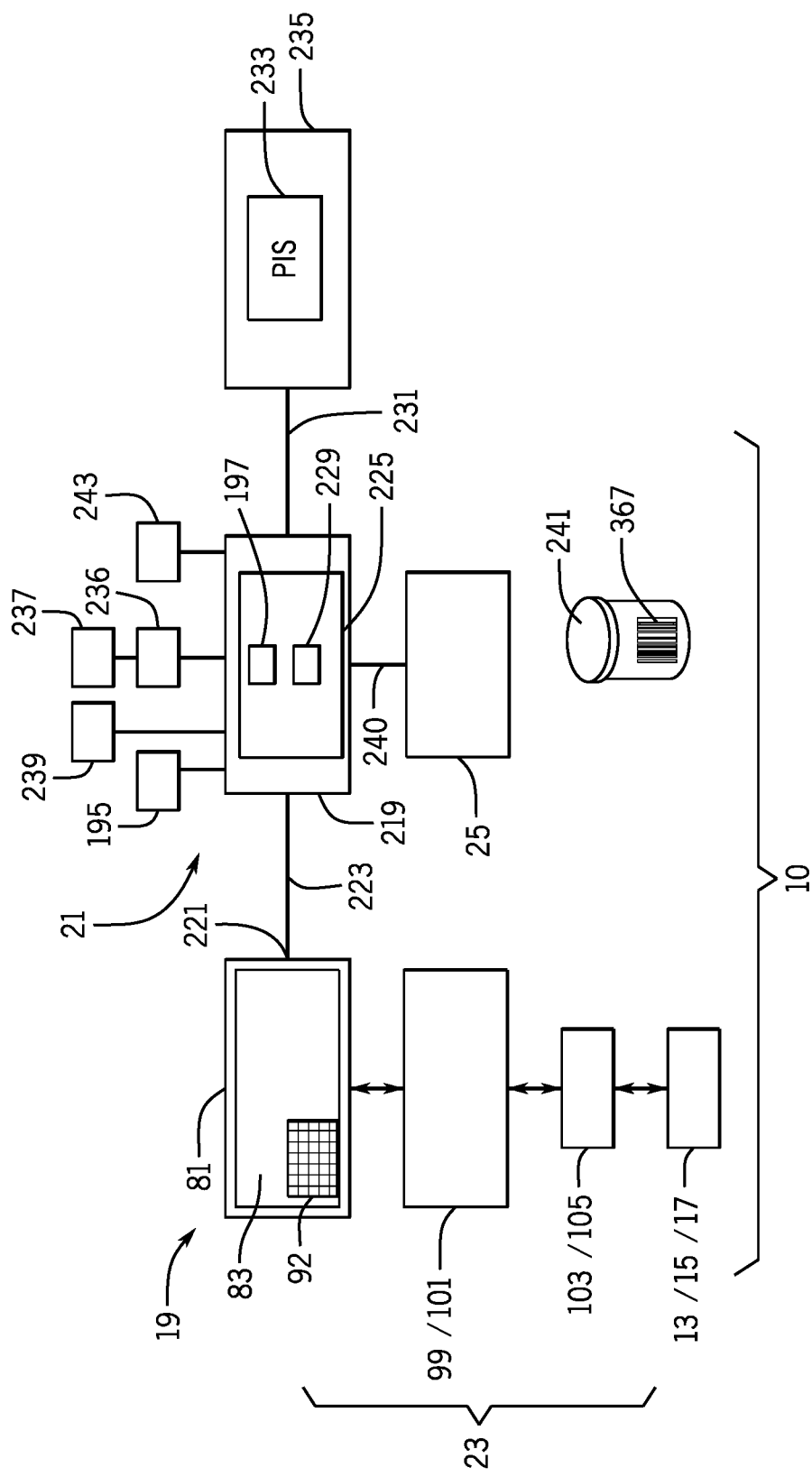
FIG. 25 is a schematic block diagram of an exemplary compartmentalized container loading system.

In general and referring to FIGS. 5 and 25, embodiments of exemplary system 10 for compartmentalized container loading may include a docking station 19, one or more controller 21, a container locator 23 and a video display 25. System 10 may further include related components of the types described herein. System 10 may be employed at a workstation 26 which may be located in a pharmacy or other healthcare setting.

System 10 may be advantageously configured such that a single system 10 provides information needed to load many different types of compartmentalized containers having different structure and different shapes and sizes, as can be understood by comparison of blister cards 13, 15, 17. And, the information provided by a single system 10 may be used to verify or unload the contents of these different types of containers. The capability of a single system 10 to function with more than one type of compartmentalized package enables a pharmacy to meet the varied prescription needs of its many patient customers through use of packaging constructed to encourage compliance with each patient's unique prescription order.

It is envisioned that embodiments of system 10 may be utilized in the healthcare industry such as by a retail pharmacy, a hospital pharmacy, a long-term care facility pharmacy, and/or a mail-order pharmacy. In such pharmacy settings, system 10 would be effective to improve prescription order fulfillment, to improve packaging and to provide medicaments 11 more generally. For simplicity and brevity, reference number 11 is used to refer to medicaments generally including medicaments 11a, 11b, 11c and 11d illustrated in the drawings.

However, it should be understood that embodiments of system 10 may have application in fields outside of the healthcare industry for loading, verifying, unloading or performing other tasks in connection with packaging of items other than medicaments 11 into a compartmentalized container. For example, system 10 according to the invention may be utilized to load nutriceuticals, parts, or other things into a compartmentalized container (e.g., a blister card 13, 15, 17) and to verify, unload and/or perform other tasks with respect to the container and its contents.

System 10 makes the tedious, labor-intensive, and time-consuming process of loading, verifying and/or unloading compartmentalized containers such as blister cards 13, 15, 17 easier and faster, particularly if different types of medicaments 11 must be loaded into separate wells 43 of the same blister card 13, 15, 17. Exemplary system 10 therefore, provides an opportunity for better patient care because there is an improved confidence level that the correct medicament 11 is being provided to the patient in accordance with the physician's instructions and because time saved in packaging medicaments 11 can be allocated to other aspects of patient care provided by the pharmacy, hospital, long-term care facility and/or other caregiver.

Referring first to FIGS. 1A-3C, these figures illustrate examples of different types of compartmentalized containers in the form of blister cards 13, 15, 17. Each blister card 13, 15, 17 illustrated in FIGS. 1A-3C has a different structure, shape and size as is apparent from comparison of the blister cards 13, 15, 17. Each of the blister cards 13, 15, 17 may be loaded, verified and unloaded with a single system 10. It is to be understood that blister cards 13, 15, 17 are merely examples and that many different types of blister cards and compartmentalized containers exist and can be used with a single system 10.

Blister cards 13, 15, 17 are of a type which may be utilized by a retail pharmacy, a hospital pharmacy, a long-term care facility pharmacy, and/or a mail-order pharmacy to fulfill prescription orders for patients or other customers. As illustrated, blister cards 13, 15, 17 are portable compartmentalized containers for managing and organizing medicaments 11. In the examples, blister cards 13, 15, 17 may be delivered to a patient as a closed and hermetically-sealed container including medicaments 11 as required to fulfill the patient's prescription order. The organization of blister cards 13, 15 and 17 may be provided so as to encourage compliance with the prescription order as prescribed by the patient's physician.

The structure of exemplary blister cards 13, 15, 17 will now be described in conjunction with FIGS. 1A-3C. For simplicity and brevity, like reference numbers of like components of blister cards 13, 15, 17 are used throughout the drawings. Each exemplary blister card 13, 15, 17 may include a body 27, a top and a bottom 31, 33, a front and a rear side 35, 37 and a left and a right side 39, 41. In the examples of rectangular body 27 styles of blister cards 13, 15, 17, front and rear sides 35, 37 define a length dimension "L" therebetween and left and right sides 39, 41 define a width dimension "W" therebetween. Each blister card 13, 15, 17 body 27 may further include cells or compartments referred to herein as wells 43. Body 27 and wells 43 may be a unitary structure, for example, being of a plastic material. For simplicity and to avoid obscuring of the drawings, only selected wells are indicated by reference number 43, it being understood that reference number 43 is indicative of each exemplary well and that wells 43 may be provided in different quantities and with different shapes, sizes, and spacings between wells 43. As used herein, the terms cell(s), compartment(s), and well(s) may be used interchangeably.

Referring further to the exemplary blister packages 13, 15, 17, each well 43 may be defined by a wall 45. Each wall 45 may define a well 43 upper opening 47, or inlet, and a well bottom 49. A depth dimension "D" of body 27 may be defined between the body bottom 33 and body top 31. As shown in the examples, the well 43 openings 47 extend through, and are included in and along, the top 31 of body 27. In the embodiments, medicaments 11 may be hand-loaded into each well 43 through opening 47.

A closure 51 may be affixed to top 31 of body 27 to cover well openings 47 and provide an integrated and sealed blister card 13, 15, 17. Closure 51 may be of a thin paperboard, foil, or other material(s) capable of closing openings 47. Closure 51 may be joined to body 27 by any suitable means including adhesive(s), sonic bonding (i.e., plastic welding), and heat sealing. In embodiments, closure 51 may be of a unique tri-panel folio type as described below in connection with FIGS. 38-41. An exemplary sealing station and steps for closing blister packages 13, 15, 17 with a tri-panel folio closure also are described in connection with FIGS. 38-41. Once closure 51 is applied, blister card 13, 15, 17 provides a hermetically-sealed unit protecting medicaments 11 and/or other items therein from contact with the outside environment and providing a convenient package with which to deliver the contents of the blister card 13, 15, 17 to the patient or other end user.

Body 27 may, for example, be made of material capable of having cells 43 formed therein by processes such as thermoforming or cold-forming. In embodiments, a preferred material for body 27 may be polyvinyl chloride (PVC) sheet. The PVC sheet may be between about 0.008 and about 0.012 inches in thickness, as an example. PVC sheet is inexpensive and can be thermoformed to form wells 43. The material selected for body 27 may be selected so that wells 43 are collapsible by pushing with a human finger.

Closure 51 may be breakable so that a medicament 11 within well 43 can be pushed through closure 51 and out of blister card 13, 15, 17 (i.e., a push-through pack) for use. In other embodiments, body 27 may be of a relatively thicker plastic sheet material which does not collapse, thus forming a rigid tray-like structure. In such an alternative embodiment, closure 51 may be of a "peel-off" type to permit access to medicaments 11 or other items within wells 43. Instructions and other information may be provided on closure 51 or associated with closure 51, as will be described in more detail below.

Body 27 and wells 43 may be transparent, translucent, or otherwise light-transmissive. Such light-transmissivity may permit the content(s) of each well 43 to be seen visually through each well 43 bottom 49 and/or well 43 side 45 without removing closure 51 from blister card 13, 15, 17. And, in such embodiments, any light provided beneath, proximate, adjacent to, or associated with, a well 43 or body 27 proximate to a well 43 may be seen through the material comprising body 27 and/or well 43 side 45, and/or well bottom 49. In other embodiments, body 27, or parts of body 27 could be translucent or opaque as required, for example for ultra-violet light protection of medicaments 11 therein.

While the blister packages 13, 15, 17 of the examples share many of the same parts and features, they may also differ in important ways. For example, blister packages 13, 15, 17 may differ with respect to body 27 width W and length L dimensions and with respect to the number, shape and size of the wells 43, potentially resulting in differences of body 27 depth dimension D. Importantly and as a result of the foregoing types of differences, blister packages 13, 15, 17 may differ significantly with respect to spacing between cells 43 in the width W and length L dimensions.

Figure 1C:
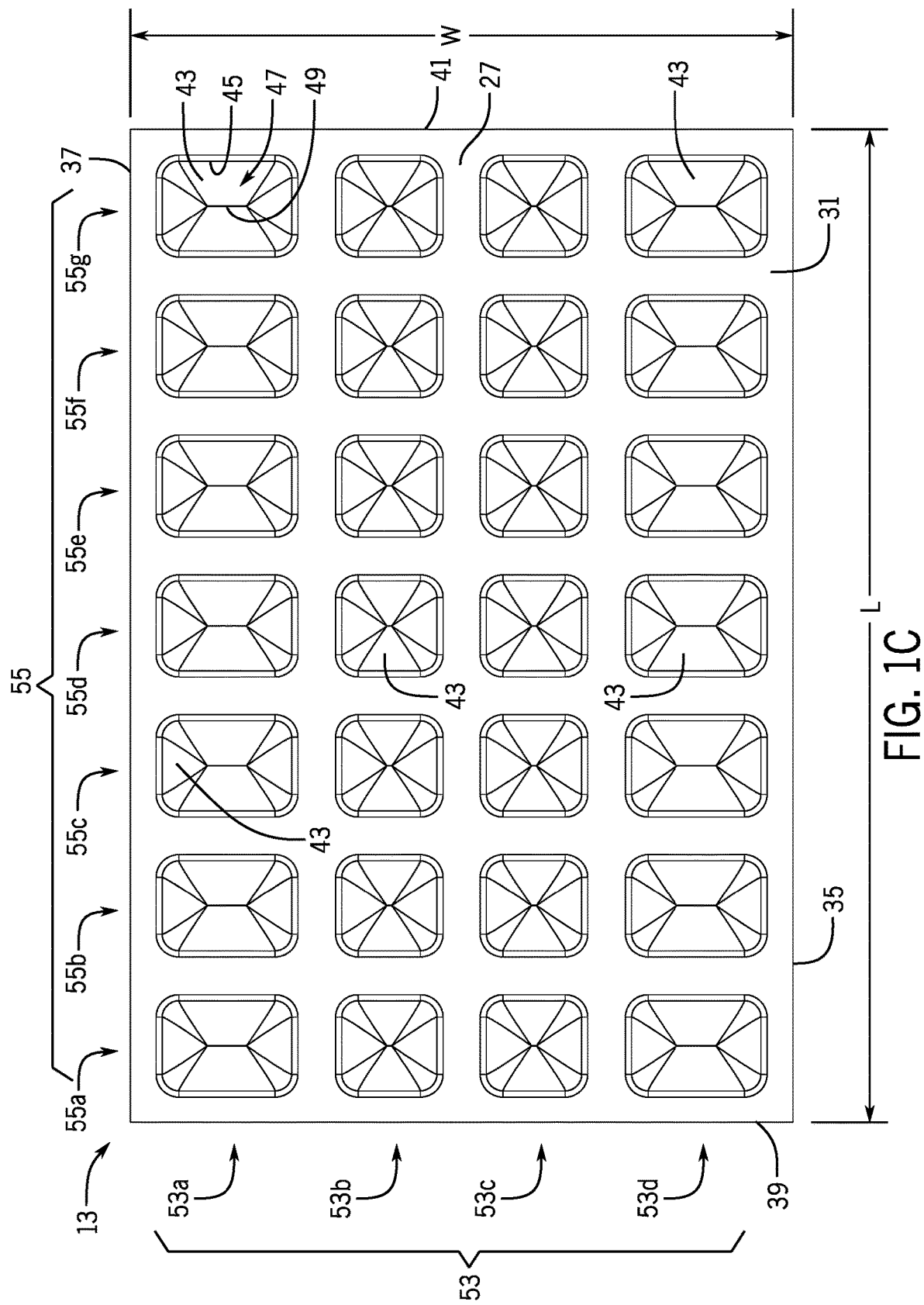
Figure 2A:
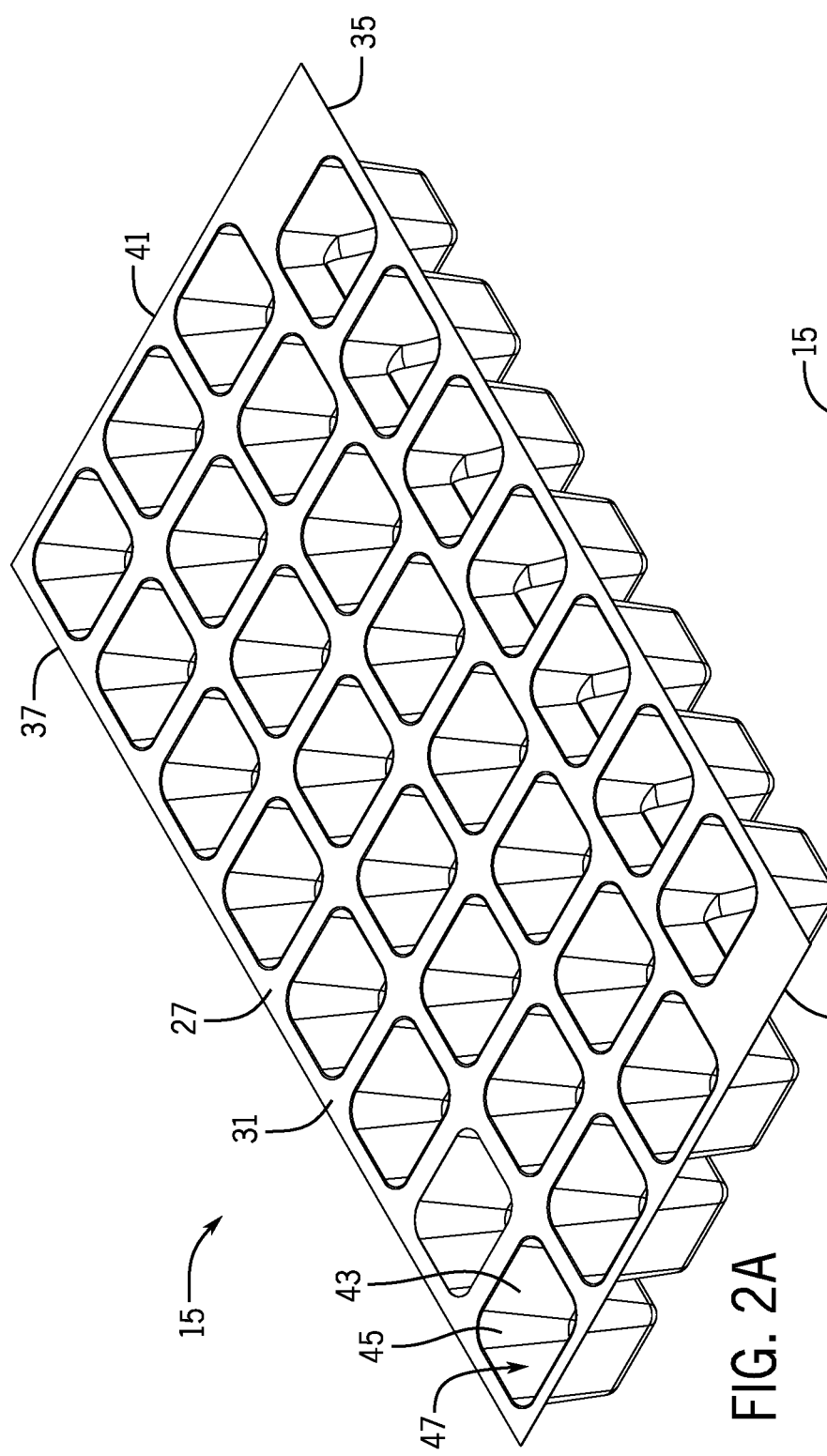
Figure 2B:
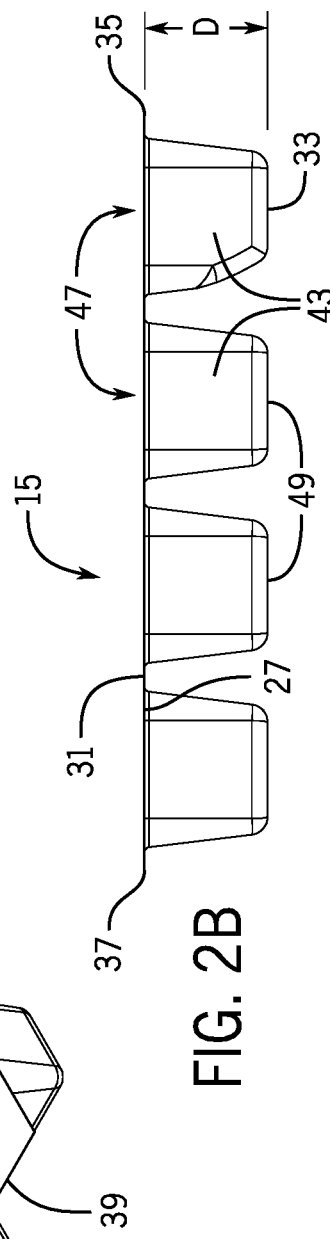

The foregoing important differences can be understood through a closer review of the non-limiting examples of blister packages 13, 15, 17. Referring first to FIGS. 1A-1C, blister card 13 illustrated therein may be of a weekly compliance package type intended to encourage the patient to take medicaments 11 at times of day such as breakfast, lunch, dinner and bedtime. To accomplish this adherence objective, blister card 13 has 28 wells 43 arranged in a pattern of rows 53 and columns 55 with four rows 53a-53d and seven columns 55a-55g in this example. Each row 53a-53d may correspond to the time of day the medicaments are to be taken (e.g., breakfast row 53a, lunch row 53b, dinner row 53c and bedtime row 53d) and each column 55a-55g may correspond to the day of the week on which the medicaments 11 are to be taken (e.g., Sunday column 55a through Saturday column 55g). One or more medicament 11 may be provided in each well 43 as prescribed by the physician. The patient merely opens each well 43 in sequential order at the appropriate time and day of the week to take the medicaments 11 in each well.

The wells 43 distributed along a single blister card body 27 may have identical structure or different structure as illustrated for example in FIGS. 1A and 1C. According to the example of blister card 13, wells 43 of rows 53a and 53d may be volumetrically larger than wells 43 of interior rows 53b and 53c resulting from wells 43 in rows 53a, 53d having relatively larger width dimensions W. The larger well 43 sizes of rows 53a and 53d may be provided in recognition that a greater number of medicaments 11 are frequently taken at breakfast and bedtime.

Referring next to FIGS. 2A-2D, the blister card 15 illustrated therein may be provided with 31 wells to hold a one-month course of medicaments 11, with each well 43 corresponding to a day of the month. Each well 43 may contain one or more medicament 11 to be taken on the respective day. If a month has fewer than 31 days, then the unneeded well 43 may be unfilled with any medicament 11.

Blister card 15 illustrated in FIGS. 2A-D has the 31 wells 43 arranged in a pattern of four rows 53a-53d with three rows 53a-53c having eight columns 55a-55h and one row 53d having seven columns 55. The patient merely opens each well 43 in sequential order on the appropriate day of the week to take the medicaments 11 in each well 43. It is apparent from a comparison of blister cards 13 and 15 that the number, arrangement and pattern of the 28 wells 43 (e.g., different spacing between wells 43 and different spacing between wells 43 and the sides 35-41 in both the width W and length L dimensions) of blister card 13 are quite different from the arrangement and pattern of the 31 wells 43 of blister card 15.

Unlike blister card 13, each well 43 of blister card 15 has an identical shape and a volumetrically identical size, as can be appreciated from a visual inspection. It is not required that each well 43 have the same shape and size. Wells 43 have a generally rectangular shape in a plane defined by top 31 of blister card body 27.

Referring next to FIGS. 3A-3C, the blister card 17 illustrated therein may be used for any purpose, including as a compliance or adherence container. Blister card 17 has 32 wells 43 arranged in a pattern of rows 53 and columns with four rows 53a-53d and eight columns 55a-55h. One or more medicament 11 may be provided in each well 43 as prescribed by the physician. The patient may open each well 43 as needed to take the medicaments 11 in the selected well 43.

The example of blister card 17 differs in structure from blister cards 13 and 15. In the example of blister card 17, the 32 wells 43 have a D-shape in a plane defined by top 31 of blister card body 27. Also in the example of blister card 17, the wells 43 of each row 53a-53d are spaced equidistantly and the wells 43 of each column 55a-55h are spaced equidistantly. As a result of this consistent and even spacing of rows 53 and columns 55, wells 43 are generally evenly distributed across body 27 of blister card 17. Overall, the arrangement and pattern of the 32 wells 43 of blister card 17 is quite different from the arrangement and pattern of wells 43 of blister cards 13 and 15.

Figure 4A:
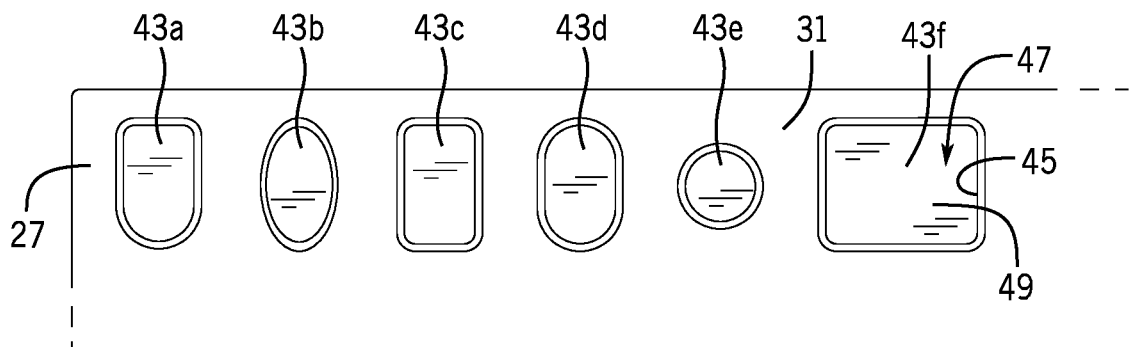
FIGS. 4A-4C illustrate examples of types of blister card wells that may be used with the system.
Figure 4B:
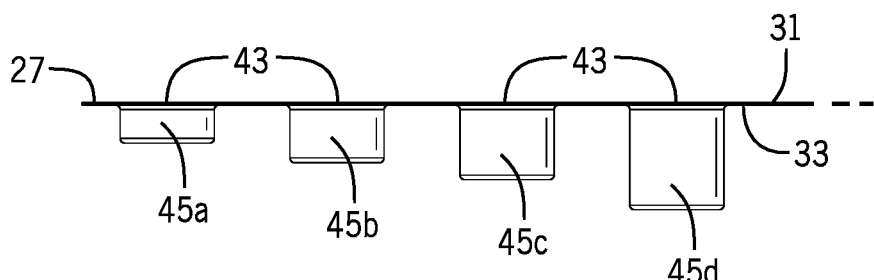
Figure 4C:
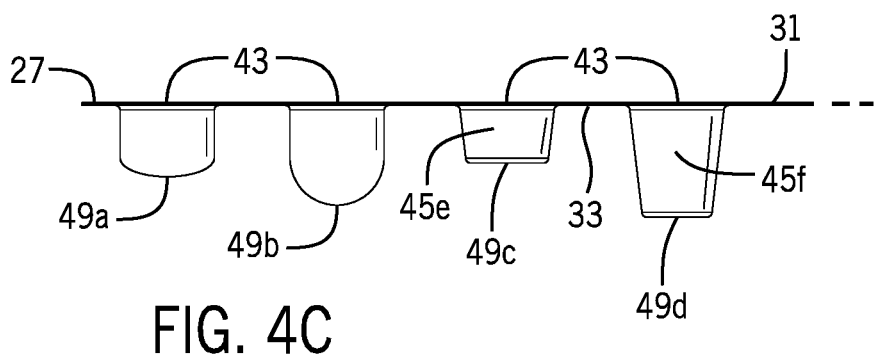
Figure 6:
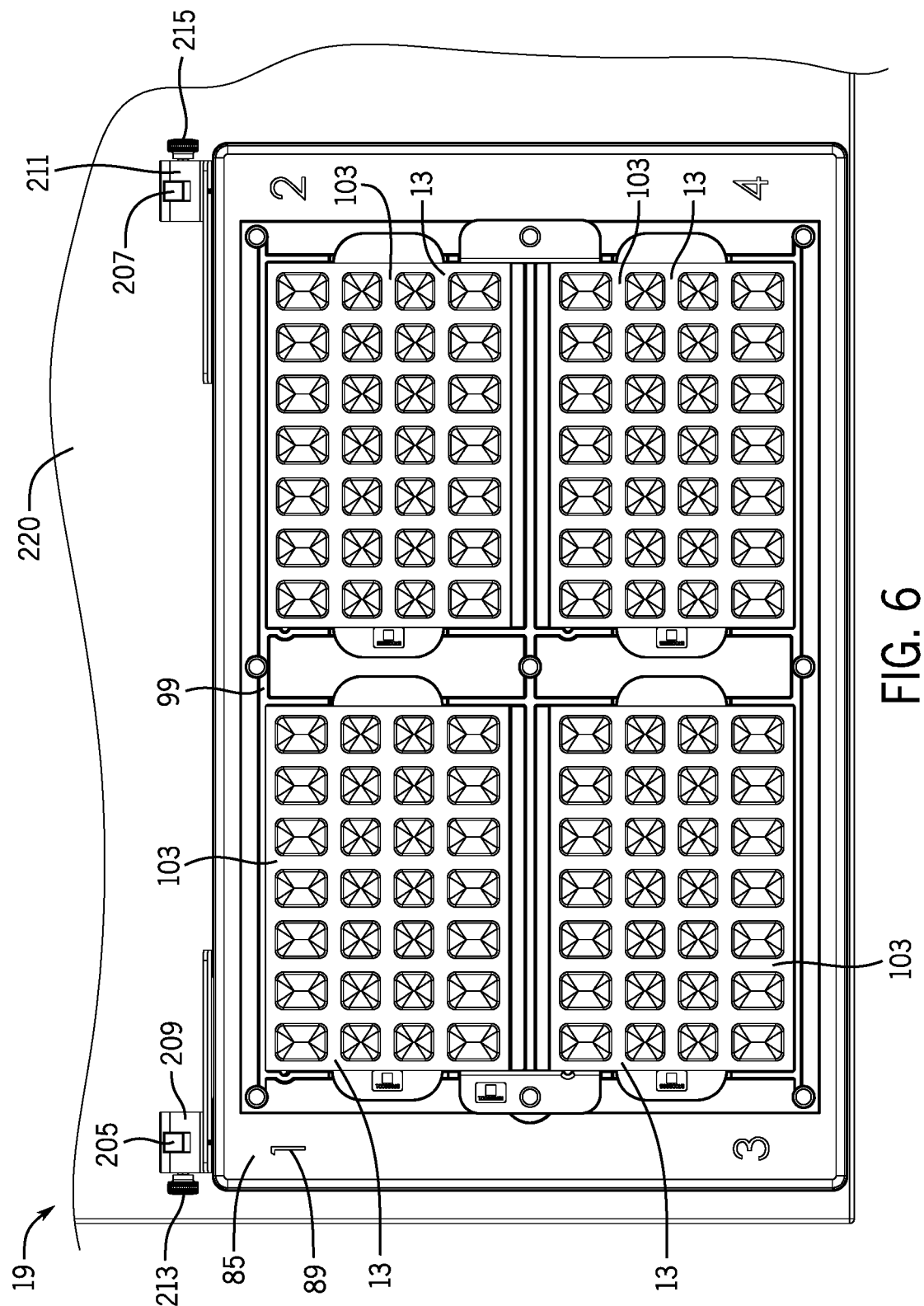
FIG. 6 is a plan view of the docking station of FIG. 5.
Figure 7:
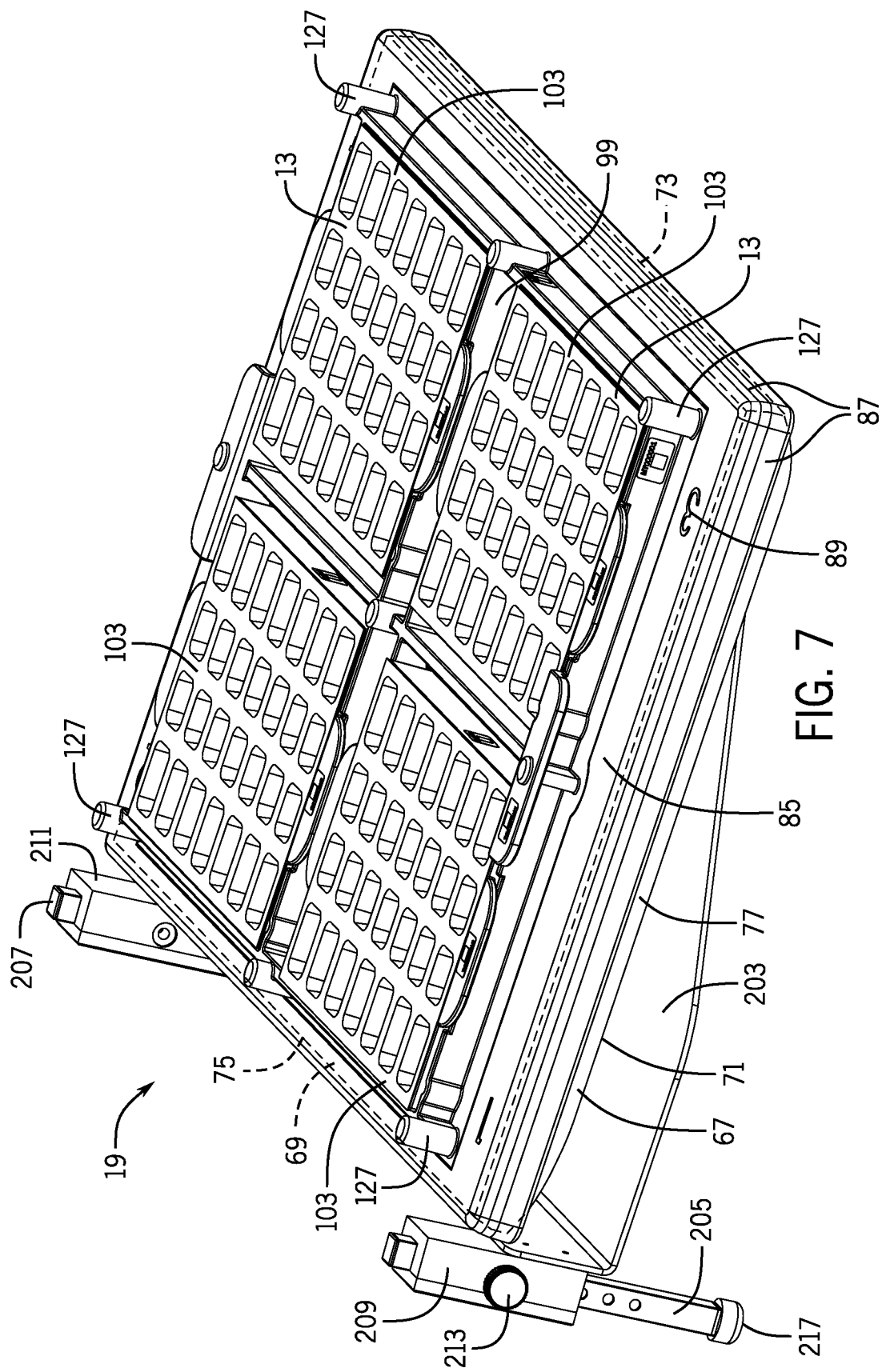
FIG. 7 is a perspective view of the docking station of the compartmentalized container loading system of FIG. 5 including an exemplary 4-position fixture, four blister card trays, and four blister cards.
Figure 8:
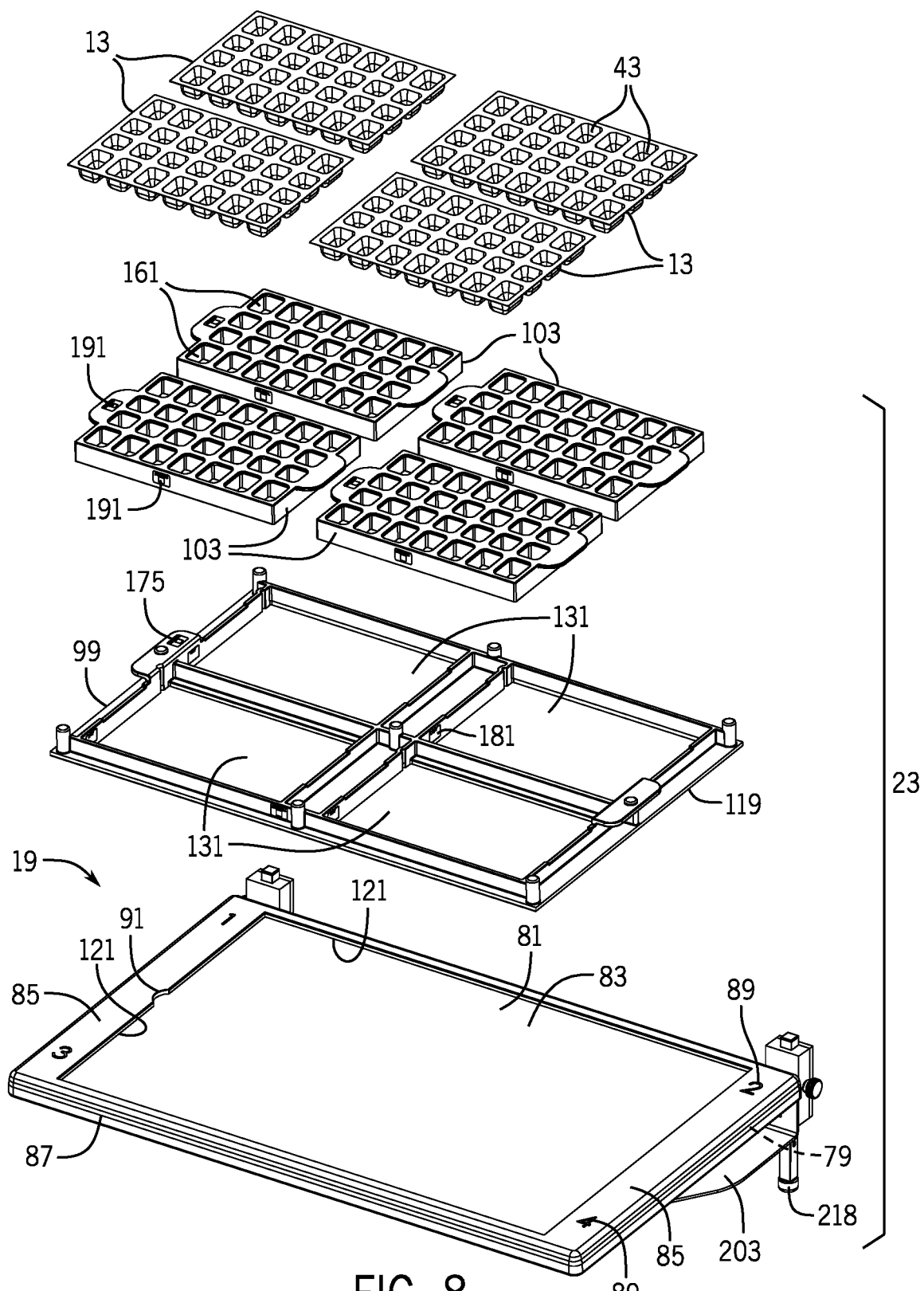
FIG. 8 is a partially exploded view of the docking station of FIG. 6 showing exemplary relationships of a video display, fixture, blister card trays and blister cards.

FIGS. 4A-4C illustrate a wide variety of blister card wells 43 that can be loaded, verified and/or unloaded by means of a single system 10. FIG. 4A illustrates a variety of well 43 shapes in a plane defined by top 31 of blister card body 27. The shapes may include D-shaped wells 43a, oval and circular-shaped wells 43b, 43d, 43e and rectangular wells 43c, 43f. FIGS. 4B and 4C illustrate a variety of different well wall 45 configurations including small 45a, intermediate 45b, 45c and large 45d well walls and wells with rounded bottoms 49a, 49b or wells with flat bottoms 49c, 49d and frusto-conical walls 45e, 45f. Spacing between wells 43 of the types illustrated in FIGS. 4A-4C in the width W and length L dimensions on body 27 may be varied as desired. Near limitless arrangements of well-type compartments are possible and can be utilized with a single system 10.

It is apparent then from the examples of FIGS. 1A-4C that each of blister cards 13, 15, 17 has a different number of wells 43 and that the wells have different shapes and sizes. The wells 43 of each blister card 13, 15, 17 are arranged in a different pattern with different spacing of the wells 43 in the width W, length L and depth D dimensions. It is further apparent that the wells 43 of the three exemplary blister cards 13, 15, 17 are not in vertical alignment with one another if the blister cards 13, 15, 17 were to be stacked one on top of the other.

To fulfill a full range of potential prescription orders, it may be necessary for a pharmacy to utilize all three of blister cards 13, 15, 17, as well as blister cards or other types of compartmentalized packages with arrangements and patterns of wells or other compartments wholly different from those of blister cards 13, 15, 17. Instructions unique to each type of blister card 13, 15, 17, or other compartmentalized container, would be necessary in order for pharmacy personnel to hand-load all of these different blister cards. System 10 provides a means to overcome the complexity caused by the diversity of compartmentalized containers which are available or potentially available.

Turning now to FIGS. 5-25, embodiments of a system 10 capable of providing visible information in positions which may be changed to enable use of system 10 with many different types of blister cards 13, 15, 17 and other compartmentalized containers will next be described. According to the examples, visible information locations 63 on the display are operable in a plurality of different arrangements and patterns to provide visible information 65 which can be seen by a human user proximate a well 43 of interest. The visible information 65 may be used for hand-loading of a well 43, for verification of the content(s) of a well 43, for hand-unloading of the content(s) of a well 43 or for another desired purpose. System 10 illustrated in FIGS. 5-25 facilitates accurate and rapid loading, verification, unloading, record keeping and other actions in connection with different types of compartmentalized containers of which blister packages 13, 15, 17 are examples.

Advantageously, system 10 may be capable of being configured so that the positions of the visible information locations 63 on the docking station 19 may be changed so that the visible information 65 provided by the visible information locations 63 will match the number and the unique and different arrangement and pattern of the wells 43 of the particular blister card 13, 15, 17 docked at docking station 19. In other words, visible information locations 63 may be operable in more than one arrangement and pattern. The ability to change the location of the visible information locations 63 enables system 10 to position the visible information 65 proximate each well 43 of interest, so that the visible information 65 is associated with the required well 43, irrespective of the different structure of the blister card 13, 15, 17 being processed with system 10.

As a result of being able to change the positions of the visible information locations 63, a single system 10 may operate with many different types of blister cards 13, 15, 17 or compartmentalized containers. It would not be possible for a single system 10 to accommodate more than one type of blister package 13, 15, 17 or compartmentalized container if the locations of the visible information locations 63 were fixed. In healthcare settings, such as at a retail pharmacy, a hospital pharmacy, a long-term care facility pharmacy, or a mail-order pharmacy, this capability of system 10 to meet the entirety of a pharmacy's need for loading of different blister cards 13, 15, 17 or compartmentalized containers provides a meaningful opportunity to reduce healthcare costs and to improve the quality of patient care.

System 10 of the examples may be thought of as a type of configurable pick-to-light/place-to-light system. Visible information 65 configurable to match the number and the arrangement and pattern of the wells 43 instructs a user of system 10 with respect to which well 43 to load, verify, unload, or perform some other task, freeing the user from any necessity to use written instructions.

Turning then to FIGS. 5-14 and 17-21B, an exemplary docking station 19 which may be used with system 10 will now be described. In the examples, docking station 19 provides the visible information locations 63 and the visible information 65. Docking station 19 provides a place at which a blister card 13, 15, 17 may be temporarily located for loading. In the embodiments, no electrical connection is provided or required between a blister card 13, 15, 17 and the docking station 19. However, the location of each blister card 13, 15, 17 well 43 at docking station 19 must be known to controller 21 in order for docking station 19 to provide visible information 65 proximate to, or associated with, the well 43 to be loaded, verified, unloaded, or otherwise acted on.

Docking station 19 may include a housing 67 defined by top and bottom sides 69, 71, front and rear sides 73, 75 and left and right sides 77, 79. Top side 69 may be planar, but is not required to be planar. Top side 69 may have a generally rectangular appearance having an area defined by length L and width W dimensions in the plane defined by top side 69.

In embodiments, docking station 19 may comprise a display device 81 and housing 67 may enclose the components of display device 81. Display device 81 may be of a type which displays video and/or other graphic information (i.e., visible information 65) visible by a human user. A display device 81 of the types exemplified herein may be referred to as a "video display." For docking station 19 to accommodate different types of blister packages 13, 15, 17 or other types of compartmentalized containers, display device 81 should be of a type that may change the positions of the visible information locations 63 provided by display device 81 so as to match the number and the arrangement and pattern of wells 43 or other compartments. A video display is a type of display device 81 capable of outputting video and/or graphics information in different arrangements and patterns so as to position the visible information 65 proximate that is, associated with, the wells 43 of blister cards 13, 15, 17 having different structure and spacing from each other and from sides 35-41 of blister card body 27.

The video and/or graphics information output by display device 81 may be generated by controller 21 through, for example, a video card (not shown) of controller 21 to which display device 81 may be connected via an appropriate cable or wireless communication link 223 (FIG. 25). Display device 81 may include a screen 83 which outputs information visible to a user. Screen 83 may be a flat screen. A transparent cover may overlie or be integrated with screen 83 to protect screen 83 from damage. In the examples, visible information 65 provided by screen 83 of display device 81 may be seen through well 43 sides 45 and bottom 49 of a blister card 13, 15, 17 overlying screen 83 to indicate to the user which well 43 is to be loaded, verified, unloaded, or otherwise acted upon. Non-limiting examples of display devices 81 which may be implemented may include flat-panel displays such as a liquid crystal display (LCD), a light emitting diode display (LED), an organic light emitting diode display (OLED) or a plasma display.

By way of a non-limiting example, display device 81 may be a 27-inch diagonal thin film transistor color LCD monitor. Display device 81 may have dimensions of 25.52 inches (L)×15.23 inches (W)×2.48 inches (D). Screen 83 may have a display area of 20.92 inches (L)×11.77 inches (W) and a display resolution of 1920×1080. A non-limiting example of a suitable display device 81 is a model ZBVM-27 Series LCD Monitor available from TRU-Vu Monitors, Inc. of Arlington Heights, Ill.

While display device 81 may typically be a flat-panel video display such as those described above, it should be understood that other types of display devices may be utilized. Therefore, as used herein, the term "video display" means or refers to computer-controlled monitors and flat-panel display devices 81 of the types described above and, more generally, to devices for the visual presentation of data which include an array of visible light sources in which each light source of the array is addressable such that the locations of the visible information 63 provided by the light sources can be changed to match the number, arrangement and pattern of the wells 43 of, for example, different types of blister packages 13, 15, 17 or other types of compartmentalized containers. This capability of display device 81 of the present invention to change the visible information locations 63 as required to match the arrangement and pattern of the wells 43 differs from and is unlike devices in which the positions of the lights are static and unchangeable and therefore restrict or limit the types of blister cards 13, 15, 17 and compartmentalized containers that can be used to ones that have well 43 or compartment arrangements and patterns matching the static positions of the lights. An example of such a suitable alternative video display could include a purpose-built or custom LED array.

Display device 81 may be considered to be a type of output device because visible information 65 may be displayed to a human user by screen 83. In certain embodiments, screen 83 of display device 81 may be a touchscreen and therefore display device 81 may comprise an input and output device.

Referring to FIGS. 5-13B and 17-21B, bezel 85 may removably overlie display device 81 top side 69 surrounding screen 83. If provided, bezel 85 may comprise part of container locator 23 structure to locate wells 43 of blister cards 13, 15, 17 at known positions over screen 83 as described herein. Bezel 85 may have a downwardly-oriented sidewall 87 around some or all of the bezel 85 periphery which provides an interference fit with some, or all, of front, rear, left and right sides 73-79 sufficient to keep bezel 85 in a repeatable single position atop display device 81. Bezel 85 may include position indicators 89, which are illustrated as Arabic numerals 1, 2, 3, 4 in the example, representative of four different positions for loading of blister cards (e.g., blister cards 13, 15, 17) as described herein. A locating notch 91 illustrated as a partial circle may be provided in bezel 85 to assist with locating blister cards 13, 15, 17 at known positions also as described herein. Bezel 85 may be removable as mentioned, or may be fixed to display device 81.

Referring to FIGS. 9-13, 19-21B and 25, display device 81 may be activated by controller 21 to provide visible information locations 63 anywhere on screen 83 enabling display device 81 to provide visible information proximate each well 43 or other compartment of many different types of blister cards 13, 15, 17 or other compartmentalized containers. No fixed positions of visible information locations 63 on screen 83 are required. The visible information locations 63 may be of a number, size, arrangement and/or spacing as needed to match wells 43 or other compartments.

Display device 81 may include a screen 83 with an array comprised of picture elements, or pixels 92 (certain pixels 92 of screen 83 are illustrated schematically in FIG. 25) arranged in width W and length L dimensions across screen 83 where each pixel 92 represents the smallest controllable element of an image or graphic represented on screen 83. Pixels 92 may be considered to be selectively operable because they may be activated and, alternatively, de-activated. Each pixel 92 may represent a number of different shades or colors, depending on how much storage space is allocated for it. Each pixel 92 may have an address which corresponds to the physical coordinates of the pixel 92 on the screen 83. As mentioned and in certain embodiments, the pixels 92 may be arranged in a display resolution of 1920×1080, but such a resolution is not required as higher or lower resolutions may be implemented. In the examples, pixels 92 output light energy communicating visible information 65. In such a display device 81, any of the pixels 92 and groups of the pixels 92 may be identified by their unique addresses and operated to provide visible information locations 63 as needed to match the arrangement and pattern of the wells 43 of a blister card 13, 15, 17 or compartments of another compartmentalized container. In embodiments, activation of the pixels 92 of screen 83 may provide the visible information 65. In other embodiments, de-activation of the pixels 92 of screen 83 may provide the visible information 65.

Figure 9:
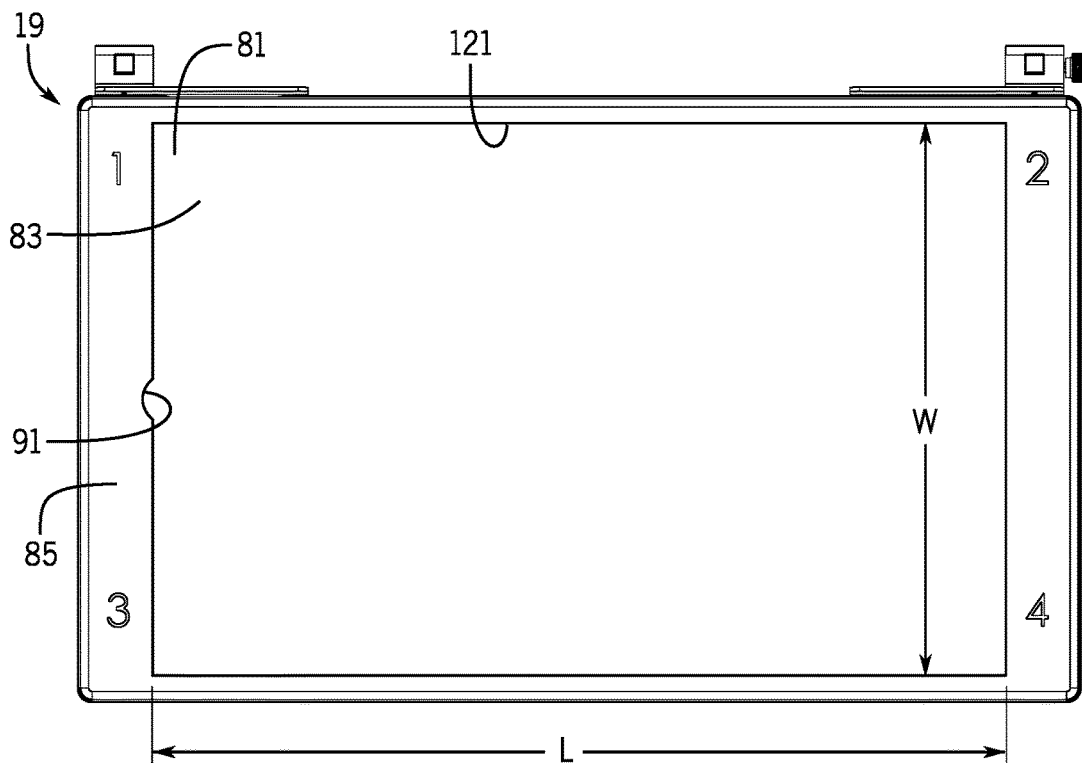
FIG. 9 is a plan view of the docking station of FIG. 6 with the fixture and trays removed and the video display in an inactive state.
Figure 10:
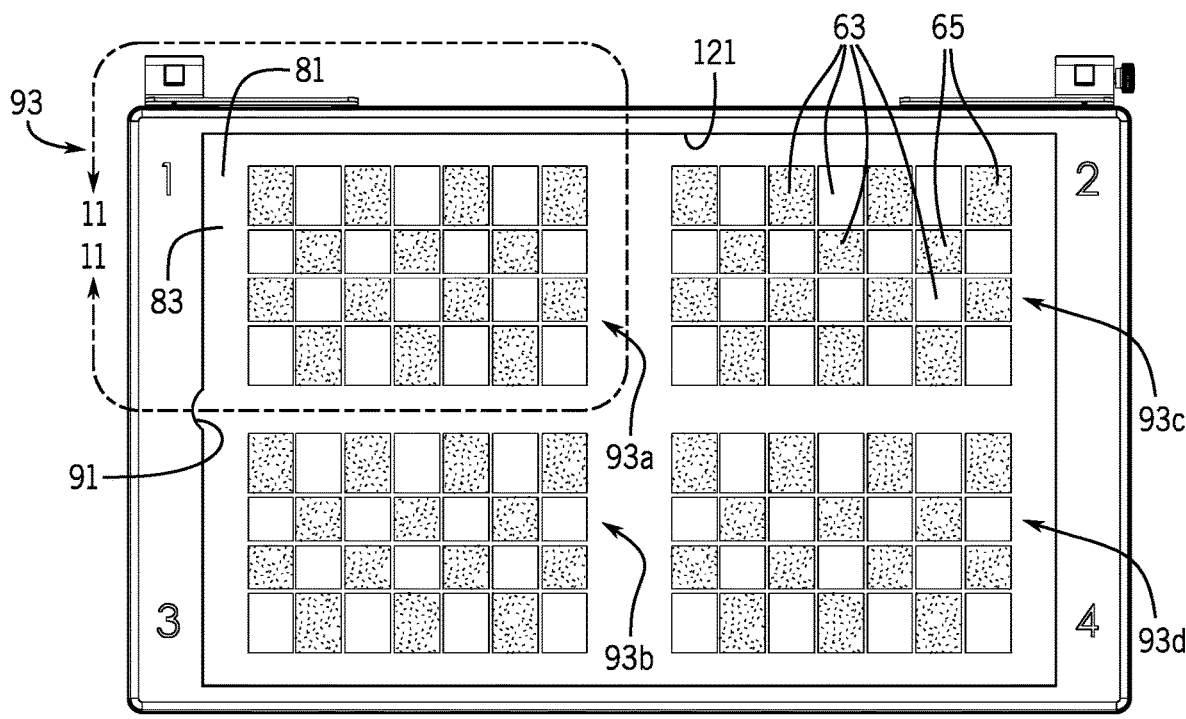
FIG. 10 is a plan view of the docking station of FIG. 9 but with the video display in an active state providing visible information from four groups of visible information locations.
Figure 11:
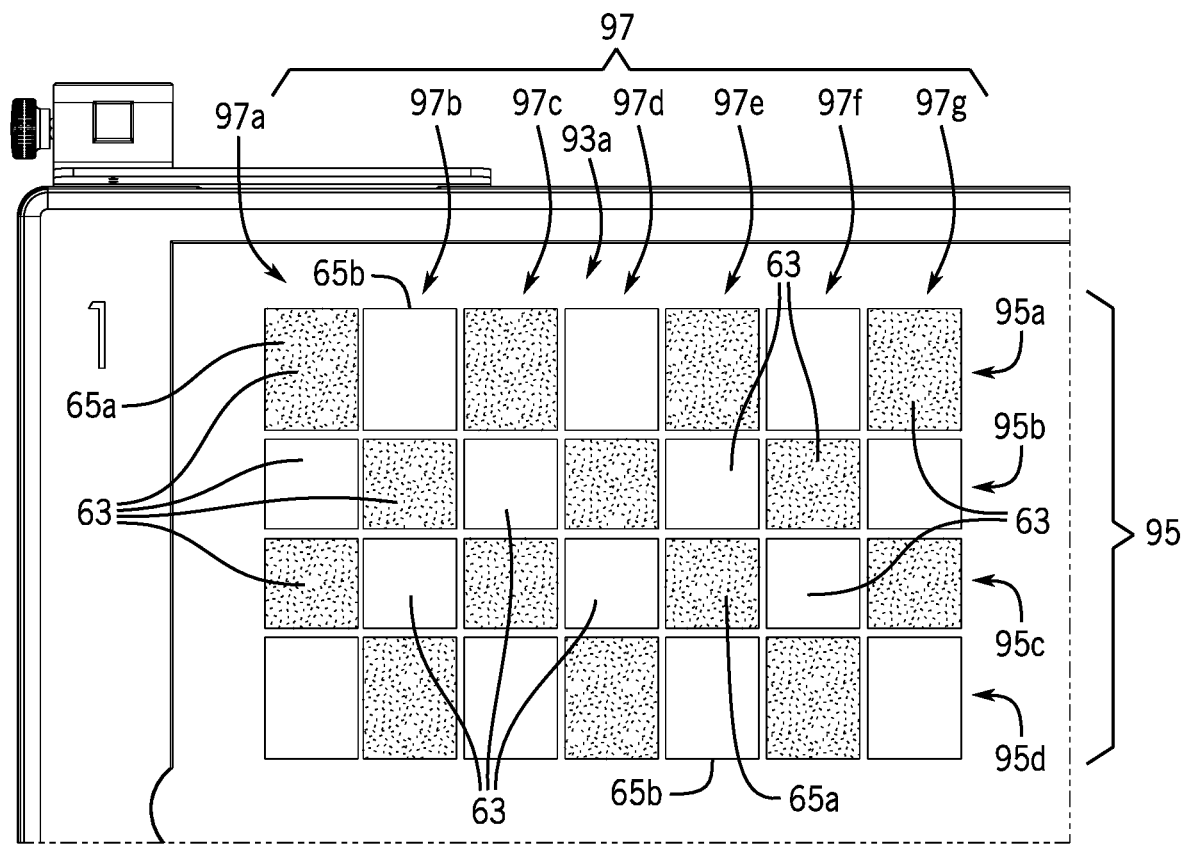
FIG. 11 is an enlarged partial plan view of the docking station taken along detail section 11-11 of FIG. 10.

FIGS. 9-13B and 19-21B illustrate examples of visible information locations 63 of display device 81 and how the visible information locations 63 may be changed to match the arrangement and patterns of wells 43 of different types of blister cards, such as blister cards 13, 15, 17. Referring first to FIG. 9, display device 81 is in an inactive state with no visible information locations 63 active on screen 83. No visible information 65 is discernable on screen 83. Pixels 92 corresponding to the needed visible information sources 63 are inactive to provide visible information 65

Referring next to FIGS. 10-13B and 19-21B, it may be seen that a single system 10 and docking station 19 enables different visible information locations 63 to be activated to provide different arrangements and patterns of the visible information 65. Referring first to FIGS. 10-13A and 19-21A, these figures illustrate display device 81 with a first arrangement and pattern of visible information locations 63 (28 and 32 visible information locations 63 respectively) and output of visible information 65 from those visible information locations 63. In use, such a first arrangement and pattern of visible information 65 may be used to direct a user to hand load a first type of medicament 11*a* into the indicated subset of wells 43 of a single blister package 13 or 17 in these examples.

Figure 12:
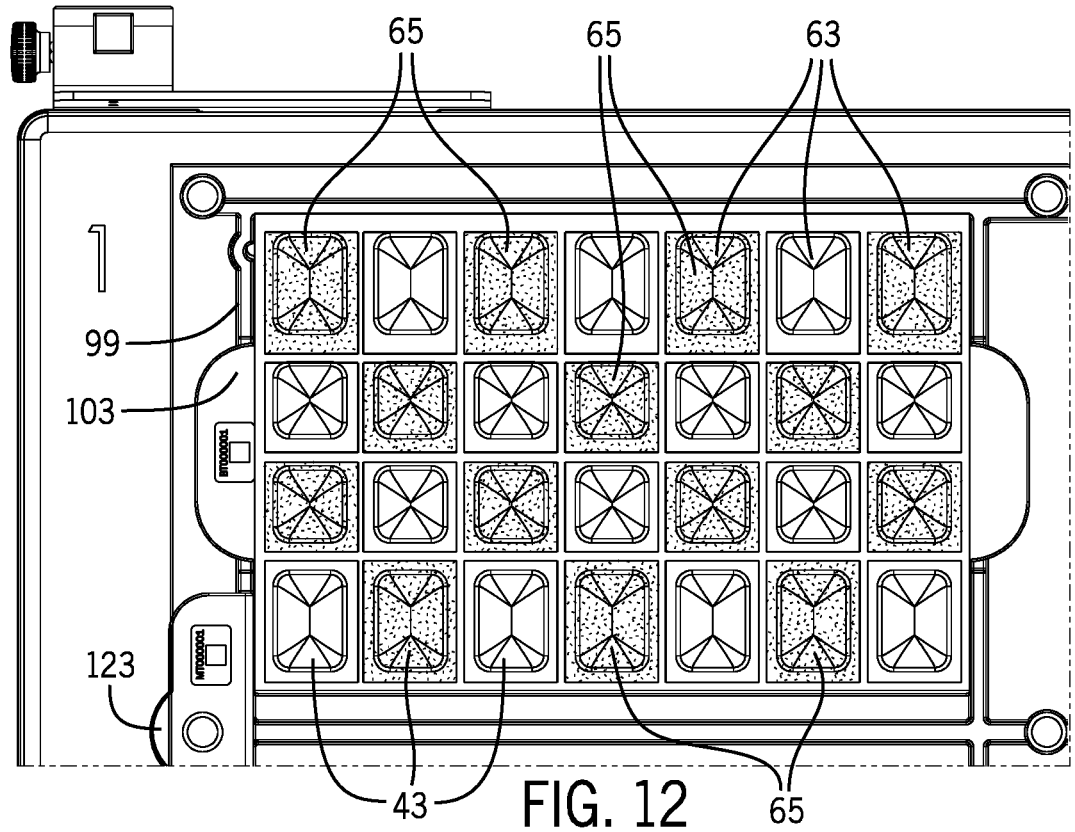
FIG. 12 is the enlarged partial plan view of FIG. 11 but including a fixture, a blister card tray and visible information viewable through the wells.
Figure 13A:
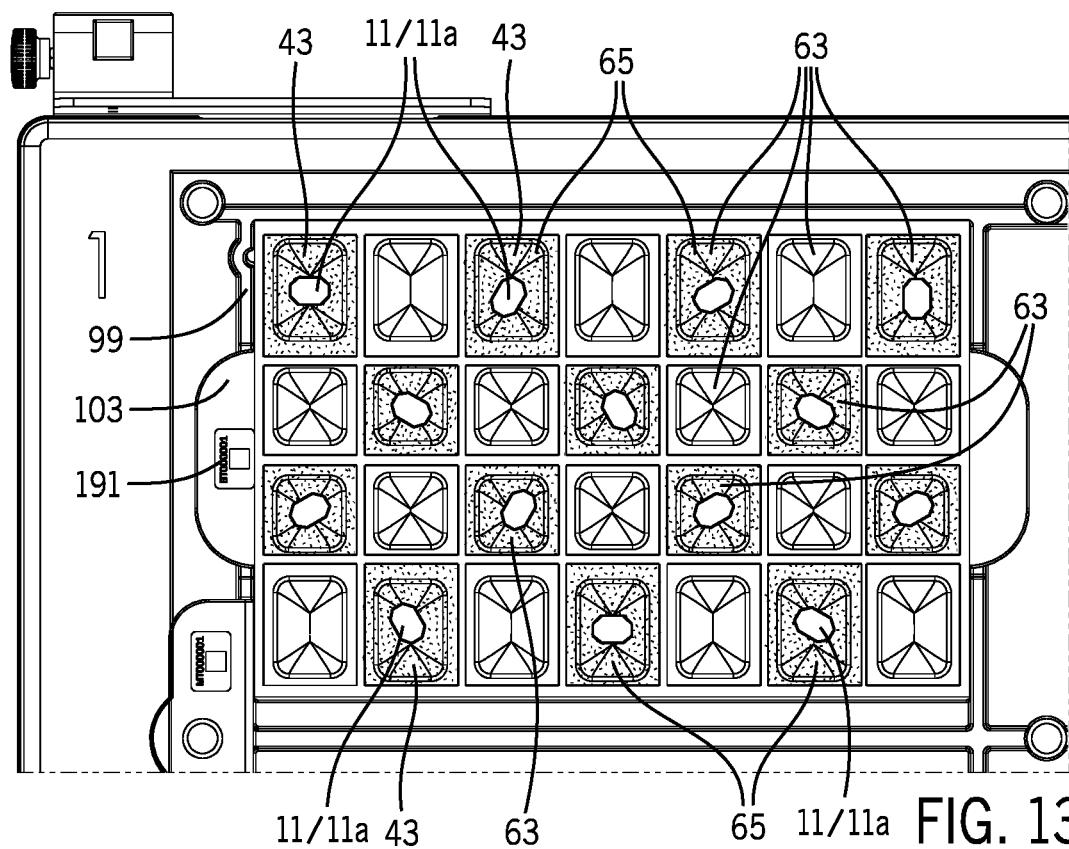
FIG. 13A is the enlarged partial plan view of FIG. 12 showing a first medicament type loaded in the wells proximate the visible information.
Figure 13B:
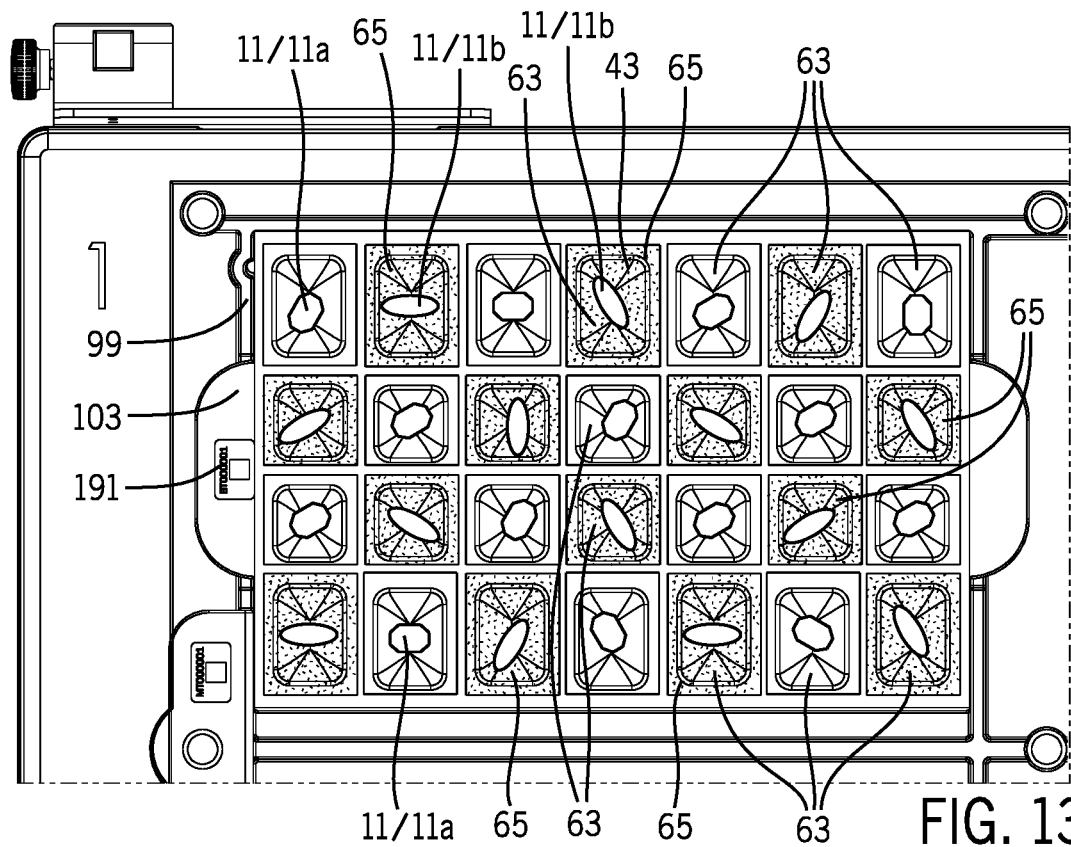
FIG. 13B is the enlarged partial plan view of FIG. 12 but showing different visible information viewable through other wells and a second medicament type loaded in the wells proximate such visible information.
Figure 21A:
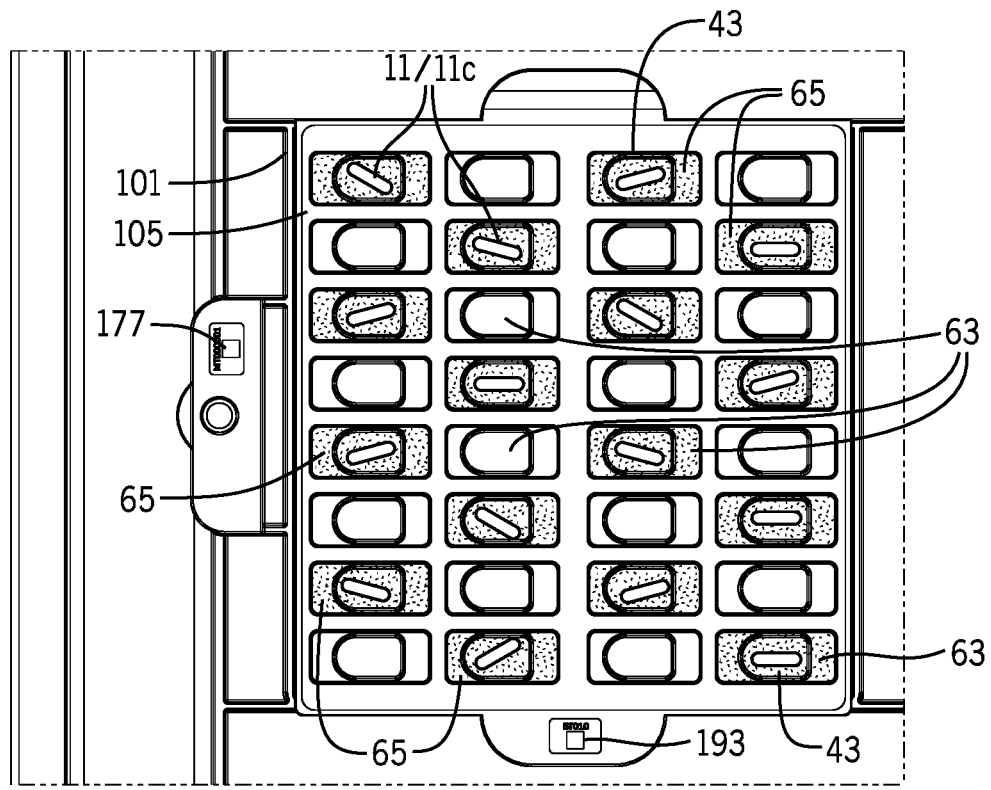
FIG. 21A is the enlarged partial plan view of FIG. 20 showing a first medicament type loaded in the wells proximate the visible information.
Figure 21B:
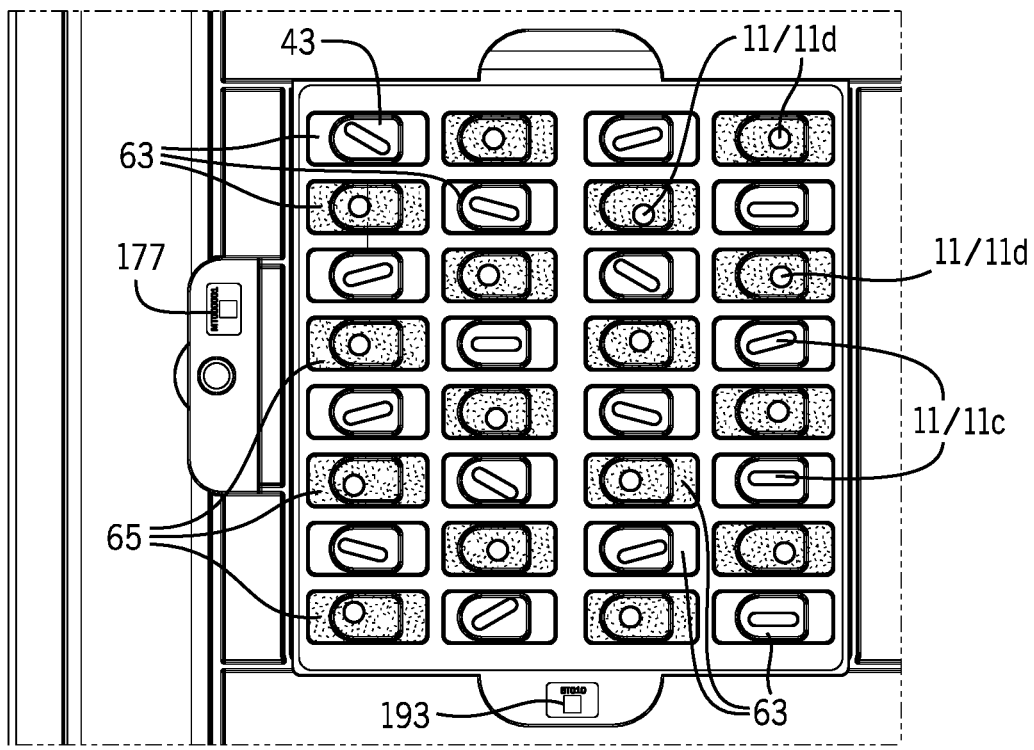
FIG. 21B is the enlarged partial plan view of FIG. 21 but showing different visible information viewable through other wells and a second medicament type loaded in the wells proximate such visible information.
Figure 22:
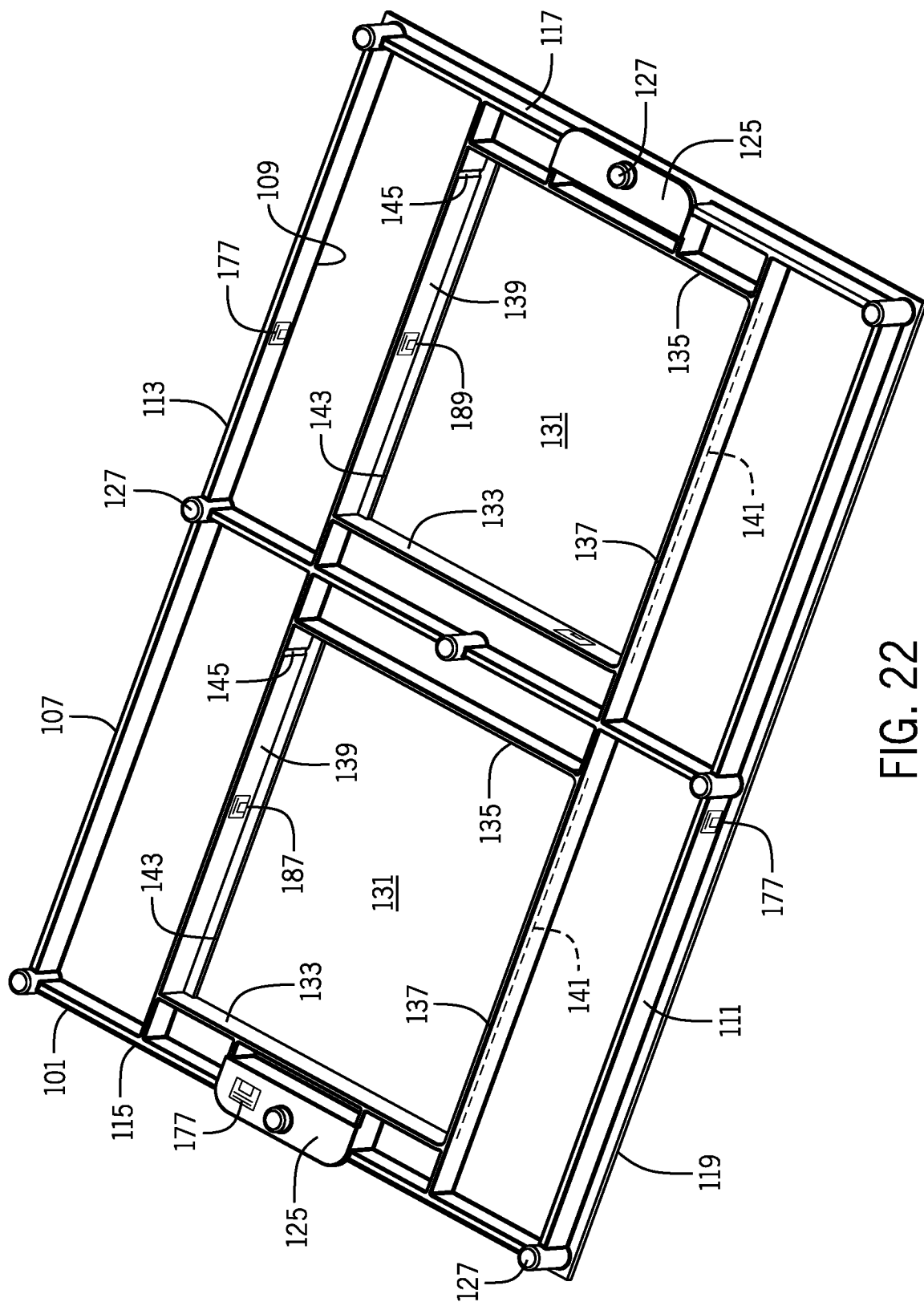
FIG. 22 is a perspective view of a 2-position fixture.

Referring next to FIGS. 13B and 21B, these figures illustrate display device 81 with the same arrangement and pattern of visible information locations 63 (again, 28 and 32 visible information locations 63 respectively) but with different ones of the visible information locations 63 providing an output of visible information 65 providing information to a user which differs from that of FIGS. 10-13B and 19-21B. In use, such a second arrangement and pattern of visible information 65 output from activated visible information locations 63 may be used to direct the user to load a second type of medicament 11b into a subset of wells 43 different from the subset of wells 43 which would be indicated by the visible information 65 of FIGS. 10-13B and 19-21B.

Referring more specifically to FIGS. 10-13B, docking station 19 display device 81 is illustrated with groups 93 of visible information locations 63 indicated as 93a-93d. In the example, groups or regions of pixels 92 of screen 83 provide each of the visible information locations 63. Each group 93a-93b of visible information locations 63 includes 28 visible information locations 63 arranged in a pattern of rows and columns 95, 97 with four rows 95a-95d and seven columns 97a-97g. Each of the 28 visible information locations 63 in each group 93a-93d of visible information locations 63 is arranged (i.e., spaced in width W and length L dimensions) in a pattern that matches the arrangement and pattern of the 28 wells 43 of a blister card 13 such as is illustrated in FIGS. 1A-1C.

Referring again to FIGS. 10-13B, the visible information 63 output by visible information locations 63 may be of a solid-type 65a and a bordered-type 65b. The solid-type 65a information is shown as a solid color (e.g., green) but may be of any type, such as a combination of colors, a pattern, etc. The bordered-type 65b information is shown as a solid color border (e.g., green) surrounding an inactive region of screen 83 but may be of any type, such as a combination of colors, a pattern, or even nothing.

Each type of solid-type 65a and bordered-type 65b visible information may provide a different type of information to the technician, pharmacist or other user. In the illustrated embodiment, the solid-type visible information 65a may indicate that a first type of medicament 11a should be placed by hand in a well 43 of a blister card 13 overlying the visible information locations 63. The solid-type 65a information may indicate a "yes" state to prompt the user to load, verify, unloaded or perform some other task for the indicated well 43. In contrast, the bordered-type visible information 65b may indicate that the well 43 proximate the bordered-type visible information 65b requires no loading, verifying or unloading. The bordered-type 65b information may indicate a "no" state of the well 43 proximate the bordered-type visible information 65b prompting the user to take no action with respect to the well 43 proximate the bordered-type visible information 65b in these examples.

In the example of FIGS. 10-13B, each visible information location 63 may be directly beneath each well 43 and each well 43 may overlie the visible information location 63 and visible information 65 when the blister card 13 is docked at docking station 19. Visible information 65 may be viewable through well 43 bottom 49 and wall 45. Each visible information location 63 is not required to be directly beneath each well 43 and may be at other locations which provide visible information 65 proximate to, or associated with, the well 43 which is to be loaded, verified, unloaded or otherwise acted on. For example, the visible information 65 could pass through a region of body 27 bottom 33 and top 31 sides next to each well 43, rather than through the well 43 bottom 49 and well wall 45 as illustrated to provide the needed visible prompt to the user indicating the well 43 of interest.

In the example of FIG. 13B, visible information locations 63 provide a pattern and arrangement of visible information 65 which differs from that of FIGS. 10-13A. As is apparent, different ones of the 28 visible information locations 63 are active to provide solid-type and bordered type visible information 65a, 65b, indicating by the solid-type visible information 65a, for example, the wells 43 into which a second type of medicament 11b is to be placed by hand.

In the examples of FIGS. 10-13B, the area of the visible information 65 provided by the visible information locations 63 is optionally greater for the outer two rows 95a, 95d than for the inner two rows 95b, 95c. In examples including a video display device 81, this may be accomplished by activation of the desired pixels 92 of screen 83. This area size difference is reflective of the larger size of the two outer rows 53a, 53d of blister card 13 wells 43 as compared with the inner two rows 53b, 53c of blister card 13 wells 43. This difference in area for the outer two rows 95a, 95d than for the inner two rows 95b, 95c is illustrative that in embodiments of system 10, the visible information locations 63 may be activated to provide visible information 65 of any shape, size, appearance, or location on screen 83 needed to indicate the well(s) 43 into which a medicament 11 is to be hand-loaded, verified or unloaded.

Referring next to the examples of FIGS. 19-21B, docking station 19 display device 81 is illustrated with two groups 93 of visible information locations 63 indicated as 93a-93b. Each group 93a-93b of visible information locations 63 includes 32 visible information locations 63 arranged in a pattern of four rows 95a-95d and eight columns 97a-97h identified consistently with rows 53 and columns 55 of blister card 15 in this example. Each of the 32 visible information locations 63 in each group 93a-93b of visible information locations 63 is arranged (i.e., spaced in width W and length L dimensions) in a pattern that matches the arrangement and pattern of the 32 wells 43 of a blister card 17 such as is illustrated in FIGS. 3A-3C.

In the example of FIGS. 19-21B, each visible information location 63 may again be directly beneath each well 43 with each well 43 optionally overlying the visible information location 63 and visible information 65. The visible information locations 63 and visible information 65 need not be directly beneath each well 43 of a docked blister card 17 but should be sufficiently proximate each well 43 such that the user understands and is instructed with respect to the well 43 which is to be acted on.

In the example of FIGS. 19-21A, the solid-type 65a visible information 65 provided by the visible information locations 63 may serve as a prompt to a user indicating that a first type of medicament 11c is to be placed by hand into a well 43 of a blister card 17 overlying or proximate to the visible information locations 63 (a "yes" state) whereas the framed visible information 65b may serve as a prompt to indicate to a user that a medicament 11 should not be placed in a well 43 of a blister card 17 overlying or proximate to the visible information locations 63 (a "no" state). In the example of FIG. 21B, the solid-type visible information 65a provided by visible information locations 63 different from those of FIGS. 19-21A may indicate wells 43 of blister card 17 into which a second type of medicament 11d should be placed by hand.

As illustrated in the examples of FIGS. 19-21B, the area of each visible information 65 element provided by the visible information locations 63 may be identical. The identically-shaped visible information 65 of FIGS. 19-21B therefore differs in size, shape, spacing from adjacent visible information 65 and overall orientation from the visible information 65 of FIGS. 10-13B which is not identical. This difference in visible information 65 may be accomplished by activation of the desired groups or regions of pixels 92 of screen 83 corresponding to the desired visible information locations 63, thereby illustrating once again the capability of a single system 10 to function with many different types of blister cards (e.g., blister cards 13, 15, 17).

The visible information 65 output by visible information locations 63 illustrated in FIGS. 10-13B and 19-21B represents examples only. The size, shape, appearance, orientation, location, color, opaqueness, borders, absence of borders, and any other characteristics of the visible information 65 presented on display device 81 may be customized and presented as desired by the user of system 10.

The visible information 65 need not be constant and could, for example, provide alternating on/off visible information or, in other words, provide blinking visible information 65. For example, controller 21 may control display device 81 and visible information locations 63 to have a blinking pattern indicating the quantity of medicaments 11 to be loaded into the associated well 43. A single blink could, for example, indicate that one medicament 11 is to be loaded, verified, or unloaded from the indicated well 43, two blinks may indicate that more than one medicament 11 is to be loaded in that well and three blinks may indicate that a half-size medicament is to be loaded in that well 43.

Visible information 65 in the form of light information has been described above. In embodiments, visible information may comprise image information, separately or in combination with light information. For example, visible information 65 may include an image information such as an Arabic number (e.g., 1, 2, 3 etc.) provided by visible information locations 63 to indicate the quantity of medicaments 11 that should be in each well 43 for loading, verification, unloading, or some other task. Visible information 65 may also include an image of the physical appearance of the medicament that should be loaded into each well 43. Video displays 81 of the types described herein may be capable of generating these and other types of image information that could be used as a visible cue or prompt to assist the user with loading, verifying or otherwise acting on a well of interest.

The relationship between the visible information 65 and blister cards 13, 15, 17 is described in more detail below.

Reference will now be made to FIGS. 6-24 to describe exemplary container locator 23 structure which may be associated with display device 81. In the embodiments, for system 10 to provide visible information 65 to the user with respect to how to load, verify, and/or unload a blister card 13, 15, 17, or do other work, system 10 must have a record of the location of each well 43 and the action to be taken with respect to each well 43. Each well 43 must be positioned at a known location with respect to docking station 19 so that such actions can occur.

In the examples, a container locator 23 may be associated with the display device 81. Container locator 23 may comprise bezel 85, interchangeable portable fixtures 99, 101 and interchangeable portable blister card trays 103, 105 (also referred to herein as a "tray" or as the plural "trays"). Each fixture 99, 101 outer edge 119 may cooperate with bezel 85 inner edge 121 to locate fixture 99, 101 and trays 103, 105 at repeatable positions over screen 83. Blister card trays 103, 105 supported by an appropriate portable fixture 99 or 101 may be used to locate a blister card 13, 15, 17 and their wells 43 at known positions with respect to visible information locations 63 and visible information 65 of docking station 19.

Each fixture 99, 101 may itself be a type of tray. Examples of fixtures 99, 101 may be thought of as a "main" or "primary" tray and blister card trays 103, 105 may be thought of as "secondary" trays indicative that a fixture 99, 101 may position one or more tray 103, 105 at a known position of display device 81. It is to be understood that the term "tray" herein is not intended to impose any particular structure on the fixtures 99, 101 or trays 103, 105. In the examples, tray merely refers to structure which may be capable of positioning, carrying and/or holding. It is to be further understood that bezel 85, fixtures 99, 101 and trays 103, 105 of container locator 23 are examples and that other types of positioning structure capable of locating blister cards 13, 15, 17 and other types of compartmentalized containers with wells 43 or other compartments at known positions of docking station 19 may be implemented.

Fixtures 99, 101 may be interchangeable on docking station 19 and blister card trays 103, 105 may fit interchangeably into a respective fixture 99, 101. In the examples, fixtures 99, 101 position respective blister card trays 103 or 105 in overlying relationship with display device 81. In the examples, visible information 65 provided by visible information locations 63 may be viewable by a human user through fixtures 99, 101, blister card trays 103, 105 and wells 43 of a blister card (e.g., blister cards 13, 15, 17) resting on a blister card tray 103, 105.

Fixtures 99, 101 and corresponding blister card trays 103, 105 locate each blister card (e.g., blister card 13, 15, 17) proximate docking station 19 screen 83 such that each blister card (e.g., blister card 13, 15, 17) may be recognized by system 10 and every well 43 is at a known position proximate visible information locations 63. With blister cards (e.g., blister card 13, 15, 17) and wells 43 at known positions, system 10 may provide instructions in the form of visible information 65 to the technician, pharmacist or other user for purposes of hand-loading a medicament 11 into a well 43, for verification of the content(s) of one or more well 43, for removal of medicaments 11 from one or more well 43, and/or for other work.

In the examples, each fixture 99, 101 of container locator 23 may have essentially identical structure, or modularity. Each fixture outer edge 119 may have the same width and length dimensions to cooperate with inner edge 121 of a single bezel 85 to hold each fixture 99, 101 at a single position atop display device 81 of docking station 19.

However, each fixture 99, 101 may differ from another fixture with respect to the number and location of the blister card tray(s) 103, 105 and blister cards (e.g., blister cards 13, 15, 17) supported by each fixture 99, 101. By way of example, fixture 99 is a 4-position fixture which holds four blister card trays 103 of a 28-well type. By way of further example, fixture 101 is a 2-position fixture which holds two blister card trays 105 of a 32-well 43 type. Such tray 103, 105 embodiments and their exemplary relationship with fixtures 99, 101 are described in more detail below.

Referring then to FIGS. 8, 14, 18 and 22 and the exemplary fixtures 99, 101 illustrated therein, fixtures 99, 101 may have top and bottom sides 107, 109, front and rear sides 111, 113 and left and right sides 115, 117. Fixtures 99, 101 may have an area defined by a length dimension L between sides 115-117 and a width dimension W between sides 111-113 such that fixture 99, 101 approximates an area of display device 81 and may overlie docking station 19 with blister card trays 103, 105 over screen 83 at a known position. Each fixture 99, 101 is preferably identical with respect to its length, width, and area dimensions so that one fixture 99, 101 may be interchanged with any other fixture 99, 101 of system 10. As mentioned, bezel 85 may include human-readable position indicators 89 (e.g., arabic numbers 1, 2, 3, 4) to indicate each of four potential positions for loading of blister cards 13, 15, 17 in the examples. Systems other than system 10 may include any number of loading positions at which a docked tray 103, 105 and blister card 13, 15, 17 is located for loading, verification, unloading or another task.

To facilitate interchange of one fixture with another, each fixture 99, 101 may have an outer edge 119 defined by sides 111, 113, 115, 117 which closely approximates an inner edge 121 of bezel 85 surrounding display 83. Each fixture 99, 101 has the same outer edge 119 dimension and is interchangeable with any other fixture 99, 101 bordered by bezel inner edge 121. An interference fit between edges 119, 121 locates each fixture 99, 101 at a single repeatable position over display device 81 screen 83. Structure other than edge-to-edge contact between edges 119, 121 may be used to locate fixture over display device 81. As an example, locator pins (not shown) on fixture 99, 101 may be used to interact with bezel inner edge 121 as an example.

Each fixture 99, 101 may further include a projection 123 extending out from fixture side 115 keyed to mate with notch 91. Contact between projection 123 and notch 87 forces fixture 99, 101 to be located on docking station 19 over display device 81 in just a single orientation. Contact between edge 119 of fixture 99, 101 and inner edge 121 of bezel 85 and between projection 123 and notch 91 easily allows fixture 99, 101 to be removably placed onto docking station 19 over display device 81 in just a single repeatable position. The single and repeatable position of fixture 99, 101 over display device 81, in turn, enables system 10 to identify the location of each well 43 as described herein.

To improve portability of each fixture 99, 101, a pair of gripping handles, each numbered 125, may be provided on fixture 99, 101 along respective left and right sides 115, 117. Handles 125 may be provided for gripping by a human hand when placing a fixture 99, 101 on bezel 85 of display device 81, when carrying fixtures 99, 101, when storing fixtures 99, 101, or otherwise working with fixtures 99, 101.

Each fixture 99, 101 may be of a lightweight, but rigid, material enabling a human to easily manipulate or carry one or more of the fixtures 99, 101. Plastic materials, such as nylon or acetal, are representative materials that may be implemented for fixtures 99, 101.

Each fixture 99, 101 may include stacking structure to facilitate storage of fixtures 99, 101, and, more specifically stacking of fixtures 99, 101. As is known, workspace and storage space within a pharmacy or other facility is valuable. It may be desirable to utilize such space as efficiently as possible by storing blister packages 13, 15, 17 and medicaments 11 or other items therein as densely as possible.

To facilitate stacking, each fixture 99, 101 may be identical with respect to its length, width, and area dimensions as previously described, thereby allowing one fixture 99 and/or 101 to be neatly stacked atop another fixture 99 and/or 101.

To further facilitate stacking, each fixture 99, 101 may further include stacking structure in the form of a plurality of upwardly-projecting posts, each numbered 127, which may project up from fixture 99, 101 top side 107. Each post 127 may optionally fit within a separate aligned female opening (hidden in FIGS. 14 and 22) or other cooperating structure in or on bottom side 109 of each fixture 99, 101 which may align with a respective post 127 providing a friction fit which separably holds adjacent fixtures 99, 101 laterally and vertically together for purposes of stacking, storage, carrying, or other work.

In other embodiments, stacking structure could comprise posts (not shown) projecting down from a fixture 99, 101 bottom side 109. Other stacking structure could be utilized. Stacking is described in further detail below.

Each fixture 99, 101 may include one or more tray-locating position, each numbered 131, which receives and holds a blister card tray such as a tray 103 and/or 105. Such trays 103, 105 may have different shapes and configurations and a respective fixture 99, 101 tray-locating position 131 may be tailored accordingly. Preferably, the trays such as trays 103, 105, are modular so that numerous different trays 103 or 105 of an identical structure may be used interchangeably with a single fixture 99, 101. For example, a single fixture 99, 101 may be tailored to hold just one identical type of tray (e.g., tray 103 or tray 105), different types of trays (e.g., tray 103 and tray 105), or trays that are unlike trays 103, 105. By way of further example, a single fixture 99, 101 may be tailored to hold just one tray, or more than one tray (e.g., tray 103 or tray 105). A fixture 99, 101 with plural positions 131 may hold fewer trays (e.g., tray 103, 105) than the available positions 131 during loading, verification, unloading, or other operation of system 10.

In the examples, each tray-locating position 131 may include structure which requires that each tray 103, 105 is in a single repeatable position within each tray-locating position 131 of fixture 99, 101. Such structure may include left and right sidewalls 133, 135, front and rear walls 137, 139 and a pair of opposed bottom ledges 141, 143 which may be toward bottom of walls 137, 139. The opening in fixture 99, 101 defined by walls 133-139 is preferably selected to form a close fit with a tray 103 or 105 which is sized to fit closely within tray-locating position 131. Also in the examples, a sidewall such as right sidewall 135 may include a notch 145. Trays 103, 105 may include a projection 147 keyed to be received in notch 145. Trays 103, 105 cannot be received in tray-locating position 131 unless projection 147 is fully within notch 145. A technician, pharmacist or other person would be immediately prompted to turn tray 103, 105 until projection 147 is placed within notch 145, thereby enabling tray 103, 105 to be received fully into a respective tray-locating position 131. The single and repeatable position of tray 103, 105 within tray-locating position 131 enables system 10 to identify the location of each well 43 as described herein.

Referring next to FIGS. 5-13B, 15-21B and 23-24, portable blister card trays 103, 105 comprising elements of container locator 23 will be described in further detail. Trays 103, 105 may be desirable to support and hold containers such as blister cards 13, 15, 17 which may be of a flexible material, thereby providing an element of rigidity to the blister card 13, 15, 17 supported on the tray 103, 105. In embodiments, wherein containers are more rigid, a tray 103, 105 could be replaced by the container itself. In such embodiments, container locator 23 could include bezel 85, a fixture 99, 101 and the rigid container substituted for tray 103, 105.

Referring back to the examples of FIGS. 5-13B, 15-21B and 23-24, each tray 103, 105 may have lateral sides 149, 151, 153, 155, a top side 157 and a bottom side 159. Tray sides 149-155 may be sized to closely fit within walls 133-139 of a tray-locating position 131 of a fixture such as fixture 99, 101. For further control, tray sides 149-153 and each position 131 may be constructed so that just one type of tray (e.g., tray 103 or 105) fits within a given position 131. Such an arrangement would prevent an incorrect tray 103, 105 from being inserted into a position 131. Given that trays 103, 105 may be modular, this would allow multiple trays 103, 105 to be used with a single fixture 99, 101 and positioned in a repeatable position or positions on the fixture 99, 101.

Figure 15:
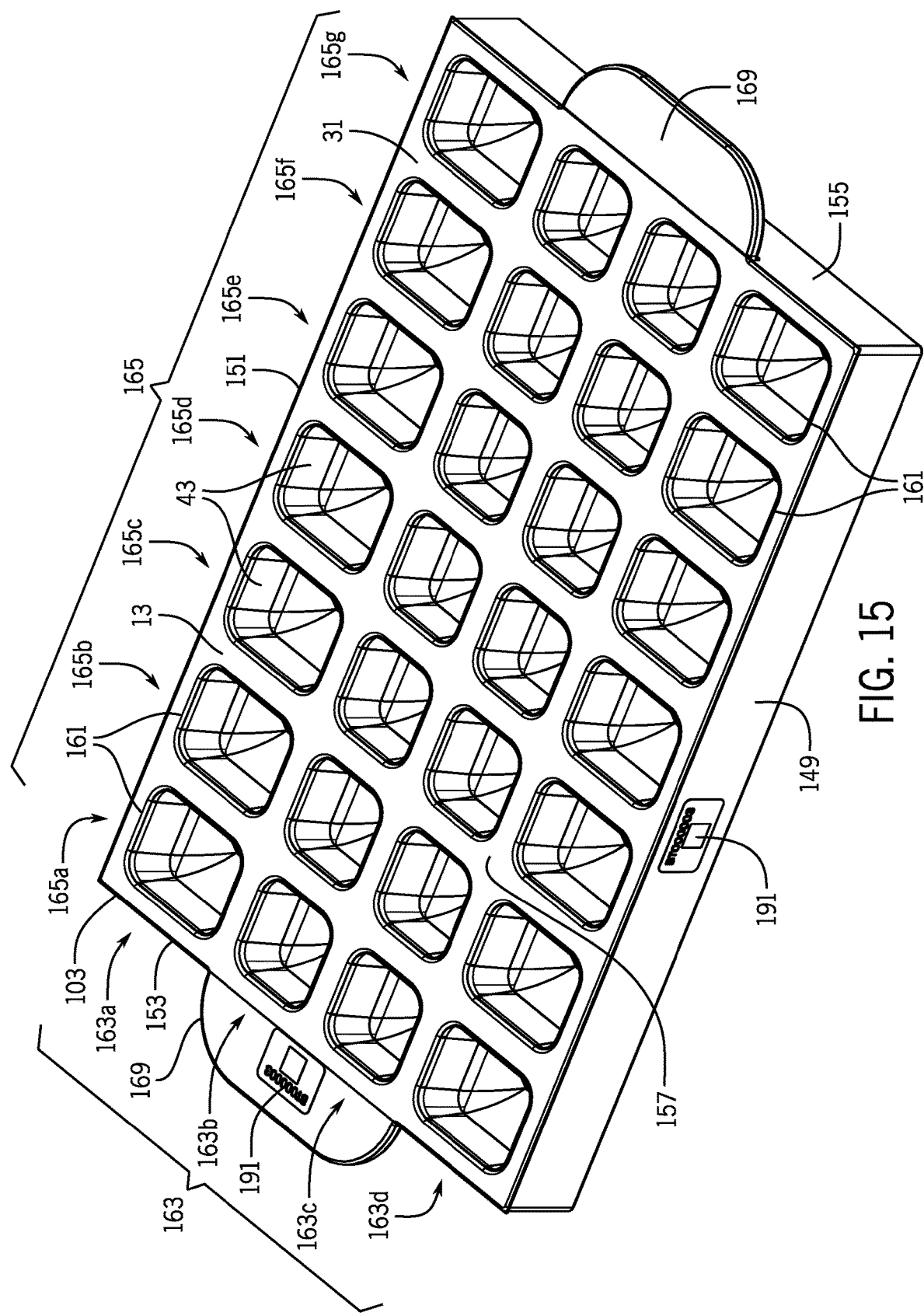
FIG. 15 is a perspective view of a 28-well blister card tray and the blister card of FIGS. 1A-1C.
Figure 16:
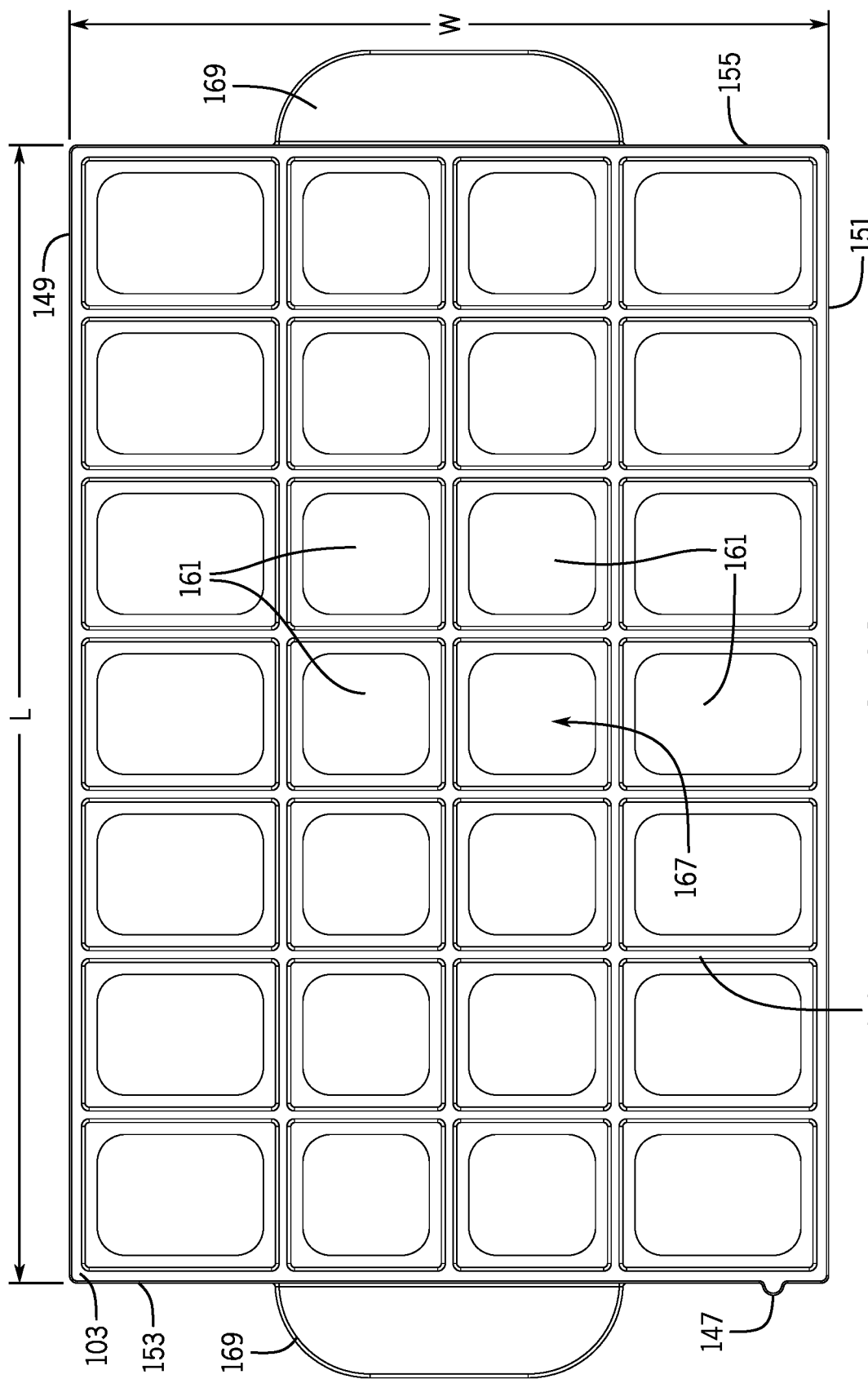
FIG. 16 is a bottom plan view of the blister card tray of FIG. 15 but with the blister card removed.
Figure 17:
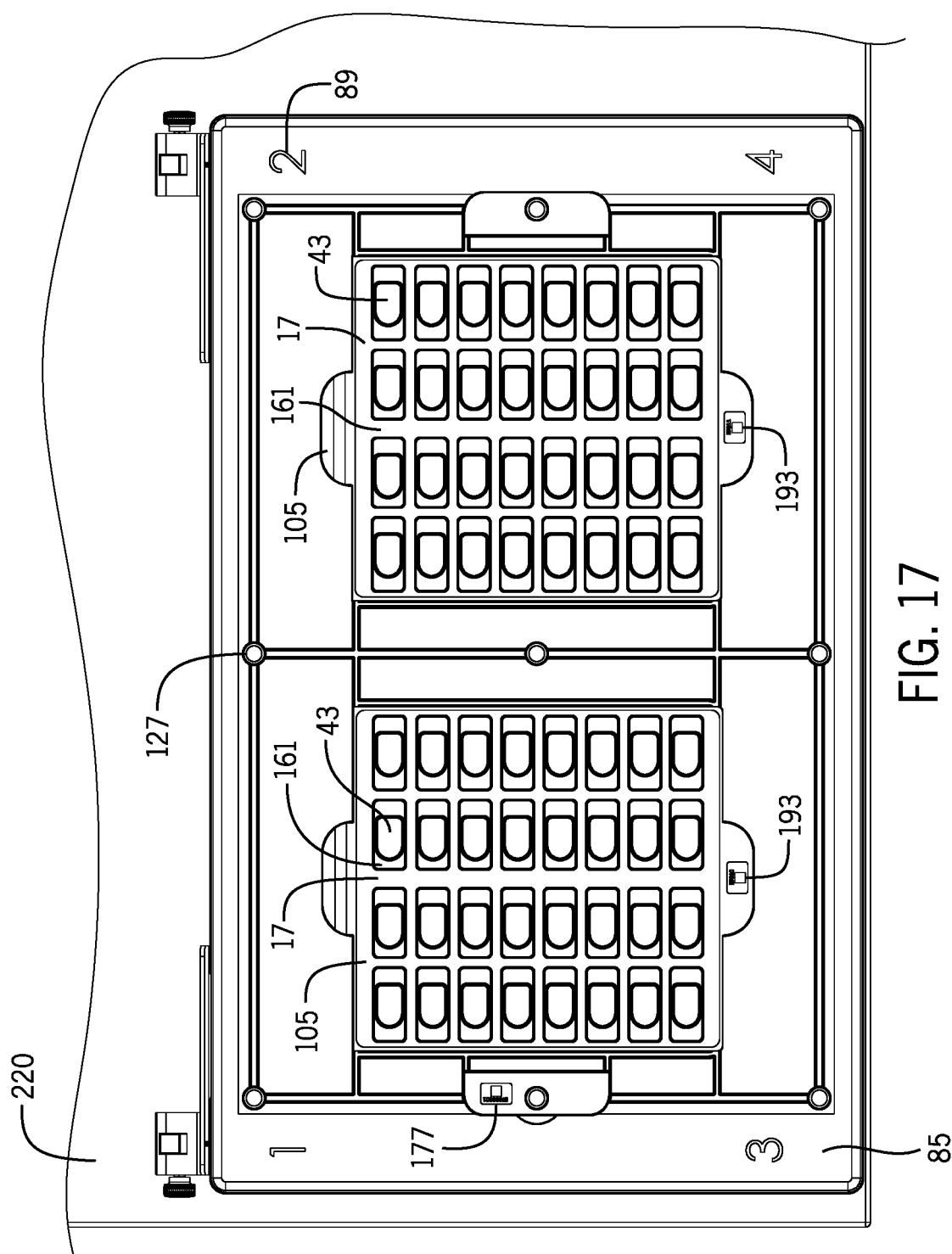
FIG. 17 is a plan view of the docking station of FIG. 5 but with an exemplary 2-position fixture, two blister card trays and two blister cards.
Figure 18:
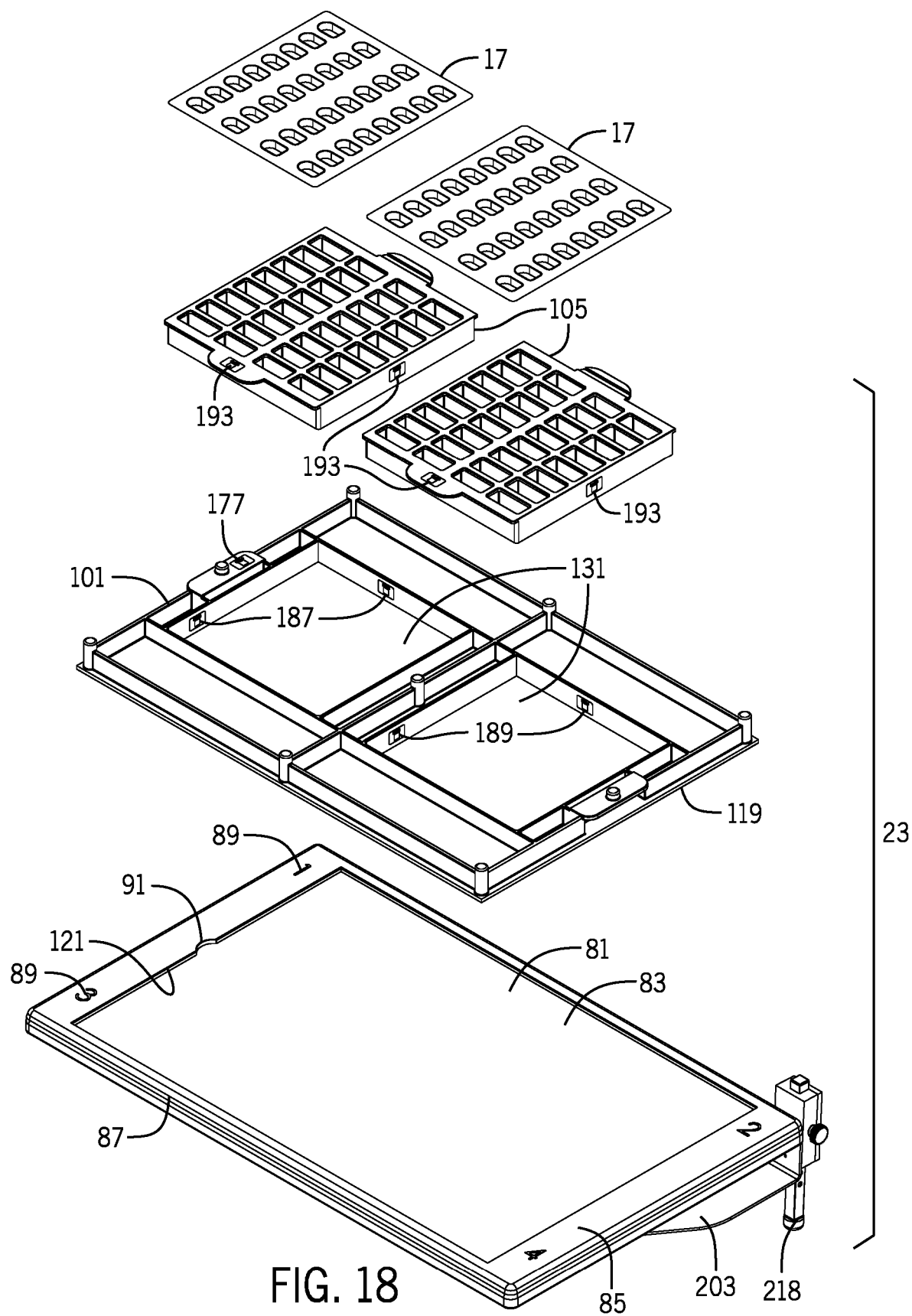
FIG. 18 is a partially exploded view of the docking station of FIG. 17 showing exemplary relationships of the video display, fixture, blister card trays and blister cards.
Figure 19:
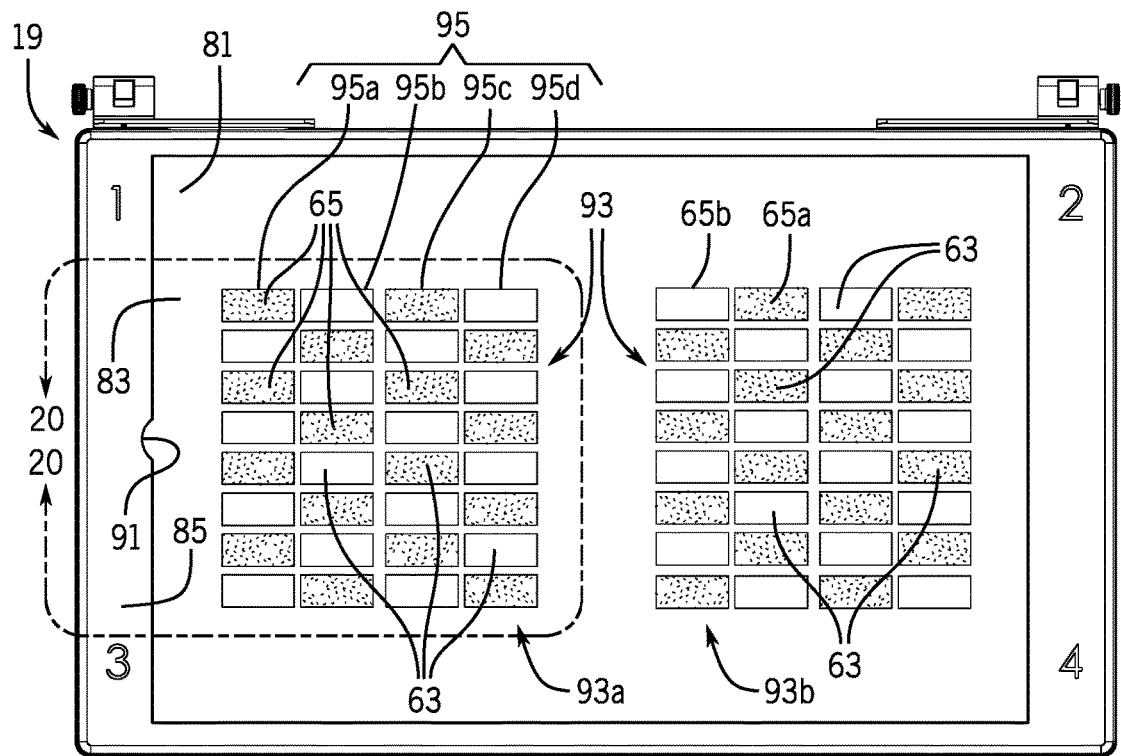
FIG. 19 is a plan view of the docking station of FIG. 17 but with the video display in an active state providing visible information from two groups of visible information locations.
Figure 20:
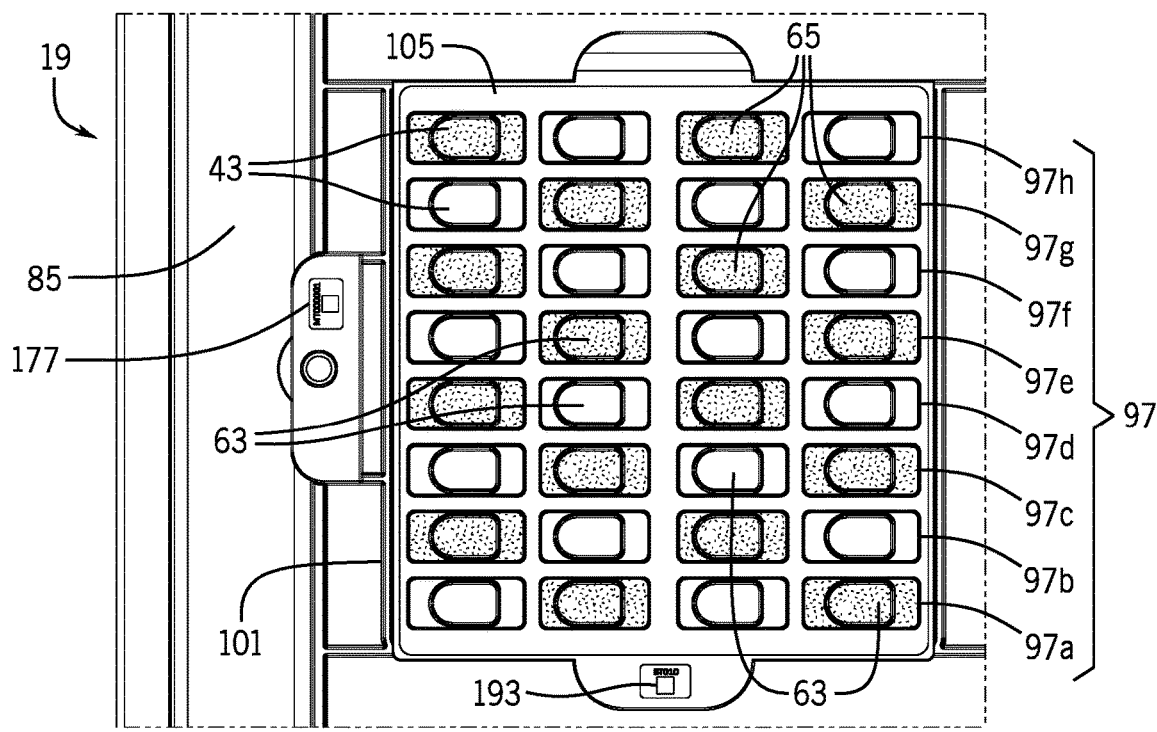
FIG. 20 is an enlarged partial plan view taken along detail section 20-20 of FIG. 19 including portions of a two-position fixture, a blister card tray and visible information viewable through the wells.

Top side 157 may define a plurality of openings, each numbered 161 for convenience. Referring to FIGS. 15-16, top side 157 of tray 103 may include 28 openings 161 arranged in a pattern of rows 163 and columns 165 with four rows 163a-163d and seven columns 165a-165g in this example. Each of the 28 openings 161 is arranged in a pattern (i.e., spaced in width W and length L dimensions) that matches the arrangement and pattern of the 28 wells 43 of a blister card 13 such as is illustrated in FIGS. 1A-1C. Blister card 13 may rest on tray 103 with each well 43 inserted through a respective opening 161. Tray 103 may have a depth dimension so that bottoms 49 of wells 43 of blister card 13 are on or above screen 83 when tray 103 is docked at docking station 19. System 10 may then activate visible information locations 63 matching the arrangement and pattern of the openings 161 and wells 43 once system 10 is operational.

Figure 23:
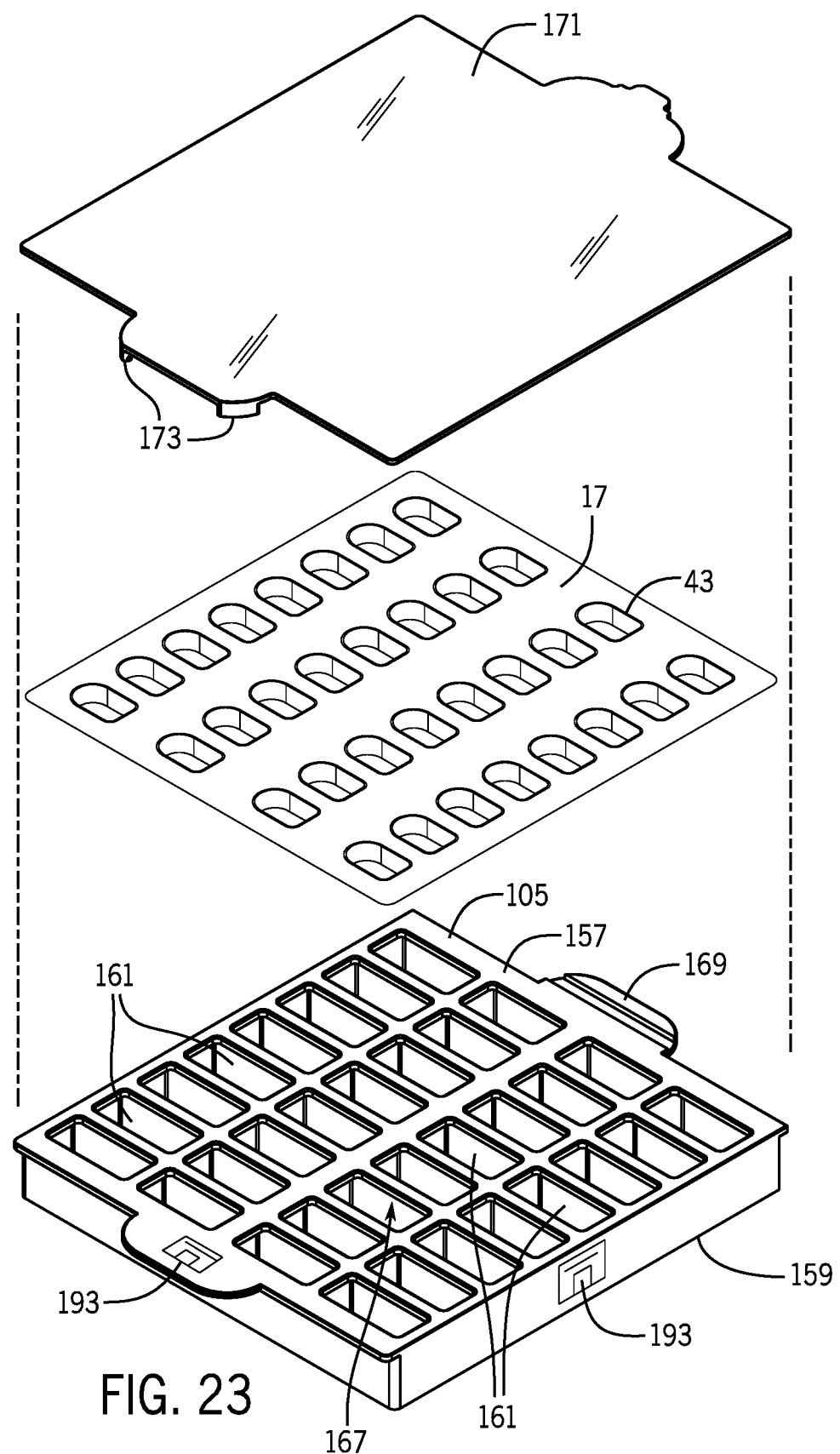
FIG. 23 is an exploded view of a 32 well blister card tray, the blister card of FIGS. 3A-3C and a cover.
Figure 24:
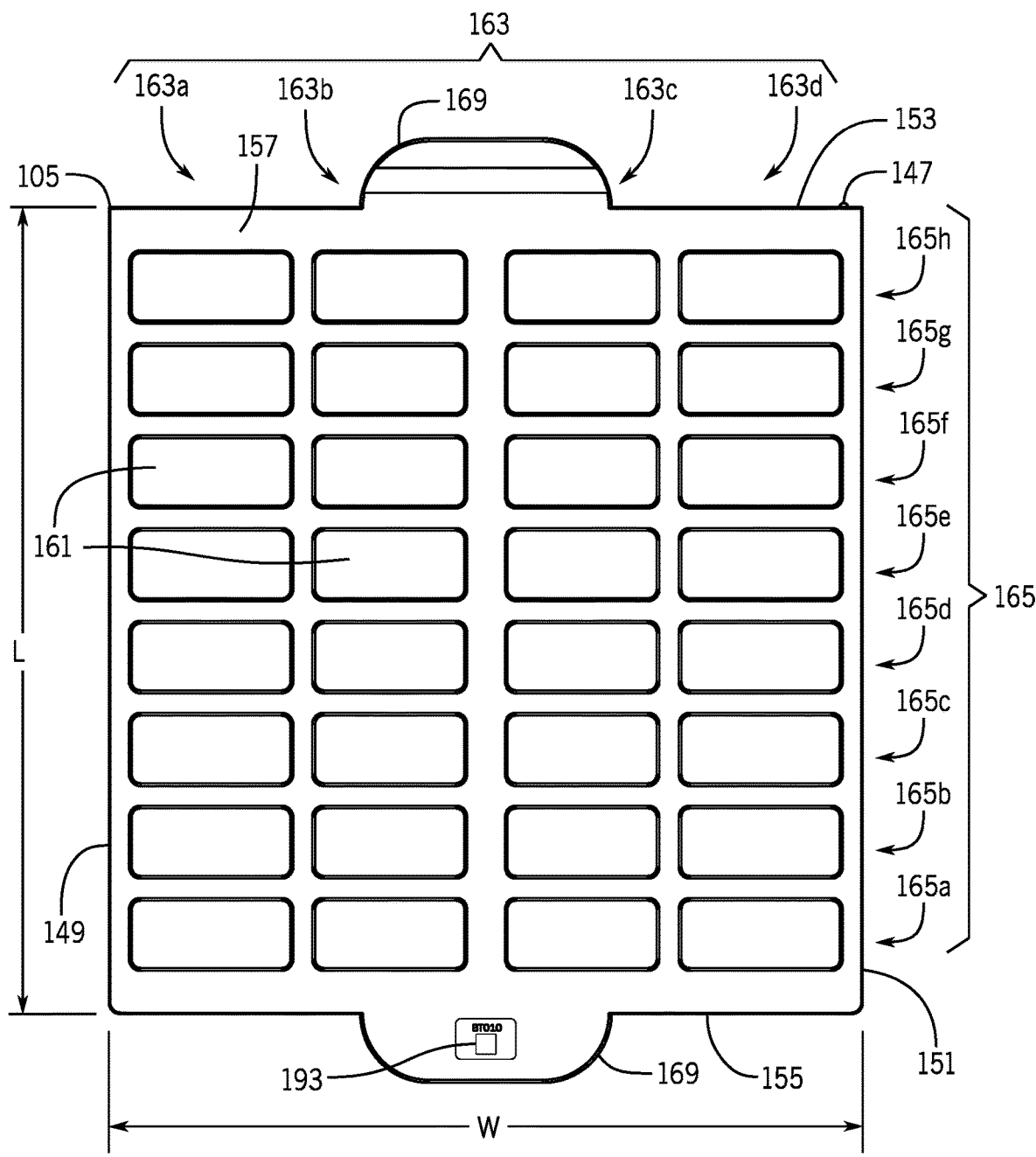
FIG. 24 is a top plan view of the blister card tray of FIG. 23 but with the blister card removed.

Referring to FIGS. 23-24, top side 157 of tray 105 may include 32 openings 161 arranged in a pattern of rows 163 and columns 165 with four rows 163a-163d and eight columns 165a-165g in this example. Each of the 32 openings 161 may be arranged in a pattern (i.e., spaced in width W and length L dimensions) that matches the arrangement and pattern of the 32 wells 43 of a blister card 17 such as is illustrated in FIGS. 3A-3C. Blister card 17 may rest on tray 105 with each well 43 inserted through a respective opening 161. Tray 105 may have a depth dimension so that bottoms 49 of wells 43 are on or above screen 83 when tray 105 is docked at docking station 19. As with tray 103, system 10 may then activate visible information locations 63 matching the arrangement and pattern of the openings 161 and wells 43 of tray 105 once system 10 is operational.

Tray sides 149-155 and top side 157 may define an interior space 167. The tray bottom side 159 may be sufficiently unobstructed to allow visible information 65 to pass into tray 103, 105 and through interior space 167 and openings 161. Interior space 167 may be hollow which would enable passage of such visible information 65.

Trays 103, 105 may include a pair of handles 169 on opposite sides 153, 155 of tray 103, 105. Handles 169 may be grasped by human hands to allow for ease of handling of the trays both before and after loading with medicaments 11 or other items.

Referring to FIG. 23, a cover 171 may be provided to cover blister cards 13, 15, 17 after loading but before closure 51 is attached to blister card body 27. Cover 171 may be transparent, translucent or otherwise light-transmissive to allow a human to view the content(s) of each blister card well 43. A cover 171 may be provided for each tray 103, 105. The cover 171 is ideal if the loaded blister cards 13, 15, 17 supported on trays 103, 105 are to be stored for a period of time before verification, unloading, application of closure 51 or some other task. For example, each tray 103, 105 may be stored separately. Alternatively, a fixture 99, 101 with loaded trays 103, 105 thereon may be stored as a unit. Cover 171 would protect the contents of each blister card 13, 15, 17 until a closure 51 is applied.

In the examples, cover 171 may be configured to match the profile of each tray 103, 105 in a plane defined by tray top side 155. Clips, each numbered 173, may depend from protruding portions of cover 171 to provide a friction fit with a respective tray handle 169 which removably holds cover 171 on tray 103, 105.

Each tray 103, 105 may be of a lightweight but rigid material, enabling a human to easily manipulate or carry one or more of the trays 103, 105 separately or when loaded on a fixture 99, 101. Plastic materials, such as nylon or acetal, or lightweight metals such as cast aluminum are representative materials that may be implemented for trays 103, 105.

Machine-readable identification elements 175-193 may be utilized separately, or in combination with human-readable information, to simplify the workflow of system 10. Machine-readable identification elements 175-193 may simplify the process of associating a fixture 99, 101 with a docking station 19 and trays 103, 105 with positions 131 of a fixture 99, 101. The foregoing associations ultimately locate wells 43 of a blister card 13, 15, 17 at a known position over screen 83 so that system 10 may activate the visible information locations 63 in the arrangement and pattern which matches the well 43 locations of a docked tray 103, 105 and blister card 13, 15, 17 supported by the appropriate tray.

The machine-readable identification element 175-193 may be used by system 10 for other purposes including to validate that the correct fixture 99, 101 or tray 103, 105 has been selected for a particular task or to provide an error signal if the incorrect fixture 99, 101 or trays 103, 105 were selected. Machine-readable identification elements 175-193 may be used to simplify record-keeping and controlling other aspects of system 10 workflow.

Any suitable type of machine-readable identification element 175-193 may be implemented. Examples of suitable machine-readable identification elements 175-193 may include a linear barcode, a two-dimensional barcode (e.g., a QR code, a PDF417 code, etc.), and/or a radio frequency identification tag (RFID). An exemplary RFID tag may be re-writable or read-only, as desired. The location of machine-readable identification elements 175-193 should be such that each embedded code may be read with a code reader 195 such as a suitable barcode reader or an RFID interrogator.

Turning then to interchangeable fixtures 99, 101 and as illustrated in FIGS. 6-8, 12-14 and 17-22, each fixture 99, 101 may include a machine-readable identification element 175, 177 with a unique code which identifies the fixture 99, 101. In the examples of FIGS. 6-8, 12-14 and 17-22, a machine-readable identification element 175, 177 may be located on a fixture 99, 101 anywhere such as on a handle 125 or on a front side 111. Such machine-readable identification element 175, 177 may be read at any suitable time, including before or after fixture 99, 101 is placed on docking station 19 and/or before or after medicaments 11 or other items are loaded, verified and/or unloaded. Reading of machine-readable identification element 175, 177 may identify the fixture type (e.g., a four-position fixture 99, a two-position fixture 101, etc.) and the type of tray 103, 105 which may be received at each tray-locating position 131 of fixture 99, 101. A record of the fixture 99, 101 associated with docking station 19 may be created by system 10 and stored in database 197 associated with controller 21.

Turning to the tray-locating positions 131 of fixtures 99, 101 and referring to FIGS. 8, 14, 18 and 22, a unique machine-readable identification element 179, 181, 183, 185, 187, 189 may also be provided on fixture 99, 101 associated with each tray-locating position 131, thereby providing each such tray-locating position 131 with a unique address.

In the example of fixture 99, machine-readable identification element 179 may uniquely identify tray-locating position 131 which may be at the top left quadrant of fixture 99 and the machine-readable identification elements 181, 183, 185 may respectively identify the remaining three quadrant positions 131 of fixture 99.

In the example of fixture 101, machine-readable identification element 187 may uniquely identify a left side tray-locating position 131 of fixture 101 while machine-readable identification element 189 may uniquely identify a right-side tray-locating position 131 of fixture 101.

Database 197 which may reside in computer 219 may include a record of each tray-locating position 131 of every fixture 99, 101 so that the footprint bounded by every tray-locating position 131 is at a known position with respect to docking station 19 and screen 83 when fixture 99, 101 is mounted on docking station 19. By way of non-limiting example, database 197 may have a record that a tray-locating position in the top left quadrant of fixture 99, e.g., position 1, has a length of 9 inches, a width of 6 inches and covers an area of 54 square inches of screen 83 spaced 2 inches from the left edge of screen 83 and two inches below the top edge of screen 83. Similar physical locations of each tray-location position 131 of fixture 99 and of positions 131 of fixture 101 may be in database 197.

Turning next to trays 103, 105 and as illustrated in FIGS. 6-8, 13A-13B, 15, 17-18, 20-21B, 23-24, a further machine-readable identification element 191, 193 may be on each tray 103, 105 so that each tray 103, 105 may be provided with a unique identifier which may be in database 197 and known to system 10. Machine-readable identification element 191, 193 may be on tray 103, 105, for example on a handle 169 or on a tray side, such as side 149. Database 197 may include a record of the position of each opening 161 of each tray 103, 105 and the position of the screen 83 under each opening 161 when the respective tray 103, 105 is docked in a tray-locating position 131 of fixture 99 or 101 so that location of each well 43 seated in each opening 161 over screen 83 is at a position on screen 83 known to system 10.

As described in more detail below, successive reading of a machine-readable identification element 175, 177 may associate a fixture (e.g., fixture 99 or 101) with docking station 19. Then, reading of the machine-readable identification element 179-189 at one of the tray-locating positions 131 and reading a machine-readable identification element 191 or 193 of a tray 103, associates that tray 103 with the specific tray-receiving position 131 (e.g., the top left quadrant of fixture 99, or position 1 of docking station 19). A record of the associations may be stored in database 197. As a result of the successive associations, system 10 has a record of the exact location over screen 83 of each tray 103, 105, tray opening 161, and blister card well 43 for the purposes of loading each blister card 13, 15, 17.

In the examples, docking station 19 display device 81 is controlled such that the visible information 65 from each visible information location 63 is aligned with each tray opening 161 when a tray (e.g., tray 103, 105) is fully docked or seated in a tray-locating position 131. The visible information 65 may be viewable through each opening 161 and through the light-transmissive material comprising well 43 when a blister card (e.g., blister card 13, 15, 17) is resting on the appropriate tray (e.g., tray 103, 105).

Each visible information location 63 may be controlled so that visible information 65 is always aligned with openings 161 irrespective of the number, arrangement and pattern of the openings 161 of the tray (e.g., tray 103, 105) docked or seated in a respective tray-locating position 131. Because the visible information locations 63 may be changed and activated to provide visible information 65 in arrangements and patterns which may differ as needed to align with openings 161 of different types of trays 103, 105, visible information 65 may always provide "yes" and/or "no" state information to a technician, pharmacist or other user. This ability of system 10 to provide visible information 63 aligned with different numbers, arrangements, and patterns of openings 161 and wells 43 would not be possible if visible information locations 63 were fixed in a single arrangement and pattern.

The pick-to-light/place to light capability enables the user to rapidly load the correct medicament 11 into the correct well 43, or to verify that the correct medicament was loaded into the well 43, or to unload a well 43, or to perform some other task without the necessity for reliance on written instructions, for example instructions printed on a piece of paper. The user can quickly look into each well 43 and can see both the visible information 65 through the light-transmissive well 43 and the medicament 11 in the well 43. The user can compare the physical appearance of each medicament 11 in each indicated well 43 without the necessity of reliance solely on written instructions. This process may be facilitated by presentation of a reference image of the medicament 11 as described below so that the user can quickly compare the appearance of the medicament 11 and reference image in each indicated well 43 associated with an activated visible information location 63.

Referring to FIGS. 6-8, 14, 17-18 and 22, one aspect of fixtures 99, 101 and blister card trays 103, 105 is that they provide a convenient and efficient means by which to organize, store and manage blister cards 13, 15, 17 awaiting loading, verification, unloading, closure, or some other task. Once a tray 103, 105 is associated with a fixture 99, 101, for example by successive scanning of machine-readable identification elements 175-193, the fixture 99, 101 may serve as a module or unit for workflow purposes involving the trays 103, 105.

Following are examples of potential usage of trays 99, 101 to improve workflow within a pharmacy. For example, a technician may use system 10 to pre-load fixtures 99, 101 with trays 103, 105 and empty blister cards 13, 15, 17. A record of the fixture 99, 101 and blister card trays 103, 105 pre-loaded on the fixture 99, 101 could be created in a file in the database 197 for each patient. The fixture 99, 101 could then be grasped by handles 125 and taken to temporary storage to await loading at a subsequent point in time. When a particular prescription order is to be fulfilled, system 10 may identify the fixture 99, 101 to be taken from storage and docked at docking station so that the blister cards 13, 15, 17 can be loaded in the required manner.

By way of further example, a fixture 99, 101 with trays 103, 105 and blister cards 13, 15, 17 already loaded using system 10 may be removed from docking station 19 to be verified at a future point in time. A record of the fixture 99, 101 and blister card trays 103, 105 loaded on the fixture 99, 101 could be created in a file in the database 197 for each patient. As with the pre-loading example above, the fixture 99, 101 could then be grasped by handles 125 and taken to temporary storage to await verification at a subsequent point in time. When a particular prescription order is to be verified, system 10 may identify the fixture 99, 101 to be taken from storage and docked at docking station 19 so that the blister cards 13, 15, 17 can be verified as containing the correct medicament 11.

As yet another example, a fixture 99, 101 with trays 103, 105 and loaded and verified blister cards 13, 15, 17 may be removed from docking station 19 to be closed with a closure 51 at a future point in time.

In all of these examples, a cover 171 may desirably be attached over each blister card 13, 15, 17 and tray 103, 105 after loading while awaiting further steps in the workflow. If cover 171 is transparent or otherwise light transmissive, cover 171 may remain on each tray 103, 105 during verification using system 10. Cover 171 may be transparent to allow a user to look through cover 171 to see the content(s) of each well 43.

The unit or module represented by fixture 99, 101, trays 103, 105 and blister cards 13, 15, 17 may be easily carried and transported by a human and placed in a cabinet, on a shelf, or at any other desired storage location. Each fixture 99, 101 and its blister cards 13, 15, 17 and contents may provide a sort of unit or module enabling the user to easily perform all work on the blister cards 13, 15, 17 within the module.

As described previously, fixtures 99, 101, with blister card trays 103, 105 and loaded blister cards 13, 15, 17 thereon may be stackable to provide for high-density storage. As mentioned, each fixture may have an identical length L and width W dimension and overall structure, potentially differing only with respect to the number and type of tray-locating positions 131. Vertically-adjacent fixtures (e.g., fixtures 99, 101) may be stacked by insertion of posts 127 of a lower fixture 99 or 101 into female openings (hidden in FIGS. 14 and 22) of the upper fixture 99 or 101 aligned with posts 127 such that the fixtures 99, 101 and their blister cards 13, 15, 17 are stacked vertically one on top of the other. This arrangement makes storage of medicaments 11 in blister cards 13, 15, 17 as dense as possible.

At an appropriate date and time or stage in the workflow, the fixture 99, 101, trays 103, 105, blister cards 13, 15, 17 may be retrieved from storage for performing the desired tasks. Therefore, fixtures 99, 101, and the modularity of such fixtures, provide a uniquely efficient manner of loading, transporting, storing, and handling blister cards such as blister cards 13, 15, 17 and their contents.

As illustrated in FIGS. 6-13B and 17-19, docking station 19 may include a cradle 203 purposed to support housing 67. In embodiments comprising a display device 81, cradle 203 may contact bottom side 71 of housing 67 to allow display device 81 to be set at an angle most suitable for effective viewing of screen 83 and visible information 65 thereon by a technician, pharmacist or other user. In the examples, cradle 203 may include a pair of legs 205, 207 adjacent the rear side 75 of housing 67. Legs 205, 207 may be capable of up-and-down translating movement within a respective support member 209, 211 and held at a position with respect to support member 209, 211 by a set screw 213, 215. Legs 205, 207 may terminate in a resilient foot 217, 218. Each foot 217, 218 enables docking station 19 to rest firmly at a workstation 26, such as a countertop surface 220 of a pharmacy.

Referring to FIG. 5 and the schematic block diagram of FIG. 25, there is shown an embodiment of a controller 21 which may be implemented with system 10. Controller 21 may include a client computer 219, which may be a type of processing device. Client computer 219 may be any off-the-shelf personal computer (PC). A Dell Optiplex 7040 MMF XCTO computer is an example. Client computer 219 may be operably connected to a data port 221 of display device 81 by means of a communication link 223, which may be a suitable cable or wireless link. Client computer 219 may include non-volatile memory 225 including a database 197 with a program of instructions 229 residing in memory 225. Client computer 219 may be connected via a communication link 231 to a pharmacy information system (PIS) 233 residing on a server 235. PIS 233 may pass each prescription order to system 10 and client computer 219 after a prescription order is first approved by PIS 233. Computer 219 of controller 21 need not be a stand alone device as illustrated in FIGS. 5 and 25. For example, computer 219 could be a component of display 25.

Client computer 219 may provide overall control of system 10 including, without limitation, operation of docking station 19, display device 81 and code reader 195 to fulfill any pending prescription order (i.e., a prescription order that has been approved for fulfillment) or other task.

Instructions for loading, verifying, unloading, and performing other tasks for each blister card 13, 15, 17, including the type of medicament 11 required in each well 43, may reside in a separate file residing in database 197 in memory 225 of client computer 219 of controller 21. Each file may contain all information necessary for loading, verifying, unloading, or performing any other task for each blister card 13, 15, 17. The information may include the patient name, physician name, full details of the prescription order including medicament type, strength and quantity, medicament lot number, date and time of day on which medicament 11 is to be taken and the sequence in which the medicaments are to be taken, a reference image or link to a source of a reference image (e.g., First Databank, Inc.) of the physical appearance of the required medicament 11, and any other pertinent information.

The information in each file may include the type of blister card 13, 15, 17 to be used to package the medicaments 11 required to fulfill the prescription order. The blister card 13, 15, 17 designated should have the quantity and arrangement and pattern of wells 43 necessary to fulfill the prescription order. The file may further include instructions regarding the exact medicament(s) 11 required to be in each well 43 of the blister card 13, 15, 17. Database 197 may include instructions with the arrangement and pattern of visible information locations 63 necessary to provide visible information 65 underlying (i.e., proximate) each well 43 of a docked or seated tray 103, 105 for the designated blister card 13, 15, 17.

During system 10 operation, controller 21 may control display device 81 to activate visible information locations 63 which align with openings 161 associated with each well 43 when a tray 103, 105 is docked at a tray-locating position 131 of fixture 99, 101 at docking station 19. The entirety of screen 83, that is anywhere a pixel 92 is located, may comprise a visible information locations 63. Selective operation of screen 83 to activate pixels 92 underlying each well 43 prompts the technician, pharmacist, or other user to load, verify, unload, or take other action with respect to the indicated well 43 associated with the activated visible information location 63 and visible information 65.

Each file may also be updated to create a record (i.e., an archive) of the work performed using system 10. The record may include a record of each medicament 11 in each well 43, a record that the medicament 11 in each well 43 matches the required type and quantity as required by each patient prescription order, a record of any verification that the medicament(s) in each well are correct in accordance with the prescription order and a record of any other information pertinent to the workflow.

It is to be understood that "file" is intended to be a broad term which means or refers to one or more elements of data stored in memory which may be recalled by system 10. It is to be further understood that multiple memory locations may be utilized for storing the data elements relating to each file. Therefore, the term "file" as used herein is intended to refer generally to the data elements necessary for proper loading and management of any given blister card 13, 15, 17.

Referring to FIGS. 5 and 25, system 10 which may be at workstation 26 may include video display 25 (preferably a touchscreen video display), keyboard 236 and mouse 237. A touch screen video display 25, keyboard 236 and mouse 237 are types of user input devices which permit a technician, pharmacist, or other user to input information to client computer 219 of controller 21 or PIS 193. A biometric identification device 239 (FIG. 25) may be provided to permit the technician, pharmacist, or other user to be identified to system 10, particularly when logging on to the system or when performing some other operation with system 10. The biometric device 239 may be a fingerprint reader, retina scanner, or other suitable device. Keyboard 236, mouse 237 and biometric device 239 may be located in a pull-out drawer 238 for workstation 26 organization purposes. Other drawers of workstation 26 shown in FIG. 5 may be for storing supplies such as blister cards 13, 15, 17, closures 51 or other things.

A code reader 195, such as a barcode reader or RFID interrogator may be operably connected to computer 219 of controller 21 via a cable connection, a wireless connection or any suitable connection. Code reader 195 may, for example, be any off-the-shelf device capable of reading a machine-readable identification element (e.g., a barcode, an RFID tag) 175-193 on a fixture 99, 101, a tray-locating position 131, a tray 103, 105 and/or a container 241 provided to hold medicaments 11.

Video display 25 may be a touchscreen display permitting a technician, pharmacist, or other user to input information to controller 21 by simply touching her finger on a desired portion of the display 25. Video display may be operably connected to computer 219 through a cable 240. Keyboard 236 may be an off-the-shelf QWERTY-type keyboard 236 permitting a user to input information to controller 21 and system 10. A touchscreen video display 25, code reader 195, keyboard 236, mouse 237, and biometric device 239 are all types of input devices 23 which enable a user to input information to controller 21 and system 10.

A printer 243 may be provided for printing information on a closure 51 as described below. Printer 243 may, for example, be any off-the-shelf printer, such as a laser printer or an ink jet printer. Printer 243 may be operably connected to computer 219 of controller 21 via a cable connection, a wireless connection or any suitable connection.

Figure 42:
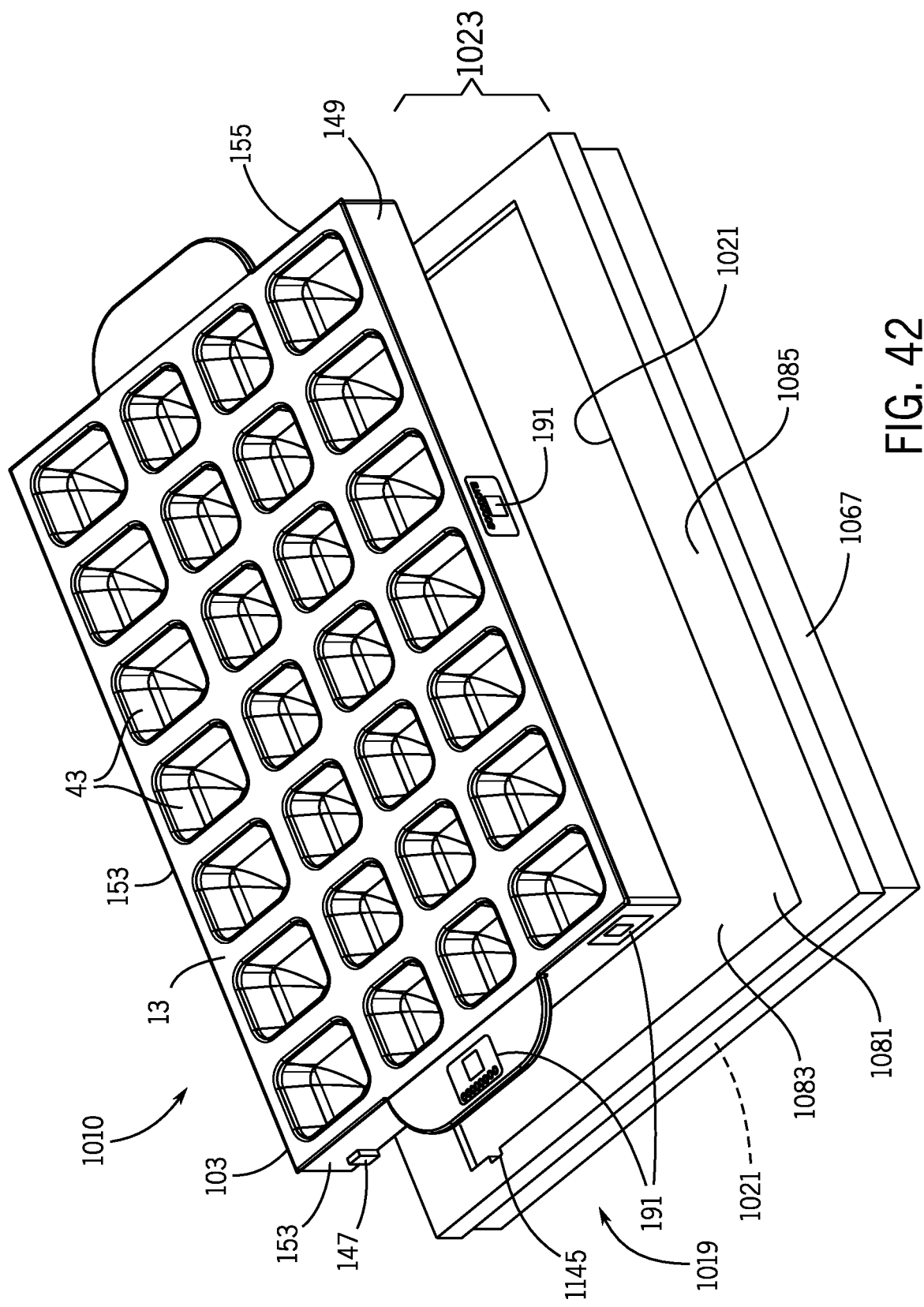
FIG. 42 is a perspective view of a further embodiment of a compartmentalized container loading system according to the invention.

FIG. 42 illustrates a further embodiment of a compartmentalized container loading system 1010. System 1010 may include a docking station 1019, a controller 1021 and a tray locator 1023. In this example, system 1010 may be used with a single tray, such as tray 103, 105 and may be used with a compartmentalized container such as blister card 13, 15, 17. For convenience and brevity, the description of trays 103, 105 and blister cards 13, 15, 17 is incorporated herein by reference.

According to the example of FIG. 42, docking station 1019 may comprise a low-profile, compact computer-controlled display device 1081, such as a flat-panel display or even a tablet-type device such as an Android or Apple iOS tablet device. Display device 1081 may be a type of video display. Display device 1081 may include a screen 1083 having controllable pixel elements as described in connection with screen 83 and pixels 92.

Controller 1021 may be located within housing 1067 and may have the same capabilities as previously described in connection with controller 21 and computer 219. Controller may be connected with any peripheral device, examples of which may be a video display such as display 25, a PIS such as PIS 235 and any other suitable device (e.g., a code reader 195, a keyboard and mouse 236, 237, a biometric device 239, a printer 243, etc.) by any suitable means such as by a cable and/or wireless connections.

Display device 1081 may have a screen 1083 which with an area sufficient to dock (i.e., receive) a single tray, such as tray 103. Tray 103 may rest atop screen 1083 in the example. Controllable light producing elements, such as the previously-described pixels 92, at any location(s) of screen 1083 may comprise a visible information location 1063 which may be activated to provide visible information 1065 as was previously described in connection with visible information locations 63 and visible information 65 of docking station 19 and the description of visible information locations and visible information 63, 65 is incorporated herein by reference for system 1010. Therefore, regions of screen 1083 of display device 1081 may be operated to provide visible information 1065 matching the number and the arrangement and pattern of wells 43 of any blister card 13, 15, 17.

In the example of FIG. 42, a tray locator 1023 may comprise bezel 1085 of display device 1081 and inner edge 1121 of bezel 1085. Inner edge 1121 may have length and width dimensions slightly larger than those defined by sides 149-153 of tray 103, 105 so that tray 103, 105 is received in a single location over screen 1083. A projection 147 on tray 103, 105 may mate with notch 1145 on bezel 1085 to ensure that tray 103, 105 is in a single orientation with wells 43 at know positions over screen 1083 of display device 1081 of docking station 1019.

The system 1010 of FIG. 42 may be used in the same manner as previously described in connection with system 10 to hand-load, verify, unload or otherwise act on each well of blister card 13, 15, 17. System 1010 exemplifies that docking station 1019, controller 1021 and tray locator 1023 may be configured in various ways in accordance with the invention, including in a compact manner which may be useful to meet the needs of a broader range of pharmacies and other users.

Referring now to FIGS. 38-41, another unique aspect of system 10 is an optional sealing workstation 245 for efficient application of a closure 51 over top side 31 of blister card body 27 to close openings 47 of blister card 13, 15, 17 and provide a finished package. Closure 51 preferably provides a hermetic seal over blister card 13, 15, 17 preventing medicaments 11 in wells 43 from coming into contact with ambient air or contaminants.

Figure 38:
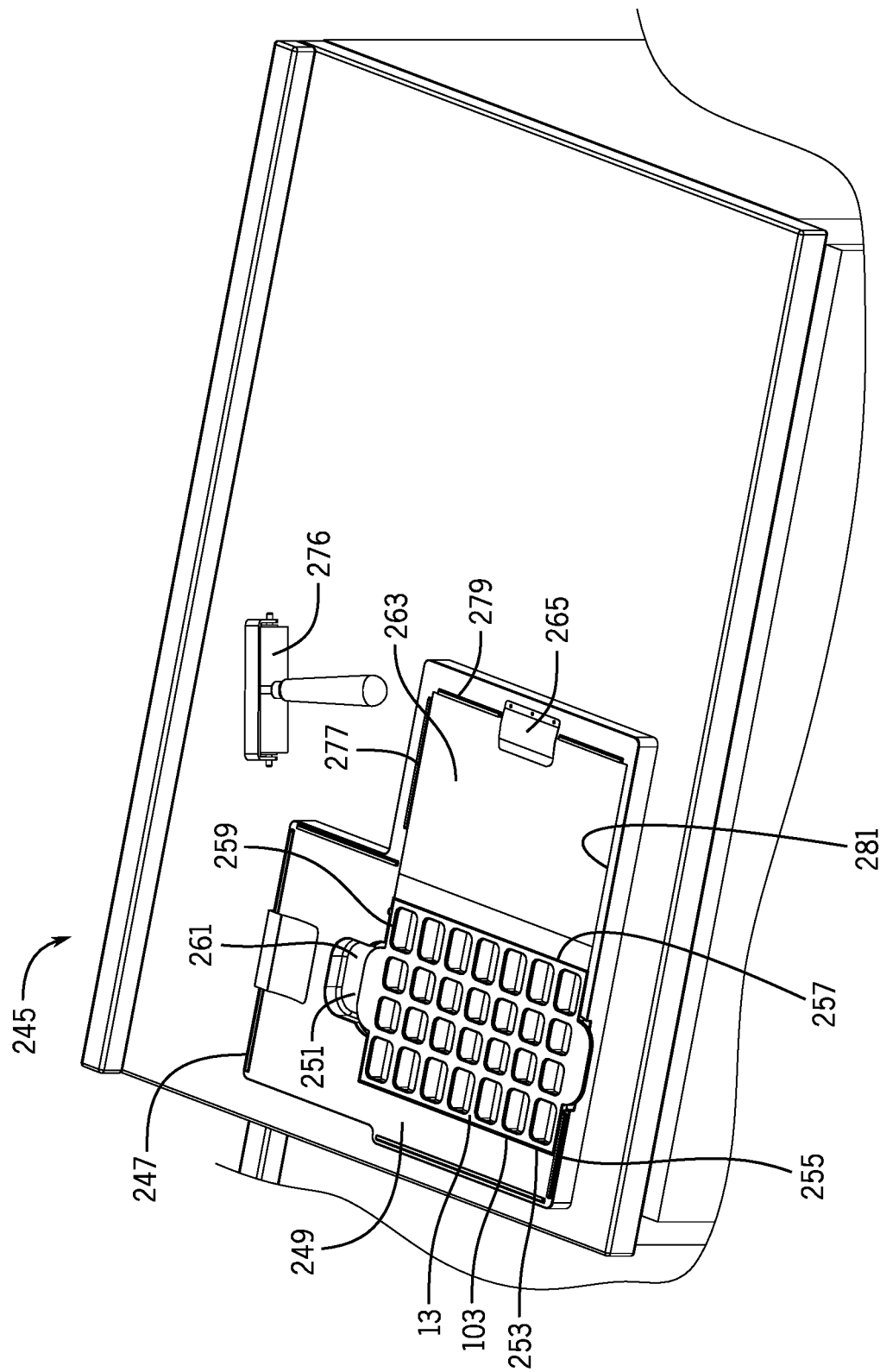
FIGS. 38-41 are perspective views illustrating an exemplary blister card sealing station and tri-panel closure which may be applied by means of the sealing station.
Figure 39:
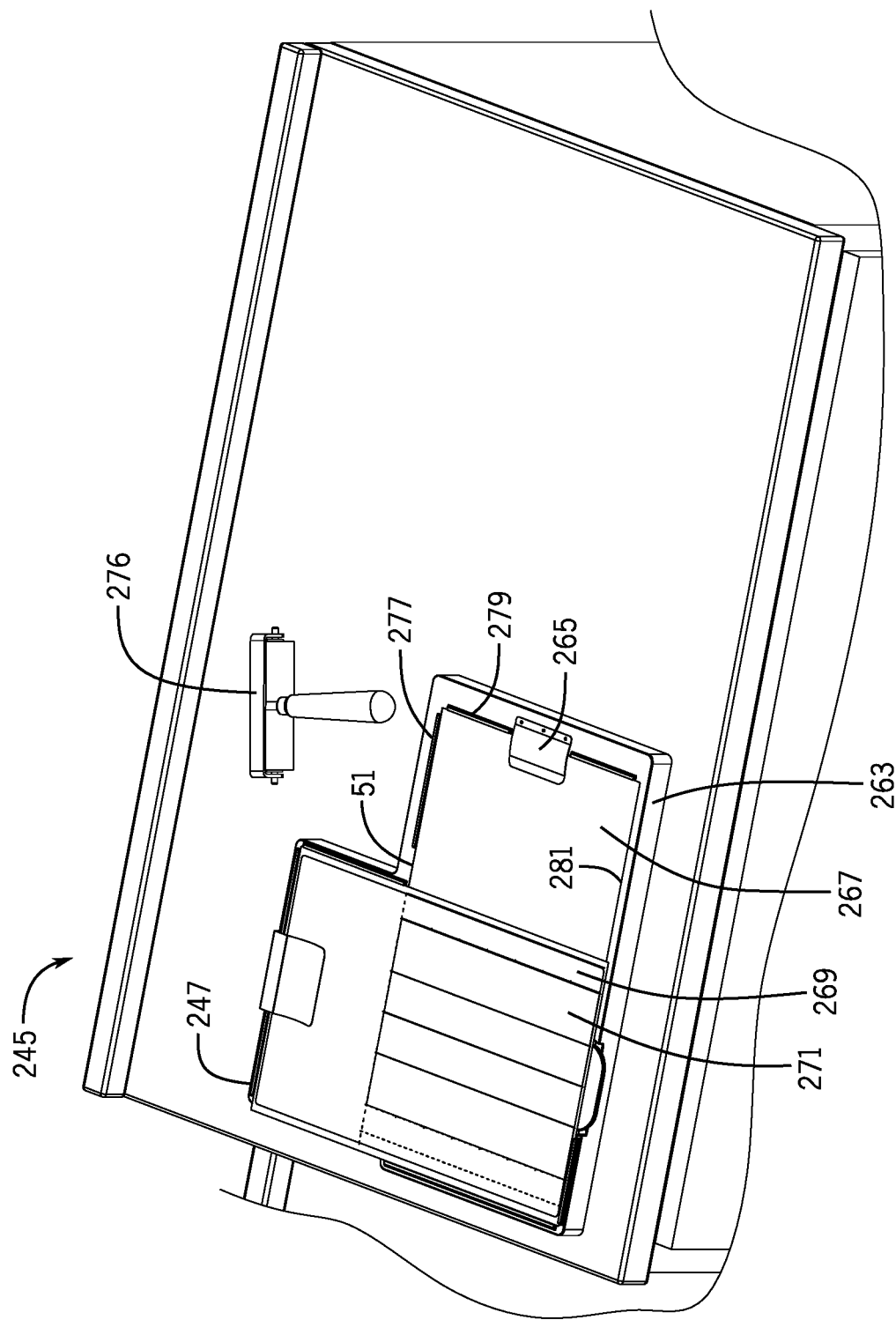

Referring to FIGS. 38-39, workstation 245 may include a fixture 247 for holding and locating a tray 103, 105 at a repeatable position for closing, preferably by a human user. Fixture 247 may have an interchangeable dock 249 which holds a single size of tray 103, 105 in a single repeatable position. Dock 249 may be interchanged with a different dock that holds a different size of tray 103, 105. Interchangeable dock 249 may have an opening 251 defined by side walls 253, 255, 257, 259 and bottom 261. Walls 253-259 and bottom 261 may be sized to closely approximate the size of one type of tray 103, 105 to form a close fit with a tray 103 or 105 to hold such tray 103, 105 in a repeatable position for closure. A properly sized tray 103, 105 including a loaded blister card 13, 15, 17 is seated in dock 249.

Fixture 247 may further include a platform 263 on which a closure 51 rests for attachment to blister card 13, 15, 17 in a single position. A clip 265 may be provided on fixture 247 to hold closure 51 against platform 263 in a position for attachment to top side 31 of blister card 13, 15, 17 in the single and repeatable manner.

Referring to FIGS. 38-41, closure 51 may be of the types previously described. In other embodiments closure 51 may comprise a unique tri-panel closure 51 which provides a folio-type closure of blister card 13, 15, 17. The tri-panel closure 51 may be a one-piece unit comprising a front panel 267, a spine 269 and a cover panel 271. Front panel 267 may be joined to spine 269 and spine 269 may be joined to cover panel 271 each by separate folds forming a type of hinge enabling front panel 267 and spine 269 to wrap around bottom side 33 of blister card 13, 15, 17 in the direction of arrow 272 as illustrated for example in FIG. 41. Front panel 267 may be swung in the direction opposite of arrow 272 to allow a person to view the contents of each well 43 if well 43 wall 45 and bottoms 49 are transparent or sufficiently light-transmissible to allow the well 43 contents to be viewed through body 27 of blister card 13, 15, 17.

Cover panel 271 may be of a thin material with an adhesive coated side 273 covered by a removable release liner 275. With front panel 267 on platform in a single position confined by guide ribs 277-281, cover 271 can be folded back atop front panel 267. Release liner 275 will be facing up and toward the user. Release liner 275 may next be peeled off of adhesive-coated side 273 by the user. After removal of release liner 275, cover panel 271 may be folded away from front panel 267 so that adhesive-coated side 273 may be joined to top side 31 of blister card 13, 15, 17 by the adhesive. A roller 276 may be provided to press adhesive-coated side 273 against top side 31 of blister card 13, 15, 17. Because guide ribs 277-281 hold front panel 267 in a single position, cover panel 271 is in a position which aligns cover panel 271 precisely over blister card 13 so that any printed information on cover panel aligns precisely with each well 43 for which the information is applicable.

Figure 40:
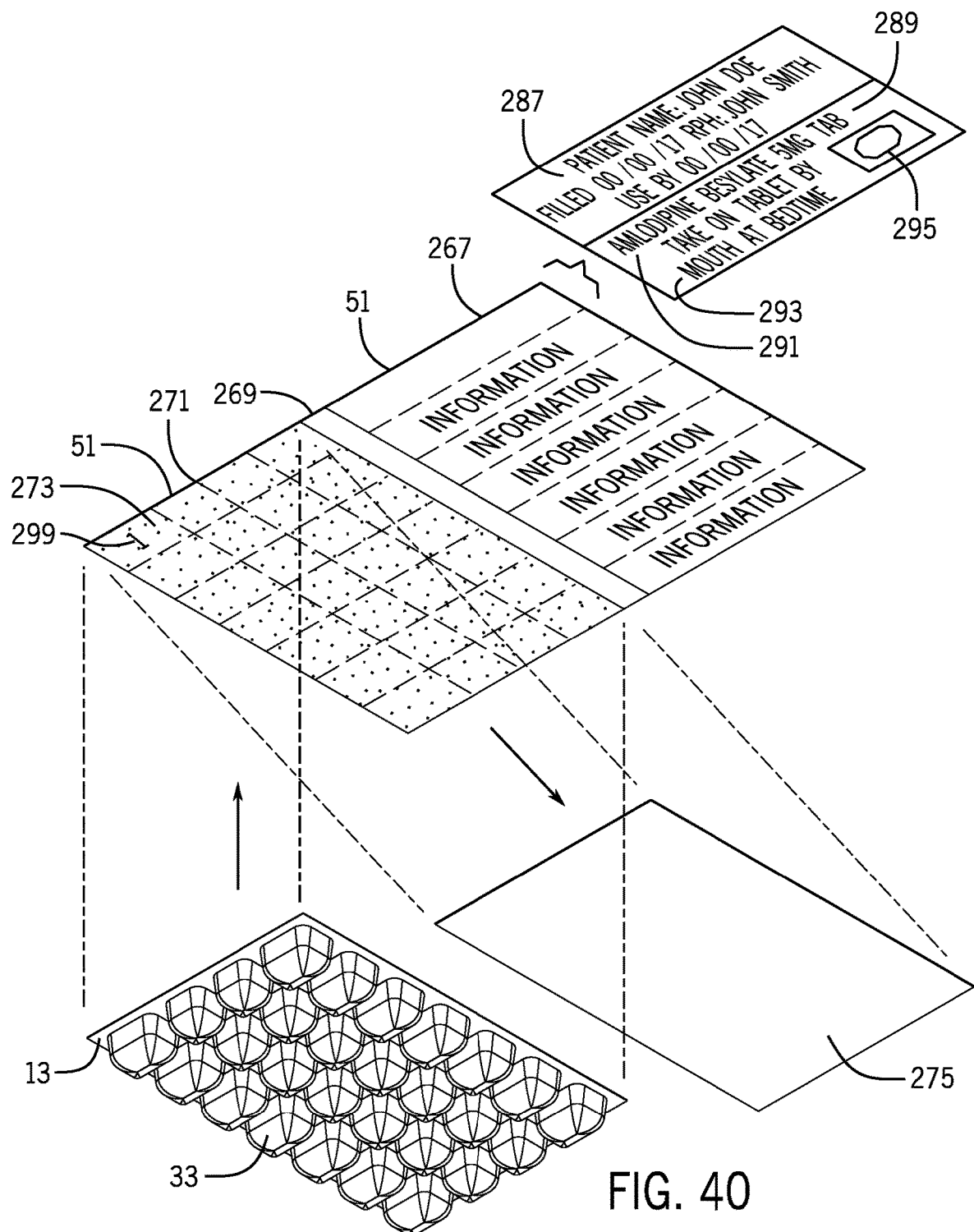
Figure 41:
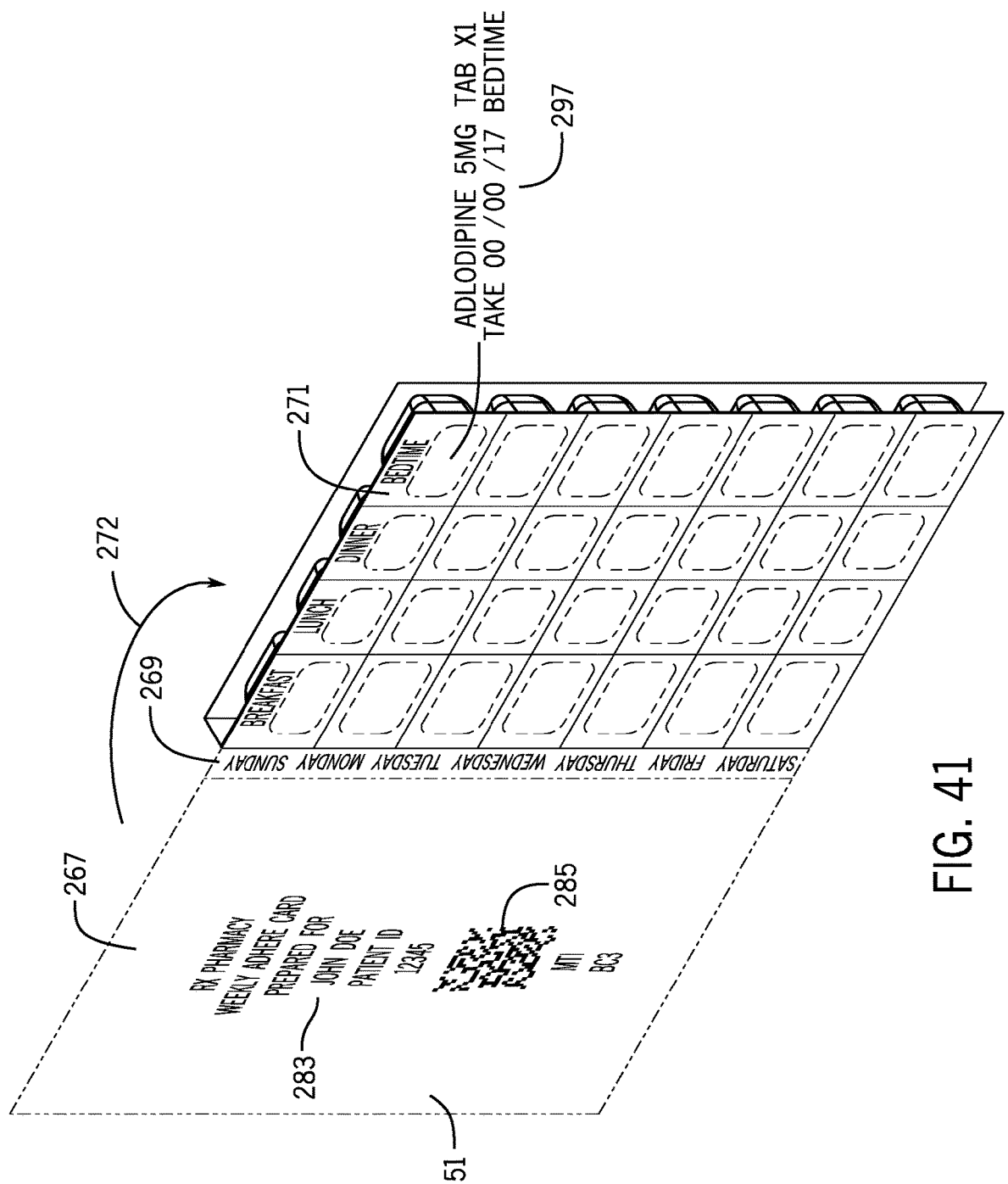

Referring to FIGS. 40-41, information may be provided on closure 51 to assist the pharmacy in managing the closed blister card 13, 15, 17 and to assist the patient in taking the medicaments in accordance with the prescription order. For instance, closure 51 front panel 267 may include information such as the patient name and a unique patient identifier 283 (e.g., "John Doe Patient ID 12345"). The information on front panel 267 may also include a unique machine-readable identification element 285 (e.g., a barcode, an RFID tag, etc.) enabling the closed blister card 13, 15, 17 to be tracked and enabling all data pertaining to the blister card 13, 15, 17 to be made available to the caregiver or patient.

Referring to FIG. 40, information 287 on an inside surface of front panel 267 (i.e., facing bottom 33 of blister card 13, 15, 17) can include the patient name, date of prescription filling, and name of the Registered Pharmacist who verified the contents of the blister card 13, 15, 17 and an expiration date by which the medicaments 11 of the blister card 13, 15, 17 must be taken. Also as indicated on FIG. 40, medicament-specific information 289 can be provided for each medicament packaged in the blister card, an example of which is provided for Amlodipine Besylate. For convenience and brevity, just one example of this information 289 is amplified in FIG. 40, it being understood that similar information 289 for each medicament 11 in blister card 13, 15, 17 may be represented by each use of the word "Information" on front cover 267 in FIG. 40. The medicament-specific information 289 may include the medicament name and strength 291, instructions 293 for taking each medicament including the time of day the medicament is to be taken (e.g., breakfast, lunch, dinner, and/or bedtime) and a reference image 295 of the medicament. Other information such as refill information, lot number and expiration date may also be provided as desired.

As illustrated in FIG. 41, cover panel 271 opposite and over each well 43 may include well-specific information 297 further identifying the contents of each well 43. For convenience and brevity, just one example of this well-specific information 297 is illustrated in FIG. 41, it being understood that the well-specific information 297 may be provided for the contents of each of the 27 other wells 43. Well-specific information 297 may include the medicament name, quantity, and date and time of day on which the contents of the well 43 should be pushed through cover panel 271, removed from the well 43, and taken by the patient.

As illustrated in FIG. 40, an Arabic number 299 may be provided on cover panel 271 adhesive-coated side 273 facing and over each blister card 13 well 43. In the example, number 299 is indicated as "1". The number 299 may indicate the quantity of medicaments 11 that should be in the corresponding well 43. The number 299 may be visible through the light-transmissive well wall 45 so that a person can conveniently determine whether the correct quantity of medicaments 11 are in the well 43 without removing closure 51.

An advantage of sealing workstation 245 is the ease and accuracy with which closure 51 may be joined to blister card 13, 15, 17 and the opportunity for more reliable formation of a complete closure of blister card 13, 15, 17. In the example, the top side 107 of a tray 103, 105 may be in the same plane as platform 263 when the tray 103, 105 is docked in fixture 247 of sealing workstation 245. The top side 107 of tray 103, 105 may provide a rigid structure supporting blister card 13, 105, 17. The rigidity of top side 107 may be important because blister card 13, 15, 17 may be of a thin, deformable material as previously described. With wells 43 inserted through openings 161 of tray 103, 105, the blister card 13, 15, 17 bottom side 33 portions between wells 43 may rest directly on the top side 107 of tray 103, 105 providing a non-deformable surface against which a force can be applied. Consequently, a user can press roller 276 firmly against cover panel 271 to better and more completely adhere adhesive side 273 against top side 31 of blister card 13, 15, 17 making the closure process faster and easier and assuring formation of a hermetic seal of blister card 13, 15, 17. The process also ensures correct alignment of cover panel 271 with any information thereon property aligned with each well 43 of the closed blister card 13, 15, 17. As was described, the process of attaching cover panel 271 to top side 31 of blister card 13, 15, 17 may be made more efficient by means of fixture 247 which precisely aligns cover panel 271 for attachment to blister card 13 so that any information on cover panel is always correctly associated with the well 43 to which the information applies.

Examples of workflow and certain methods of use of system 10 will now be described in connection with FIGS. 26-37. FIGS. 26-37 represent exemplary screen displays of a type which may be displayed to a technician, pharmacist, or other user on display 25 for purposes of implementing aspects of system 10 workflow to load or otherwise manage blister card 13, 15, 17 and medicaments 11 or other items to be packaged in a blister card 13, 15, 17 or other type of compartmentalized container. The screen displays of FIGS. 26-37 are described herein in connection with exemplary workflow pertaining to the embodiment of FIGS. 5-16 and 25, it being understood that the workflow may be similar for other embodiments of system 10, such as the alternative embodiment of FIGS. 17-25.

The screen displays of FIGS. 26-37 are intended to represent non-limiting examples of aspects of exemplary workflow. The content and number of screen displays may be modified and the information provided in the screen displays may be customized to meet the needs of the particular retail pharmacy, hospital pharmacy, long-term care facility pharmacy, mail-order pharmacy, or other operator. The selected workflow described herein is intended to be an example for a fictitious patient.

Figure 26:
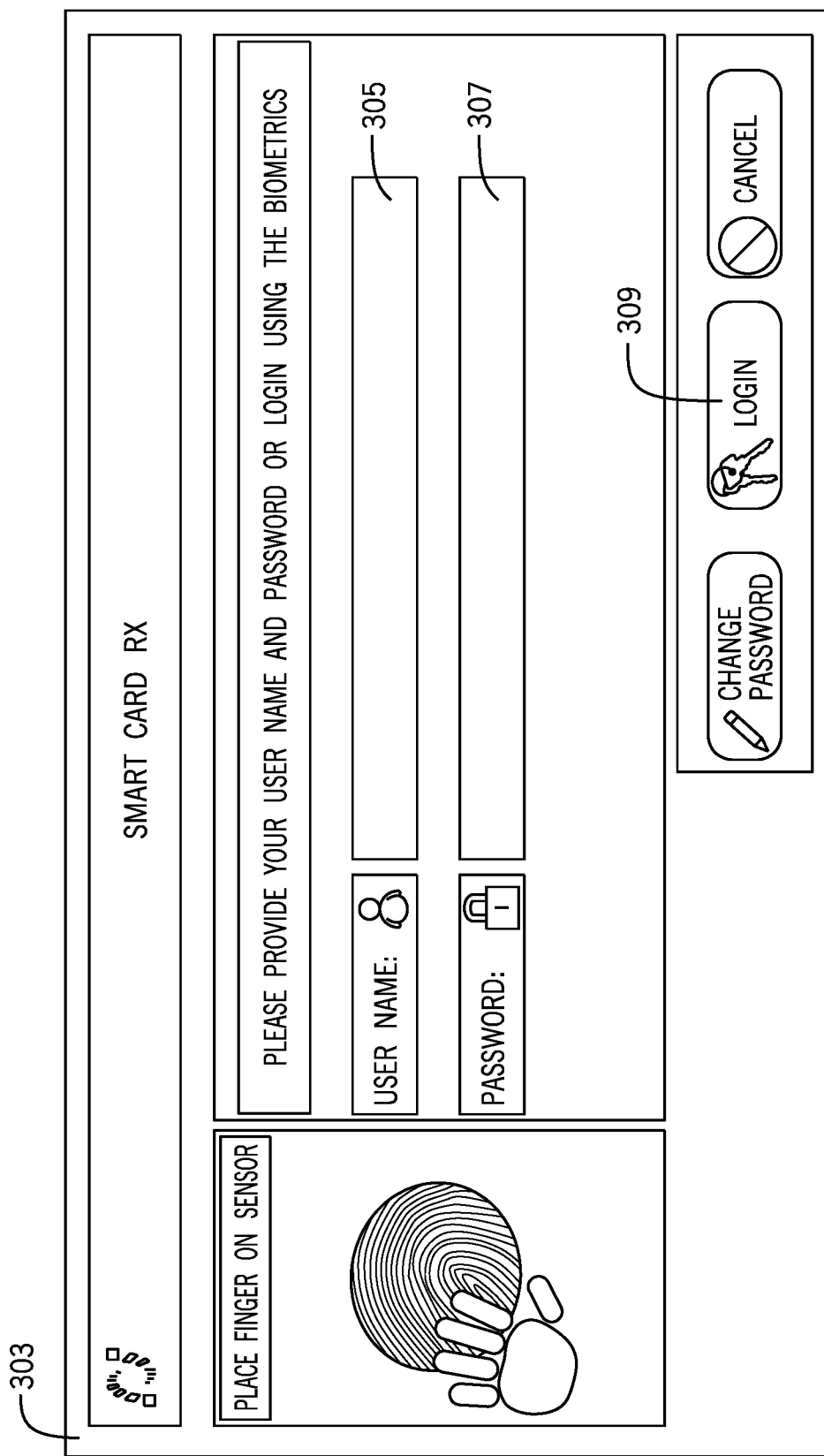

Referring first to FIG. 26, a technician, registered pharmacist, or other user may initiate use of system 10 by logging into system 10 by means of biometric reader 239 (FIG. 25), which may be at workstation 26. Loading of a blister card 13, 15, 17 may be performed by a technician while verification of the loaded blister card 13, 15, 17 may be performed by a registered pharmacist, although regulatory requirements can differ from jurisdiction to jurisdiction.

Referring again to FIG. 26, the user may be prompted to login to system 10 by login screen 303 displayed on video display 25. The user may login to the system 10 in various ways such as by a fingerprint scan with biometric device 239 or by keying his or her name and password into the name and password fields 305, 307 using keyboard 236 followed by selecting Login button 309. Display 25 may be a touchscreen video display and, if so, the user can merely tap the screen surface adjacent Login button 309 or other icon or button to input information from the user to system 10. The user's password information may be transmitted to client computer 219, to PIS 233 residing on server 235, or to another suitable computer or controller, whereupon the user's status may be validated to use system 10.

Figure 27:
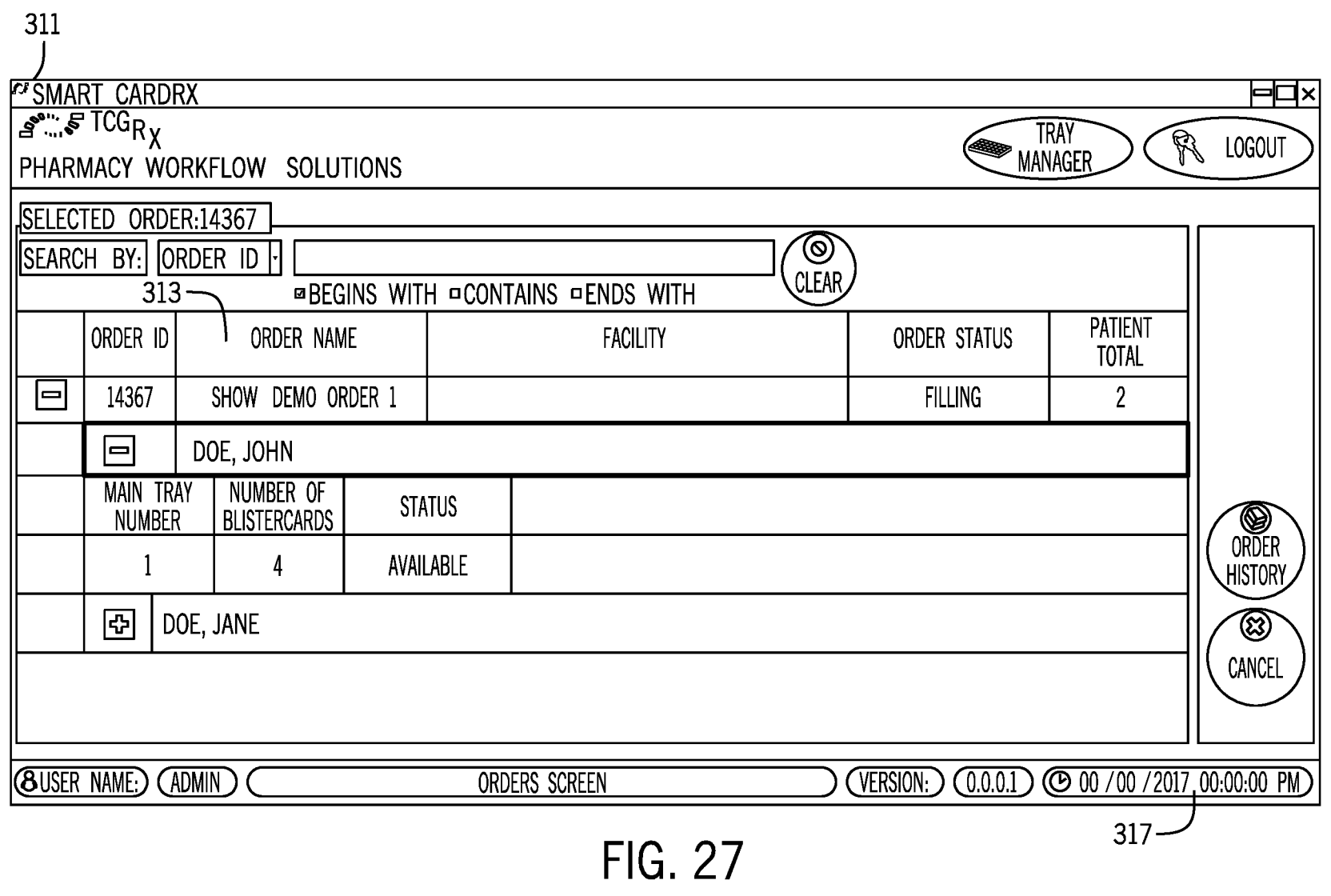
Figure 28:
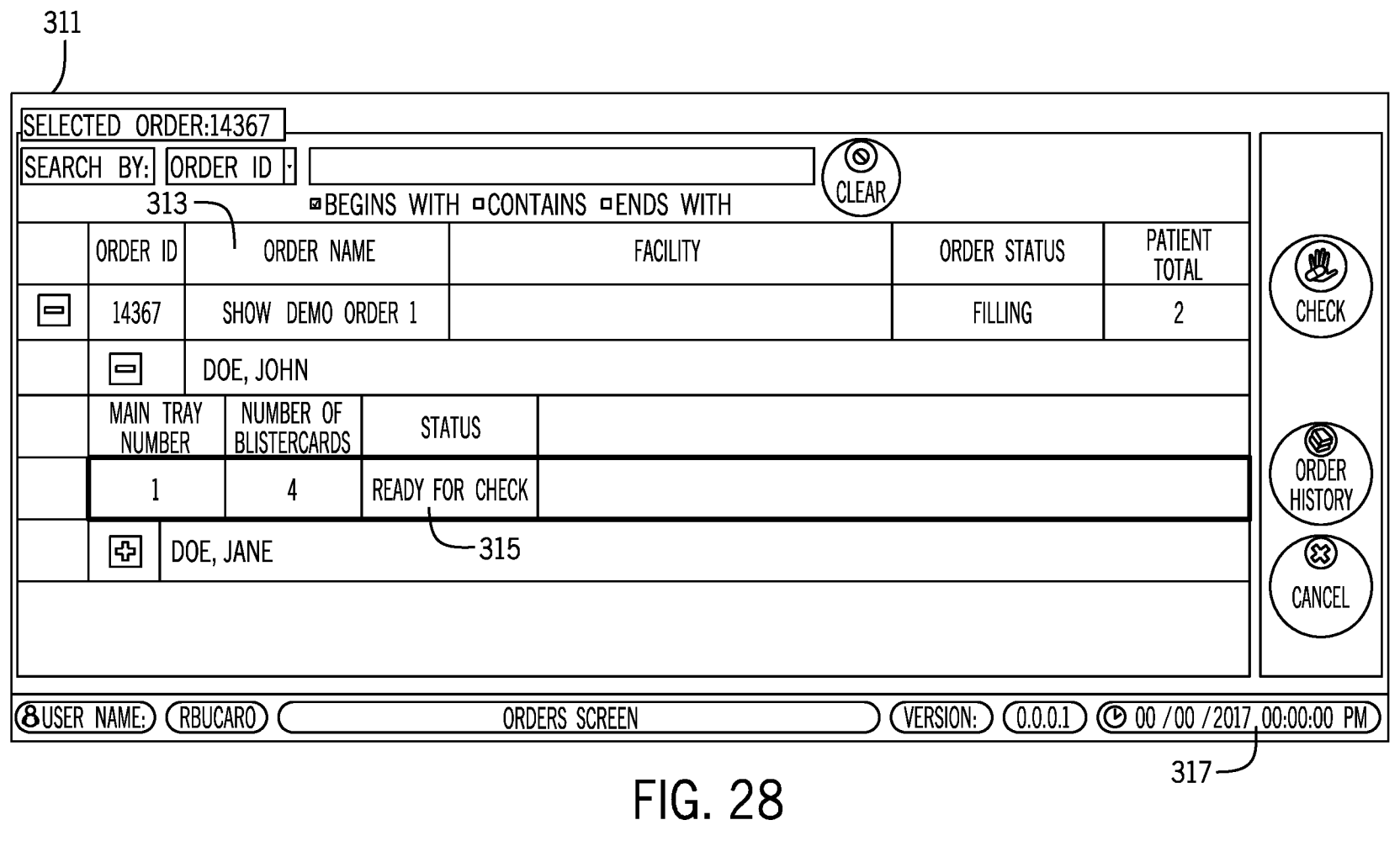

Referring now to FIGS. 27-28, the user may next be presented with an Orders Screen 311 showing pending prescription orders awaiting fulfillment with system 10. In the examples, Order Name field 313 shows that two patients, John Doe and Jane Doe, have prescription orders awaiting fulfillment. All information relating to loading, verification and overall fulfillment of the prescription orders for the two patients shown on FIGS. 27-28 may be stored in database 197 residing in computer 219 or server 235.

Also in database 197 for each prescription order may be a record of the blister card(s) 13 needed to fulfill the prescription orders for patients John Doe and, separately, for Jane Doe, together with the type of fixture 99 and tray(s) 103 needed to support the blister card 13 over screen 83 of display device 81. System 10 may have a record of the exact location over screen 83 for the wells 43 of blister card 13 when supported by the associated fixture 99 and tray 103 and this information may be in database 197. With this information, controller 21 may call up a record from database 197 of the position of each well 43 over screen 83 of display device 81 and may assign an arrangement and pattern of visible information locations 63 on screen 83 of display device 81 so that each region of pixels 92 under each well 43 is designated as a visible information location 63.

FIGS. 27-28 indicate that four blister cards (e.g., blister card 13) await fulfillment for fictitious patient John Doe and that a fixture 99 (referred to as "Main Tray" in the figures) designated "1" has been assigned to processing of the four blister cards 13. Tapping on screen 83 next to patient name John Doe in Order Name field 313 calls patient Doe's prescription order for fulfilment from the queue of pending prescription orders residing in database 197. After selecting John Doe's name, field 313 is highlighted (e.g., with a bolded border) and the status of the order is changed to "ReadyForCheck" 315 (FIG. 28). Other relevant information may be presented on any of the screen displays, such as current date and time of day information 317 shown as null values representative of the fictitious nature of the patient transaction.

Figure 29:
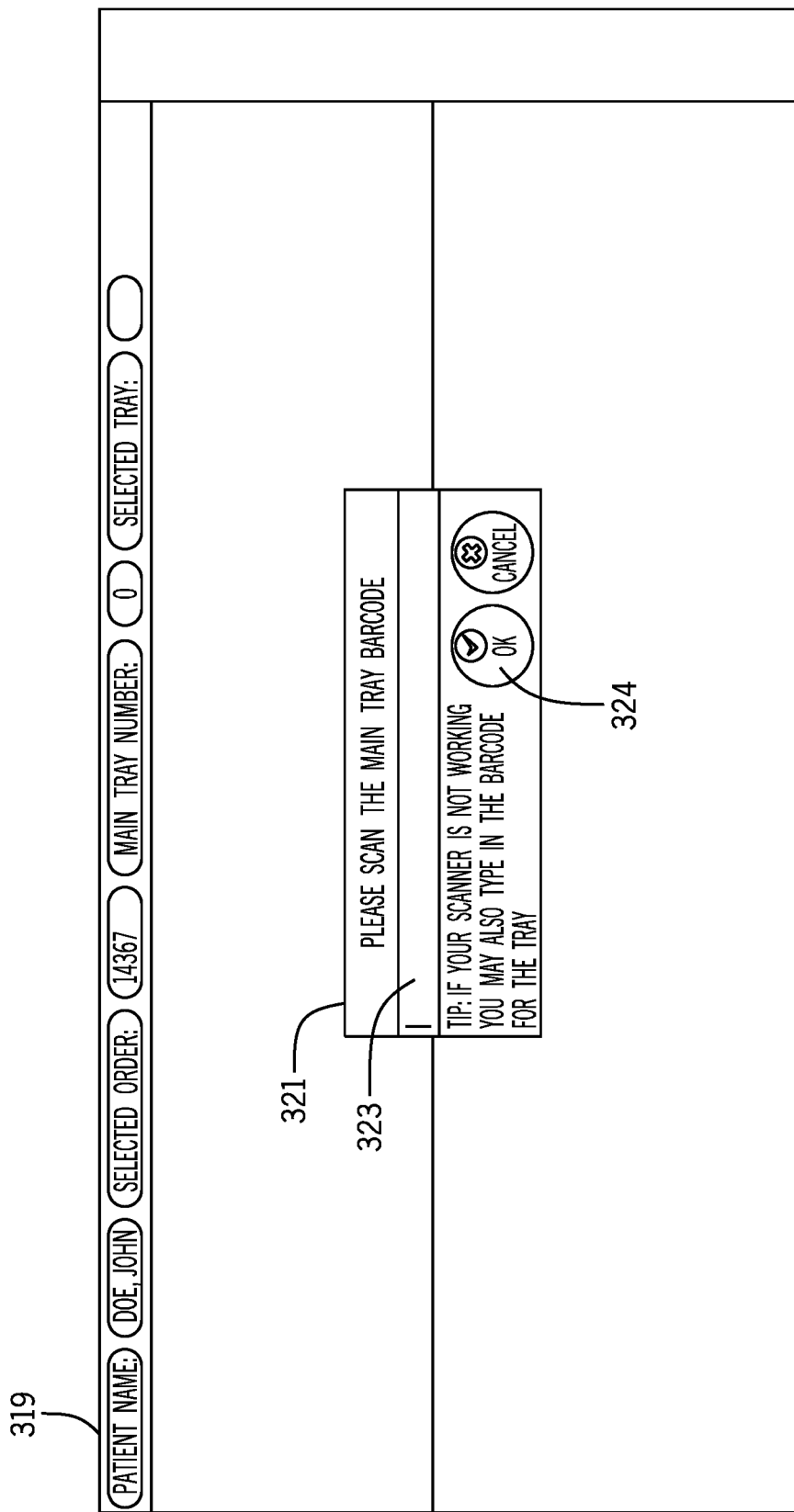

Referring next to FIG. 29, the Select Fixture screen 319 appears on display 25, prompting the user to select one of the assigned empty fixtures 99. (In the examples, the fixture 99 is again referred to as a "Main Tray"). The fixture 99 may be selected from what may be a plurality of empty fixtures 99 used by the pharmacy. In this example, the fixture 99 assigned by system 10 to the prescription order and to be selected by the user is a 4-position fixture 99 of the type illustrated in FIGS. 5-14 as indicated by the instructions in database 197 in this example. Window 321 prompts the user to scan the machine-readable identification element 175 on a handle 125 of fixture 99 designated with the number "1". As previously described, any machine-readable identification element 175 may suffice. A 2-D barcode is an example. The user may also be prompted to manually enter the fixture 99 machine-readable identification element 175 ("1" in this example) into field 323 using keyboard 235 and/or mouse followed by touching Ok button 324 to indicate to system 10 that the information identifying the selected fixture 99 has been added to field 323. As a result of the foregoing steps, a record may be created in the file for patient John Doe's prescription order which may reside in database 197 that fixture 99 is associated with patient John Doe's prescription order. Fixture 99 may be placed upon docking station 19 over display device 81 screen 83 bounded by bezel inner edge 121 in a single position to await assignment of blister card trays 103 to the prescription order.

Figure 30:
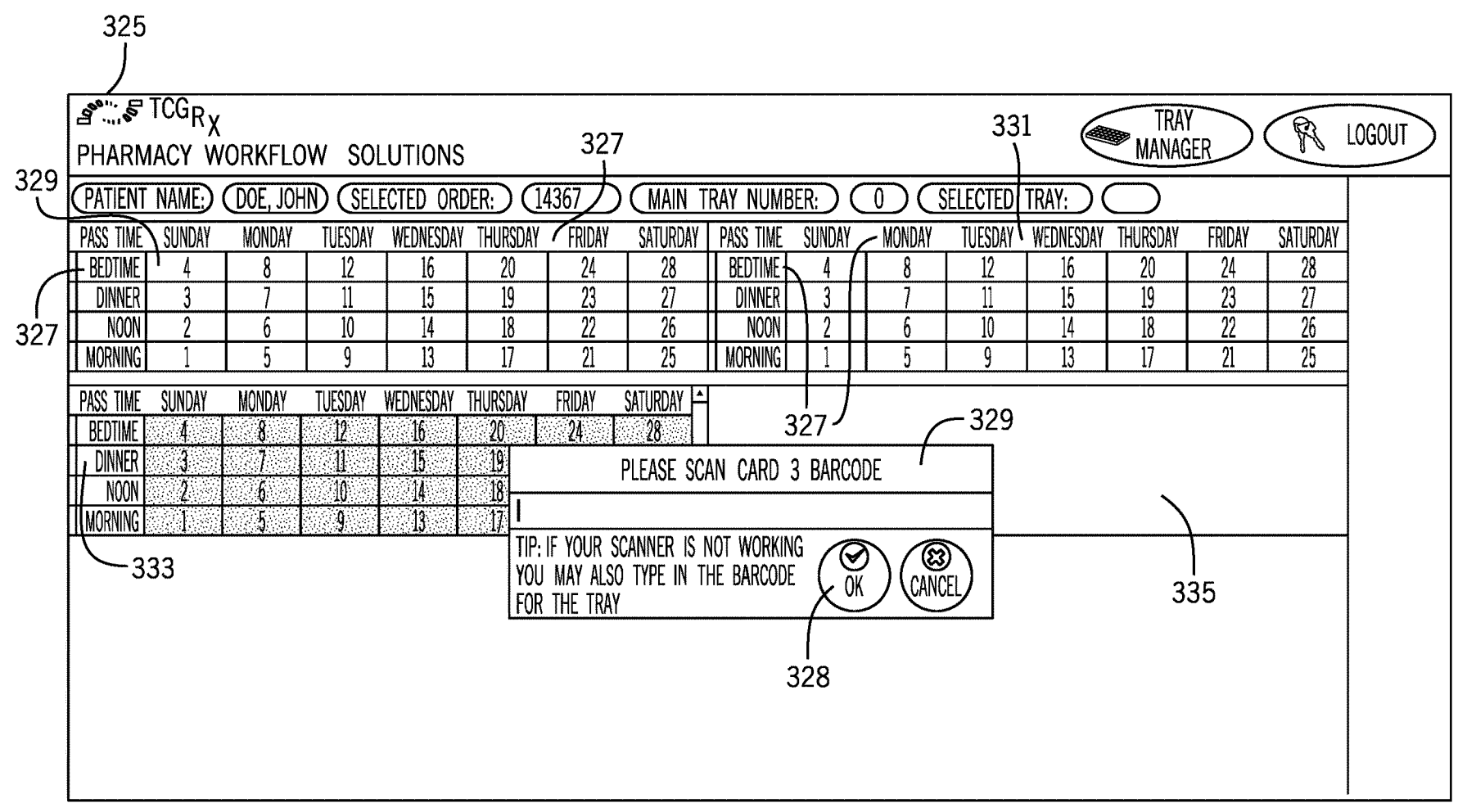

Turning next to FIG. 30, Select Blister Card Tray screen 325 may appear on display 25 once a record is created that fixture 99 has been associated with patient John Doe's prescription order. Select Blister Card Tray screen 325 may prompt the user to associate four blister card trays 103 in a stepwise manner with the fixture 99 and to associate each tray 103 with a known one of the four fixture 99 positions 131 indicated by numbers 1, 2, 3 and 4 on bezel 85.

In this example, the trays 103 assigned by system 10 to the prescription order and to be selected by the user are 28 opening trays 103 of the type illustrated in FIGS. 8, 12, and 13A-16 as indicated by the instructions in database 197 in this example. Select Blister Card Tray screen 325 prompts the user to select a tray 103 of a 28 opening type to support a one week compliance container form of blister card 13 as indicated by the date and time of day instructions 327 information displayed on screen 325. Window 329 may appear to prompt the user to scan the machine-readable identification element 191 which may be on a handle 169 of tray 103. As described above in connection with fixture 103, any machine-readable identification element 191 may suffice and a 2-D barcode is merely one example. Also as with fixture 99, the user may be prompted to manually enter the tray 103 machine-readable identification element 191 into field 331 using keyboard 235 and/or mouse 237 followed by touching Ok button 328 to indicate to system 10 that the information identifying the selected tray 103 has been entered.

Referring again to FIG. 30, separate groups of rectangles 329, 331, 333 each representative of a tray 103 and blister card 13 thereon may be sequentially displayed on Select Blister Card Tray screen 325 as the machine-readable identification element 191 of each tray 103 is read. The user is prompted to place tray 103 at the indicated tray-locating position 131 of fixture 99 by the respective group of rectangles 329, 331, 333 (e.g., positions 1, 2, 3, 4 indicated by reference number 89). Before doing so, the user may scan the machine readable information 179, 181, 183, 185 associated with the indicated tray-locating position 131, thereby associating the unique identifier 191 of each tray 103 with the unique address and position 131 of fixture 99 in the file for patient John Doe's prescription order which may reside in database 197.

Select Blister Card Tray screen 325 may be updated as the machine-readable identification element 191 identifying each tray 103 is added to the record. Select Blister Card Tray screen 325 of FIG. 30 is in a state reflective that two trays 103 have previously been associated with patient John Doe's prescription order as indicated by the presence of the two groups 329, 331 of 28 rectangles in the upper left and right quadrants of FIG. 30 representative of blister card 103 wells 43. In this example, the first two trays 103 would be docked or seated in tray-locating positions 131 as indicated by positions 1 and 2 on bezel 85.

According to the example of FIG. 30, the user is being prompted to read a machine-readable identification element 191 on a third tray 103 as indicated by the difference in appearance of the third group of rectangles 333 in the lower left quadrant of the figure. As a prompt to user, this third group 333 of rectangles may be emphasized by highlighting (e.g., by darkening). A fourth group of rectangles may appear in the lower right quadrant 335 once third tray 103 and machine readable information 185 for the designated tray-locating position 131 is read and a record is created in the prescription order file residing on database 197.

As a result of the foregoing scanning and associating steps, a record is created in the file for patient John Doe's prescription order which may reside in database 197 that four trays 103 and their unique identifiers 191 are docked at a known tray-locating position 131 of fixture 99.

Each tray 103 may be constrained at a tray-locating position 131 of fixture 99 by fixture walls 133-139 and ledges 141, 143, notch 145 and projection 147 in a single position on fixture 99 precisely known to system 10 to await loading of blister cards 13 supported by trays 103.

Figure 31:
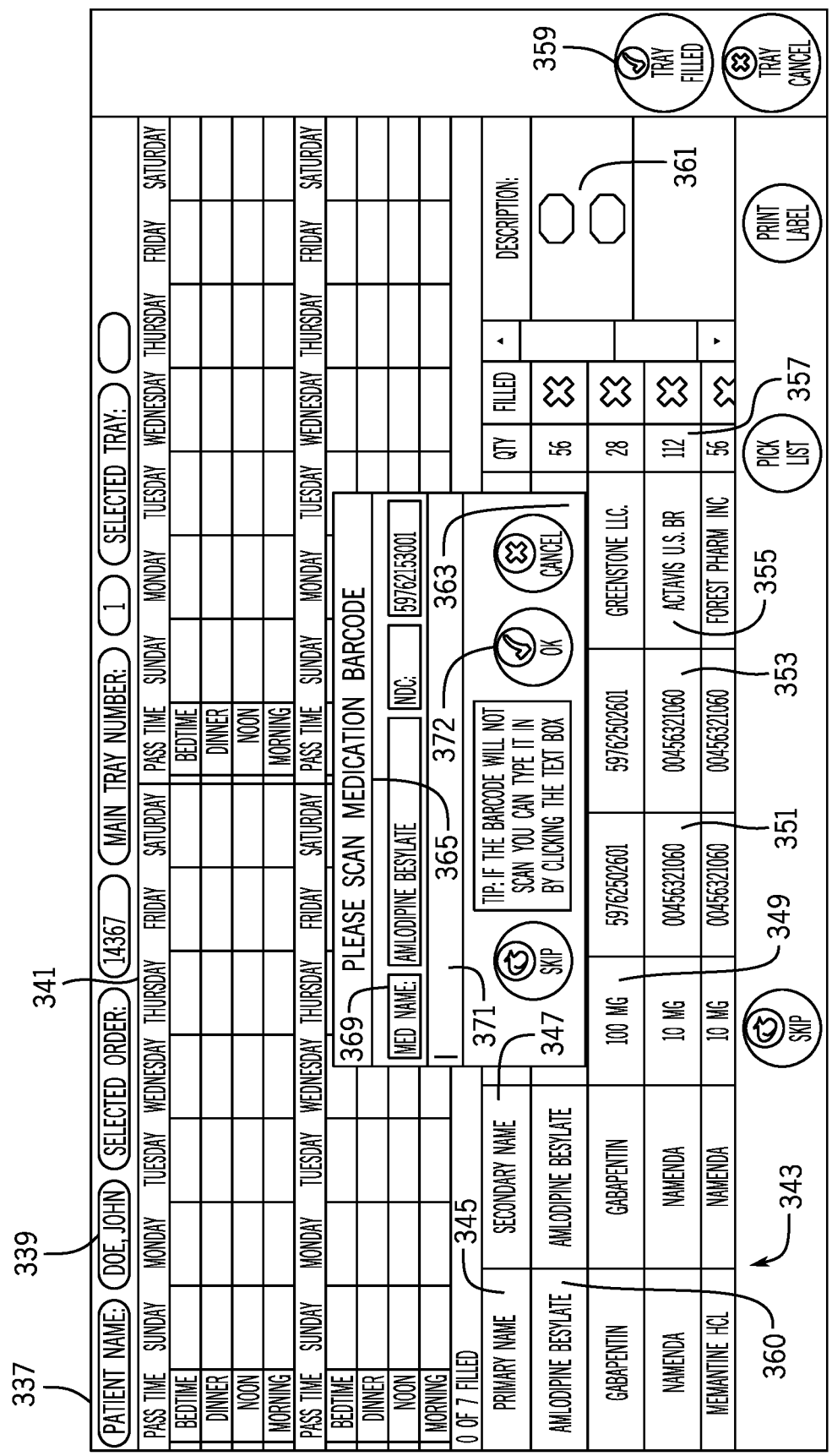

Referring now to FIG. 31, the process of selecting a medicament 11 to be hand-loaded into blister card 13 commences with the Select Drug screen 337. Information which may be presented on Select Drug screen 337 may be stored in the patient's file residing in database 197 and may include a patient name field 339, a tray field 341 indicating that four trays 103 are to be hand-loaded and a medicament type field 343 indicating the types of medicaments 11 to be hand-loaded to fulfill patient John Doe's prescription order. In this example, four different medicament 11 types are required, but any quantity of medicaments may be utilized depending on what is to be loaded in blister card 13, 15, 17. Each medicament type may include fields for the primary and secondary name of medicament 345, 347, medicament strength 349, National Drug Code (NDC) and Customer NDC 351, 353, manufacturer name 355 and quantity 357 required for the four blister cards 13 to be loaded in this example.

A Filled field 359 may be provided to indicate when each medicament 11 has been confirmed as loaded and a reference image 361 field may provide a reference image of the shape, color, or other physical attributes of a medicament 11 selected for hand-loading. All of the aforementioned information may be provided to assist the user in confirming that the correct medicament 11 has been selected for loading into wells 43 of blister packages 13 supported on a tray 103. The information on Select Drug screen 337, like the other screens described herein is an example only and may be modified and supplemented as needed.

Figure 32:
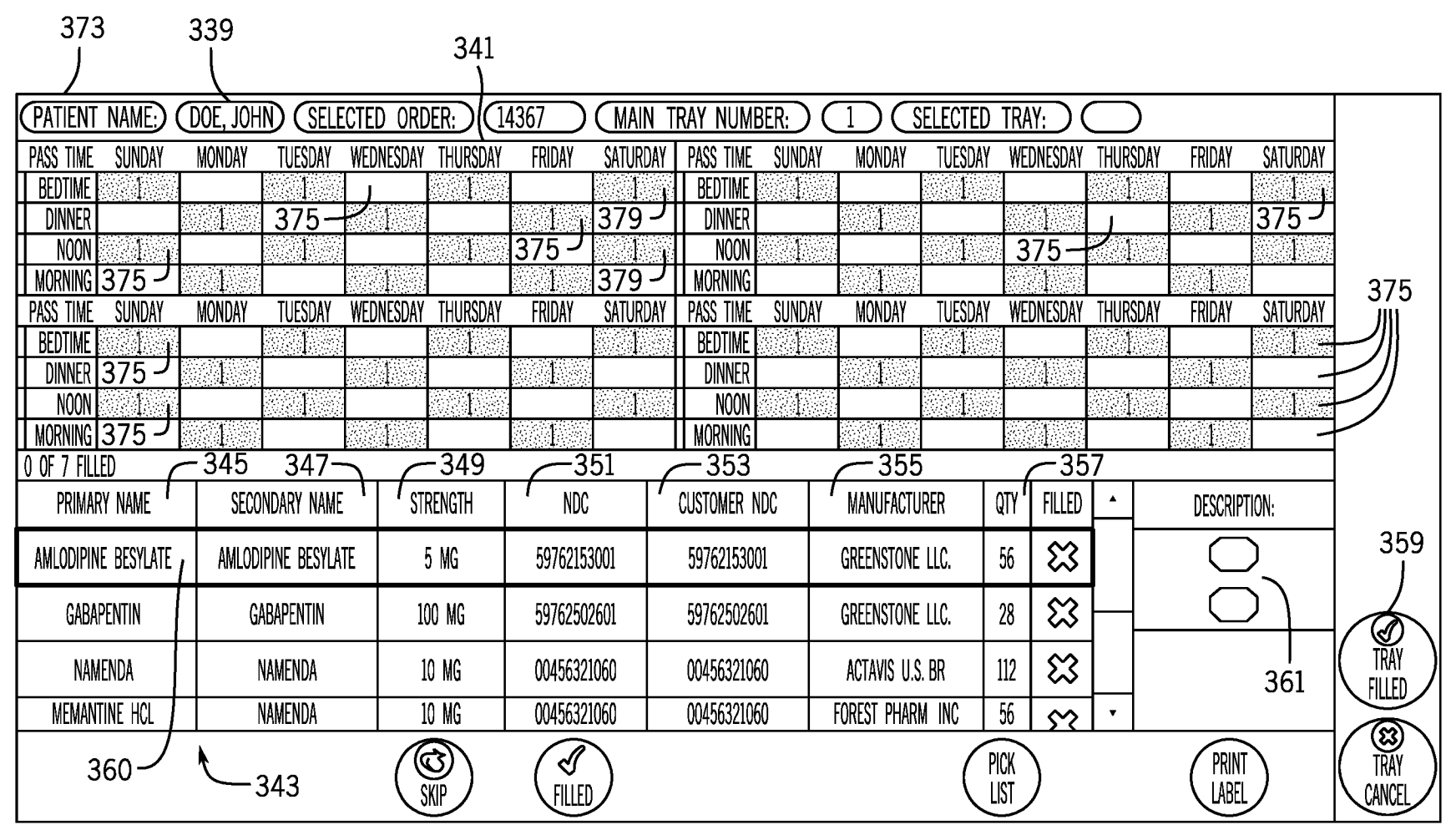

Referring further to FIG. 31 and to FIG. 32, touching of the row 360 of touchscreen display 25 for the medicament 11 Amlodipine Besylate causes that row 360 to be highlighted (FIG. 32), indicating to the user that fulfillment for the selected medicament 11 is in process by system 10. Medicaments 11 in the three other rows remain un-highlighted indicating that these medicaments 11 await selection.

Continuing with FIG. 31, once row 360 for Amlodipine Besylate is touched by the user, window 363 may appear to prompt the user to select a supply container 241 (FIG. 25) of the Amlodipine Besylate from pharmacy stock. Window 363 may display instructions 365 to scan a barcode 367 on supply container 241 with code reader 195. Window 363 may also include a field 369 with the medication name and NDC to enable the user to visually check this information against the corresponding information on supply container 241. The user may be prompted to manually enter the NDC from supply container 241 if the scan is inoperative by keying the NDC into identification field 371 using keyboard 235 and/or mouse 237 followed by touching Ok button 372 to indicate to system 10 that the information from the supply container 241 has been entered into identification field 371.

Referring now to FIG. 32, Loading screen 373 for loading the first type of medicament 11 may next appear on video display 25. In the example, Loading screen 373 may appear if the code of supply container 241 matches the expected code for the Amlodipine Besylate medicament 11 residing in file on database 197. Loading screen 373 may provide the user with the same information as on Select Drug screen 337, including patient name field 339, tray field 341, and medicament type field 343 with the information previously described in connection with FIG. 31. The information on Loading screen 373 may, or course, be modified and supplemented as needed.

Referring again to FIG. 32, tray field 341 indicates four trays 103 and blister cards 13 are to be loaded. Rectangle symbols 375 corresponding to each of the 28 wells 43 of the blister card may be displayed. System 10 may change tray field 341 to highlight (e.g., darken or change the color) the rectangles into which a medicament 11 is to be loaded. A number 379 ("1" in this example), may be displayed in each highlighted rectangle 375 to indicate the number of units of Amlodipine Besylate to be loaded in each highlighted well 43. In this examples, the highlighting (e.g., by darkening or color change) of certain of the rectangles 375 indicates wells 43 that are in the "yes" state and should be loaded with Amlodipine Besylate while the un-highlighted rectangles 375 indicate wells 43 that are in the "no" and which should not be loaded. Other symbology may be utilized. All that is needed is some way to differentiate between the "yes" and "no" states.

Referring to FIGS. 10-13A, simultaneously with highlighting of rectangles 375, controller 21 operates display device 81 to activate the regions of pixels 92 of screen 83 providing visible information locations 63 under each well 43 and into which a unit of Amlodipine Besylate is to be hand-loaded by the user. FIG. 12 illustrates that visible information 65 provided by visible information locations 63 is visible to a human user through openings 161 and through the light-transmissive wells 43. FIG. 13A illustrates a unit of Amlodipine Besylate that has been hand-loaded in each indicated well 43. The user is able to see each medicament 11a as it enters each indicated well 43, ensuring accuracy. This loading process is rapid, efficient and easy because the user can immediately visually compare the visible information 65, the well 43 and the medicament to confirm each medicament 11 is in the indicated well 43.

After all highlighted wells 43 have been hand-loaded as required by docking station 19 and by the instructions on Loading screen 373, the user can touch the Filled button 359 providing input to system 10 that all required units of Amlodipine Besylate have been hand loaded into all four trays 103 of this example.

Referring now to FIG. 33, Loading screen 373 may be updated for loading of the next medicament 11. The updated Loading screen 373 may indicate a second type of medicament 11*b* which is to be loaded in blister cards 13 supported by four trays 103 located over display device 81 on docking station 19. The second type of medicament 11 in this example may be Memantine HCL, and the row 360 corresponding to this medicament 11*b* is automatically highlighted on Loading screen 373 by system 10.

The process described in connection with FIGS. 31-32 may then be repeated for the second type of medicament 11*b* following loading screen 373 of FIG. 32. As described previously, a supply container 241 for Memantine HCL may be scan verified by reading a barcode 367 on supply container 241 with code reader 195 to confirm that the container 241 correctly matches John Doe's prescription order.

Also as described previously and as illustrated in the example of FIG. 33, system 10 may change tray field 341 to highlight (e.g., by darkening or color change) the set of rectangles 275 into which a unit of Memantine HCL medicament 11*b* is to be placed. In the example, highlighted rectangle symbols 375 of FIG. 33 are different from those of FIG. 32. A number 379, which again is "1" in this example, may be displayed in each highlighted rectangle 375 to indicate the number of units of Memantine HCL to be placed in each highlighted well 43. The highlighting (e.g., by darkening or color change) of certain rectangles 375 on Loading screen 373 of FIG. 33 indicates the set of wells 43 that are in the "yes" state and that should be loaded with Memantine HCL while un-highlighted rectangles 375 indicate the set of wells 43 that are in the "no" and which should not be loaded.

Referring to FIG. 13B, simultaneously with highlighting of rectangles 375 on Loading screen 373 of FIG. 33, controller 21 may operate display device 81 to activate the regions of pixels 92 of screen 83 providing visible information locations 63 under each well 43 and into which a unit of Memantine HCL is to be hand-loaded by the user. FIG. 13B again illustrates that visible information 65 provided by visible information locations 63 is visible to a human user through openings 161 and through the light-transmissive wells 43. Again, the user is able to see each medicament 11*b* enter the indicated well 43 as the user's hand loads the medicament 11*b* into each indicated well 43, thereby ensuring accuracy. FIG. 13B illustrates that a unit of Memantine HCL medicament 11*b* has been hand-loaded in each indicated well 43 together with the units of Amlodipine Besylate that were previously loaded into the tray 103. Once again, the user can touch Filled button 359 to indicate to system 10 that the required Memantine HCL units have been properly loaded in accordance with the visible information 65.

Loading screen 373 and docking station 19 are then updated for the next medicament 11 to be loaded and the process of hand-loading using visible information 65 provided at visible information locations 63 is repeated until all medicaments 11 are loaded into each blister package 13. A record may be created in the file which may be residing in database 197 that the four trays 103 of this example have been loaded with medicaments 11 as required by John Doe's prescription order.

Preferably, a transparent cover 171 is affixed by the user over each loaded blister card 13 and tray 103 as previously described to keep the medicament 11 contents of each well 43 in place and to protect medicaments 11 from any contamination. Fixture 99 may be lifted from docking station 19 and stacked with other fixtures 99 or otherwise be stored for future verification or sealing of blister cards 13. Or, verification may be performed immediately after completion of the hand-loading.

Figure 34:
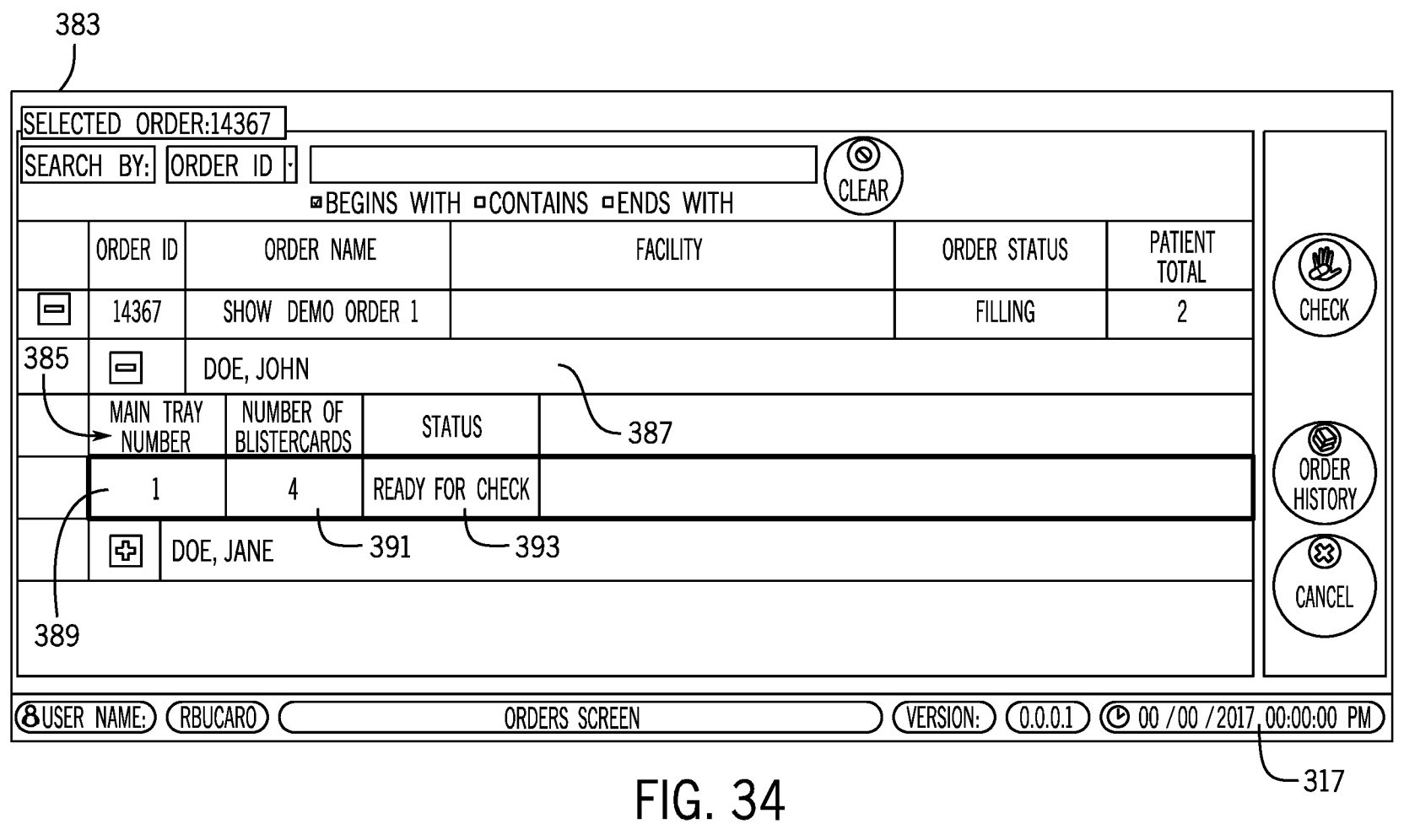
Figure 35:
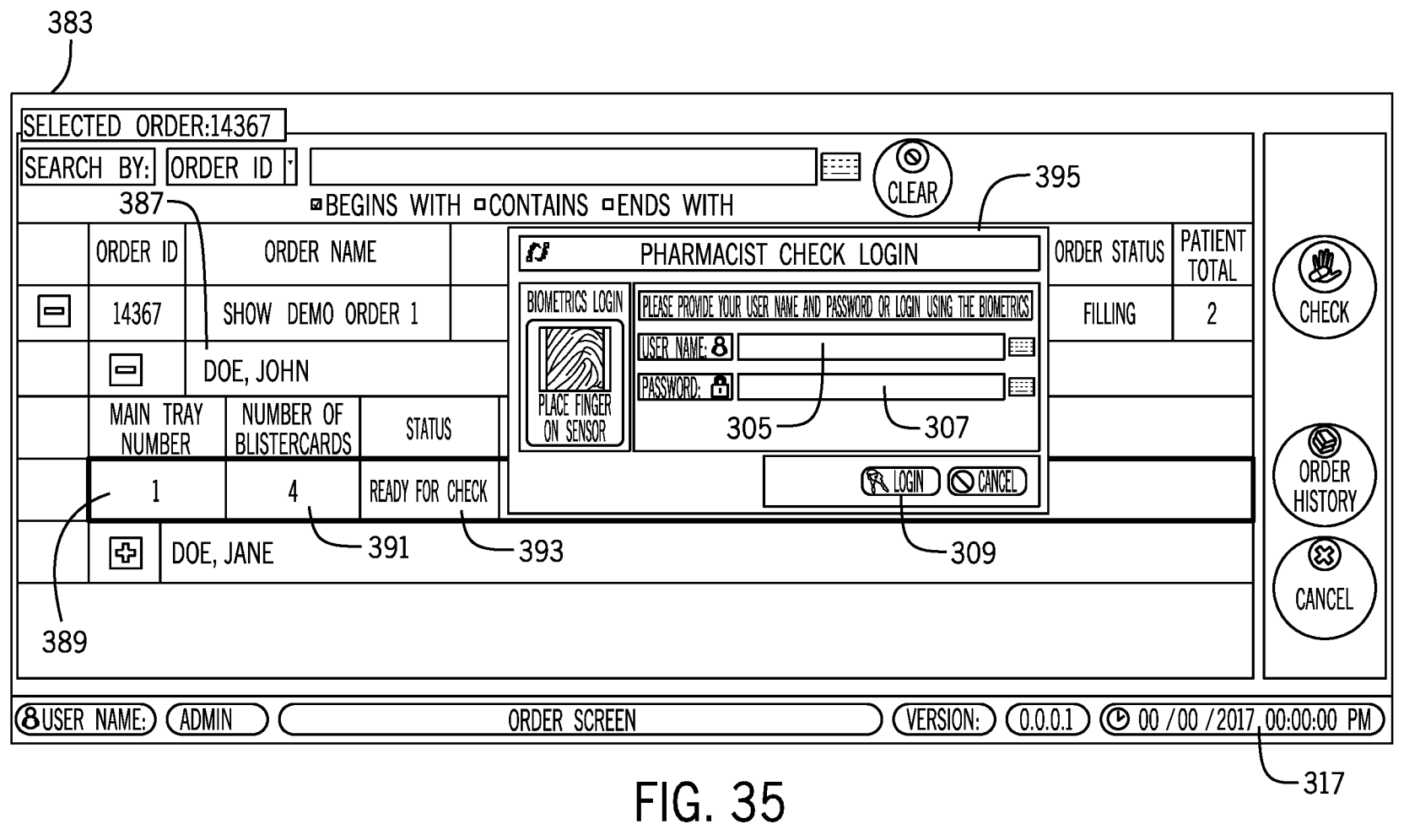
Figure 36:
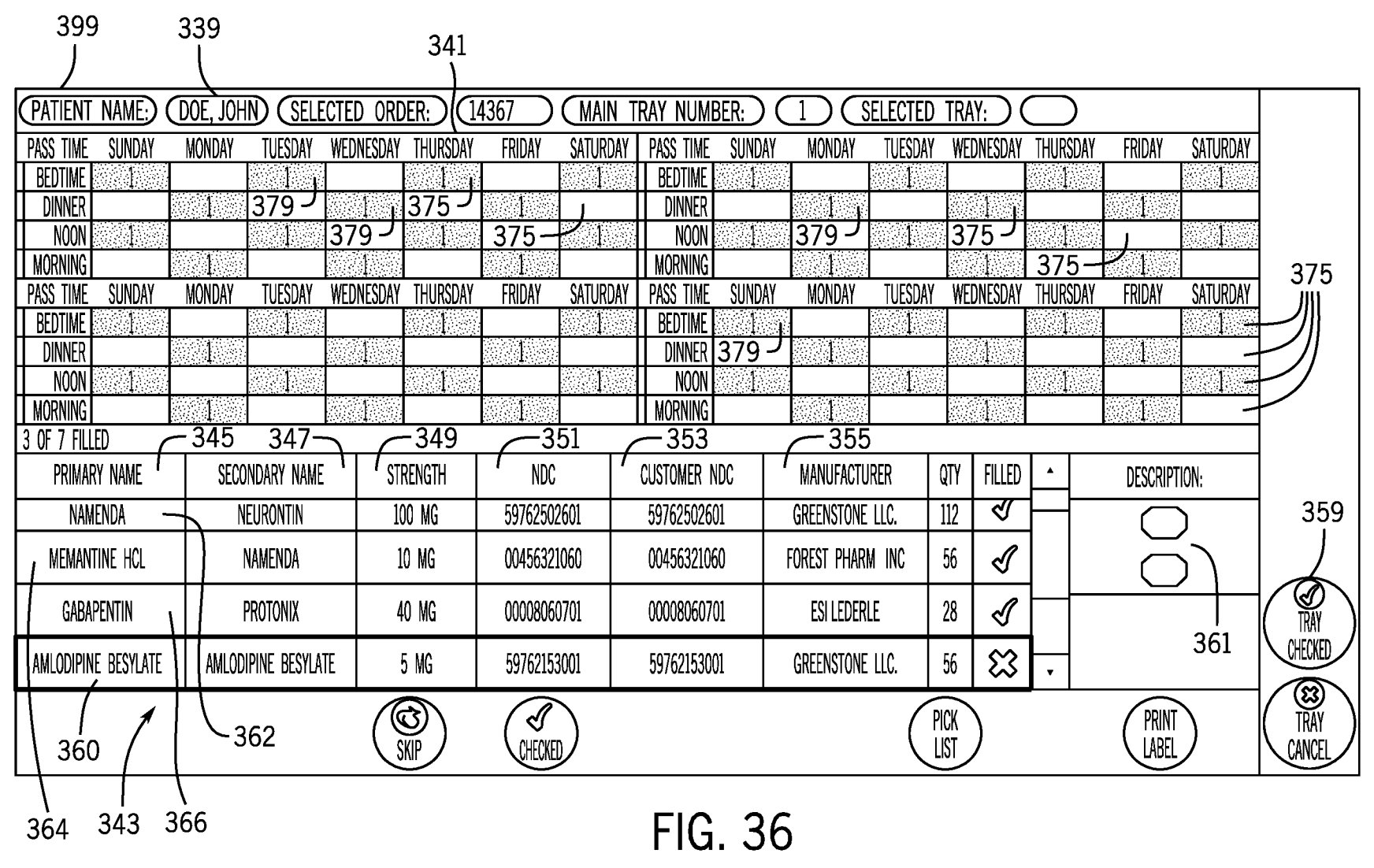

Referring now to FIGS. 34-36, each loaded blister card (blister card 13 in the example) may optionally be verified by a registered pharmacist or other authorized user to ensure that each well 43 has been loaded with the correct medicament 11. The verification may be performed before application of closure 51 to blister card 13.

FIG. 34 shows an exemplary Orders screen 383 which may include a field 385 showing the filled patient prescription orders awaiting verification. In the example, the prescription order for patients John Doe and Jane Doe await verification. Touching display 25 near the patient name John Doe 387 causes system 10 to display further fields (which may be highlighted by, for example, providing a bold border as indicated on FIG. 34). A field 389 may be provided showing the identification number (e.g., "1") of fixture 99 (again labeled "Main Tray") holding the loaded blister cards 103 to be verified. A field 391 may be displayed showing the number of loaded blister cards 103 (e.g., "4") on the fixture 99 awaiting verification. A field 393 may be displayed indicating the status of the prescription order as being ready for verification (indicated as "ReadyForCheck" in the example) all to assist the user in locating and confirming the blister cards 103 of the prescription order to be verified. For example, the user may need to retrieve fixture 99 with loaded blister cards 103 from a storage location, and fixture identification code 175 of "1" in this example may assist with locating the required fixture 99. It is envisioned that other fixtures 99 would have identification numbers other than 1, allowing for each fixture to be easily differentiated by visual inspection. Transparent cover 171 may remain affixed over each loaded blister card 13 and tray 103 during verification or cover 171 may be removed as desired.

Referring further to Orders screen 383 of FIG. 35, once the prescription order to be verified (e.g., for patient John Doe in the example) is selected as described above, system 10 may display a Login window 395 which enables a registered pharmacist or other authorized person to have access to system 10 for verification of the selected prescription order. The information displayed on Login screen 395 is essentially identical to that displayed in connection with Login screen 303 of FIG. 26. For convenience and simplicity, reference numbers of information displayed on Login screen 303 are used again to identify corresponding fields of Login screen 395.

Referring again to FIG. 35, a registered pharmacist, or other user may login to system 10 for verification, for example, by a fingerprint scan with biometric device 239 or by keying his or her name password into the name and password fields 305, 307 using keyboard 236 and followed by selecting Login button 309. As with Login screen 303 of FIG. 26, the user's password information may be transmitted to client computer 219, to PIS 233 residing on server 235, or to another suitable computer or controller, whereupon the user's status is validated for verification and a record may be created in the file in database 197 for the prescription order identifying the person performing the verification as well as the date and time of the verification.

Figure 13C:
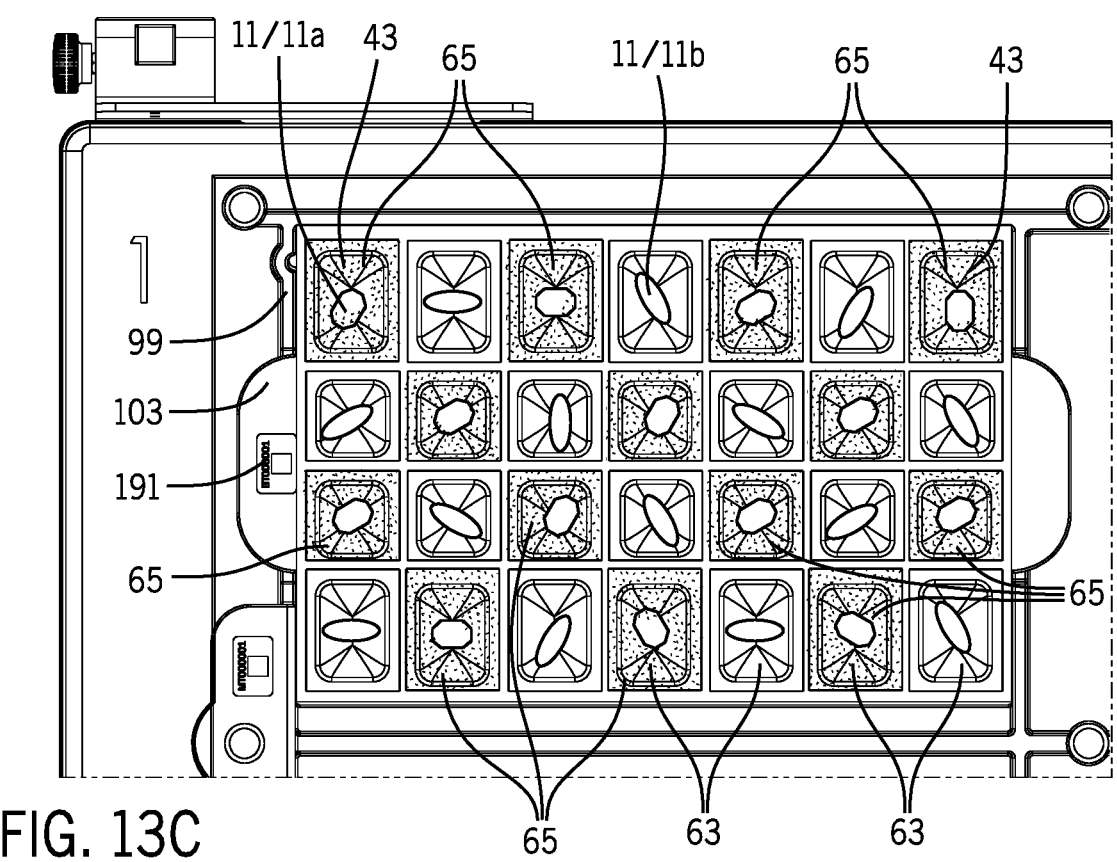
FIG. 13C is the enlarged partial plan view of FIG. 13B but during a verification process.
Figure 14:
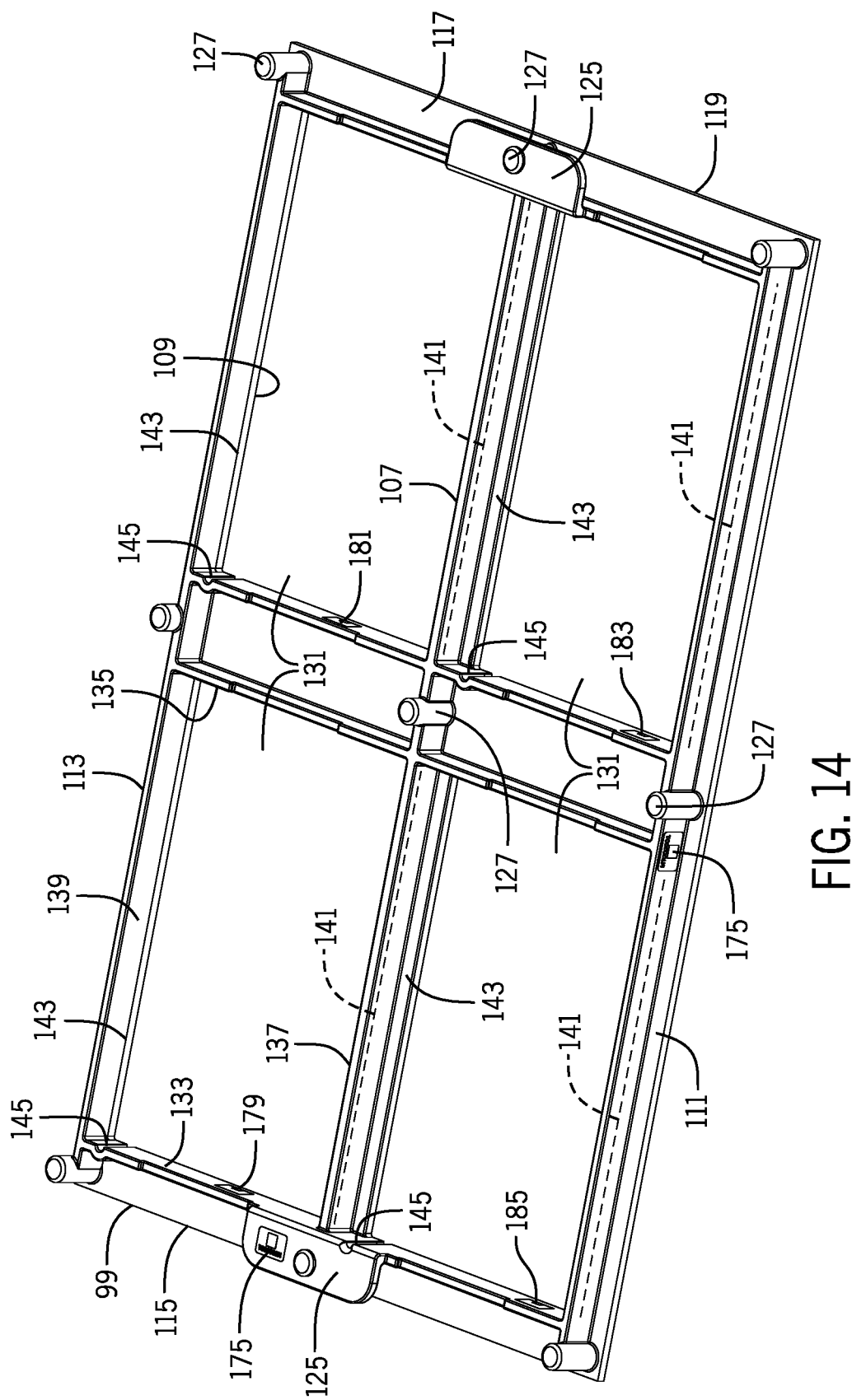
FIG. 14 is a perspective view of a 4-position fixture.

Referring to FIG. 13C and FIG. 36, system 10 may automatically generate a Verification screen 399 following successful login and authorization of the user's credentials by system 10. Verification screen 399 may include information required for verification of the medicaments 11 loaded into wells 43 of each blister card 13 of the prescription order selected for verification. Verification screen 399 may operate in conjunction with docking station 19 to identify each well 43 and medicament 11a that should be in each well 43 so that the user can confirm that the content of each well 43 is correct and in accordance with the prescription order. The information displayed on Verification screen 399 may be essentially identical to that displayed in connection with Loading screen 373 of FIGS. 32-33. For convenience and simplicity, reference numbers of information displayed on Loading screen 373 are used again to identify corresponding fields of information on Verification screen 399.

Verification screen 399 may provide the user with information including the patient name (e.g., John Doe) in patient name field 339, blister card wells 43 to be verified in tray field 341 and a medicament type field 343 which indicates the medicament type (e.g., Amlodipine Besylate) that should be in each indicated well 43. The information on Verification screen 399 may, of course, be modified and supplemented as needed.

Referring again to FIG. 36, tray field 341 of the example provides four groups of rectangles 375 indicating that the prescription order for patient John Doe includes four trays 103 and that there are four loaded blister cards 13 to be verified. Once again, rectangle symbols 375 corresponding to each of the 28 wells 43 of each blister card 13 may be displayed to the user on display 25.

In the example of FIG. 36, the user may start verification by touching of row 360 of touchscreen display 25 for the medicament 11a Amlodipine Besylate. The touching causes row 360 for Amlodipine Besylate to be highlighted (e.g., by a bold border as indicated in FIG. 36) indicating to the user that verification is in process by system 10. Medicaments 11 in the three other rows 362, 364, 366 remain un-highlighted, indicating that these medicaments 11 await verification.

Touching of row 360 to select Amlodipine Besylate for verification may cause system 10 to update tray field 341 to highlight (e.g. by darkening of color change) rectangles 375 to indicate the wells 43 into which Amlodipine Besylate medicament 11a was loaded in this example. A number 379 (e.g., "1") may be displayed in each highlighted rectangle 375 to indicate the number of units of Amlodipine Besylate that should have been loaded in each indicated highlighted well 43 in this example. The change in highlighting of certain of the rectangles 375 indicates the "yes" state wells 43 that should contain Amlodipine Besylate while the un-highlighted rectangles 375 indicate the "no" state wells 43 which should not contain Amlodipine Besylate. A reference image 361 showing the shape, color, and any other physical attributes of the Amlodipine Besylate may be provided.

Referring to FIG. 13C, simultaneously with highlighting of rectangles 375 on display 25, controller 21 may operate display device 81 to activate the regions of pixels 92 providing visible information locations 63 under each well 43 and into which a unit of Amlodipine Besylate was previously hand-loaded. FIG. 13C illustrates an example of the visible information 65 viewable by a user through tray openings 161 and light-transmissive wells 43 for one of the trays 103 and blister cards 13 at position 1 (indicated on bezel 85, reference number 89) of fixture 99. The user can then look into each indicated well 43 and confirm that the type of medicament 11a and amount of medicament 11a matches the information on display 25 and the Verification screen 399. All indicated wells 43 may be inspected as required by the information output from display device 81 of docking station 19 and by the instructions on Verification screen 399. Subsequently, the user can touch the Checked button 401 providing input to system 10 that all required units of Amlodipine Besylate have been verified as correct in all four trays 103 of this example.

In the example, the process of verifying the medicaments 11 in blister cards 13 may be repeated for each medicament 11 by means of Verification screen 399 and visible information 65 provided by visible information locations 63 until all medicaments 11 in each blister card 13 are verified as correct. Once Tray Filled button 359 on Verification screen 399 of display 25 is touched by the user following verification of the final medicament 11, a signal may be sent to computer 219 indicating to system 10 that each blister card 13 has been fully verified and that the medicament 11 contents are in the correct wells 43 ready for application of a closure 51 to each blister card 13. A record may be made of the verified medicament 11 contents of blister card wells 43 which may be stored in the file for the prescription order residing in database 197 on computer 219 (or server 235). Such a record is useful in further confirming that the correct medicaments 11 were loaded in each blister card 13.

Any errors identified during verification can be corrected, for example, by changing the contents of the well 43 or by rejecting the entire blister card 13.

As is apparent from the foregoing workflow examples, no paper instructions are required to load each blister card 13, thereby making the loading and verification process faster, more efficient and more accurate because the user is able to follow the instructions on display 25 and the instructions represented by the visible information 65 proximate each blister card well 43 which indicates each well 43 to be loaded, verified, or otherwise acted on.

Following successful verification, fixture 99 and trays 103 (which may be covered by cover 171) may be lifted from docking station 19 by the user and may be stacked with other fixtures 99 for future application of closure 51 to each blister card 13. Or, the workflow may move directly to closure of the blister cards 13.

Examples of workflow for closure of blister cards 13 and workflow using closure workstation 245 may be understood by reference to FIGS. 37-41. Closure 51 applied to a blister card 13, 15, 17 may be a tri-panel closure 51 of the type previously described and illustrated in FIGS. 40-41 or may be any suitable closure, such as paperboard or foil.

Figure 37:
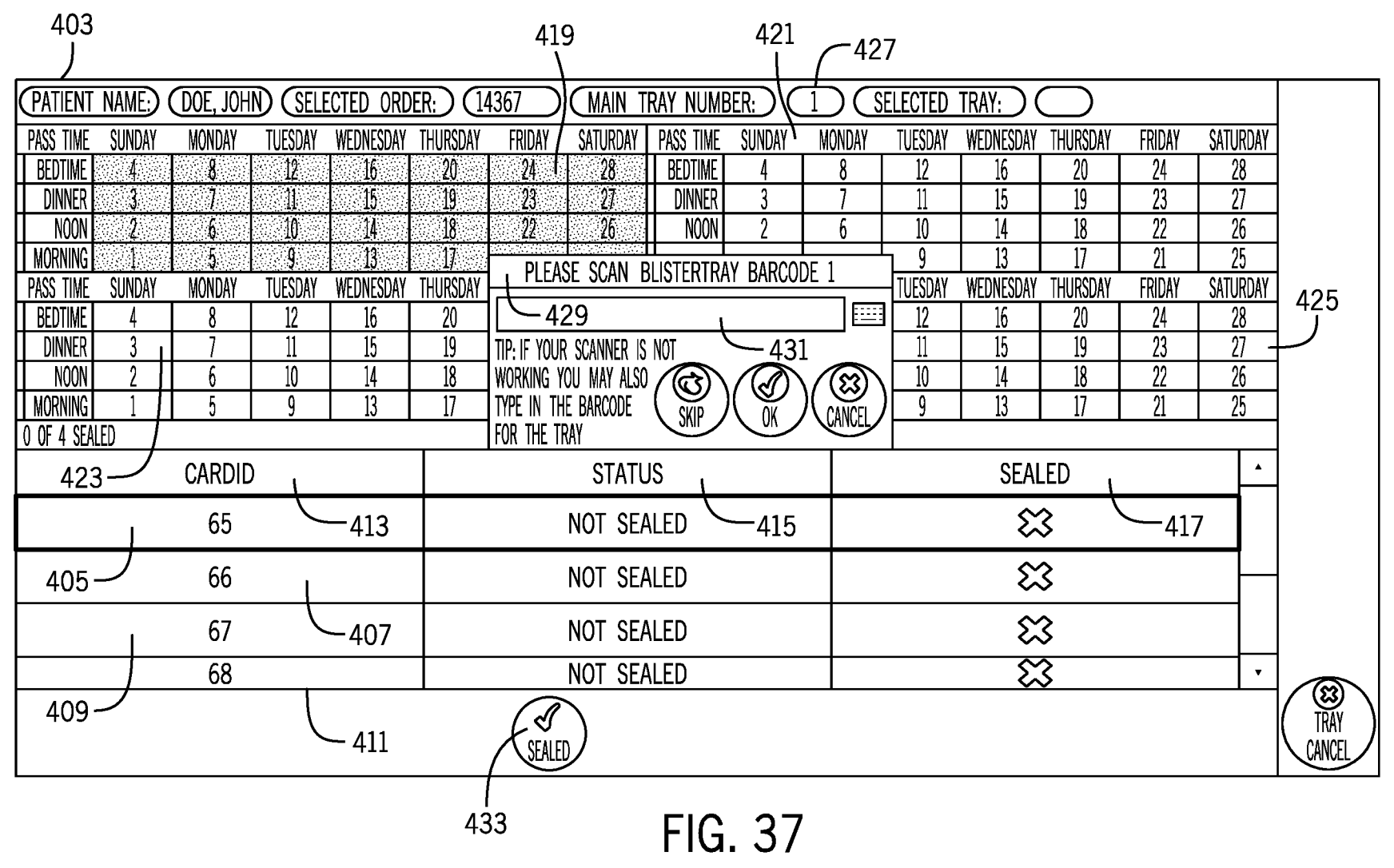

FIG. 37 illustrates an example of a Closure screen 403 which may be displayed to a user on display 25. Information on Closure screen 403 may prompt the user to apply a closure 51 to each loaded blister card 13 so that a patient-specific closure is associated with loaded blister card 13, 15, 17 and so that a sealed blister card 13, 15, 17 may be delivered to the patient.

Closure screen 403 of FIG. 37 may include rows 405, 407, 409, 411 indicating filled blister cards 13 waiting for application of a closure 51. The rows 405, 407, 409, 411 in CARD ID field 413 may indicate a unique identification number of each tray 103 in which a blister card 13 is supported (e.g., identification numbers 65, 66, 67), the status 415 of the blister card 13 in each tray 103, and the status 417 of whether blister card 13 in each tray 103 is sealed. In addition, four groups of rectangles 419, 421, 423, 425 may be displayed on Closure screen 403 representative of the 28 wells of four loaded blister cards 13 on separate blister card trays 103 docked on a fixture 99 identified by an identification number 427 (e.g., fixture number "1").

Touching of any row, such as row 405, may cause the selected row to be highlighted (for example by a bold border as in FIG. 37) indicating to the user that closure of a blister card 13 is in process by system 10. The blister cards 13 in this example represented by the three other rows 407, 409, 411 remain un-highlighted indicating that these blister cards 13 await closure.

Touching of row 405 may cause system 10 to highlight (e.g., by darkening or color change) the rectangles 419 at the location of fixture 99 where the tray 103 to be closed is located to prompt the user to grasp the correct tray 103. Also in response to touching of a row 405, window 429 may appear on closure screen 403. Window 429 prompts the user to scan the machine-readable identification element 191 of the indicated tray 103 with code reader 195. Scanning of machine-readable element 191 of tray 103 may cause system 10 to call up a file for the tray 103 and blister card 13 supported thereon and triggers printer 243 to print a patient-specific closure 51 with the pertinent information for blister card 13 which may be as described previously. The user may be prompted to manually enter tray 103 machine-readable identification element 191 into field 431 using keyboard 235 and/or mouse to indicate to system 10 the tray 103 that was selected. Closure 51 may include all of the information previously described.

Next, the selected and identified blister card tray 103 with loaded blister card 13 may be placed in dock 249 of sealing station fixture 247. If a cover 171 is attached to tray 103 over blister card 13 and its contents, then cover 171 may be removed. A tri-panel closure 51 with information applied by printer 243 may be applied to blister card 13 as previously described to create a finished and sealed patient-specific blister card 13. Touching of the Sealed button 433 may generate a signal to computer 219 indicating to system 10 that blister card 13 has been successfully closed and that the loading process for that blister card 13 has been completed.

In the example, the process of selecting a tray 103 and blister card 13 for sealing may be repeated for each blister card 13 by means of Closure screen 403. Once the Sealed button 433 on Closure screen 403 of display 25 is touched by the user following closure of the final blister card 13 of fixture 99, a signal may be sent to computer 219 indicating to system 10 that each blister card 13 has been fully closed and that the blister cards 13 are complete and ready for delivery to the patient. A record may be made of the closure and completion of each blister card 13 which may be stored in the file for the prescription order residing in database 197 on computer 219 (or server 235). Such a record is useful in further confirming that packaging of the medicaments 11 was fully completed in accordance with the prescription order.

The systems, apparatus, and methods are susceptible to various modifications and alternative forms, specific embodiments thereof have been shown by way of example in the drawings and the description provided herein. It should be understood, however, that the description herein of specific embodiments and methods is not intended to limit the invention to the particular forms disclosed, but on the contrary, the intention is to cover all modifications, equivalents, and alternatives falling within the spirit and scope of the invention as defined by the appended claims.

That which is claimed:

1. A pharmaceutical verification system for rapid and accurate verification of items loaded into compartments of a container, the system comprising:
    a docking station including a video display providing visible verification information associated with locations on the display which are operable in a plurality of different patterns;
    a container locator associated with the display and configured to locate a container, wherein location of the container locates the compartments of one or more selected containers at specific positions of the display;
    a database including a record of each of the plurality of patterns of compartment locations; and
    a controller operative to control the visible verification information on the display, the controller being responsive to a patient order, the controller configured to associate the compartments in the container with the patient order, the controller further configured to direct the display to provide the visible verification information for the pattern of compartment locations of the one or more selected containers to enable verification of the contents of each compartment location according to the patient order.

2. The pharmaceutical verification system of claim 1 wherein each container is a blister card.

3. The pharmaceutical verification system of claim 2 wherein the compartments are wells.

4. The pharmaceutical verification system of claim 3 wherein the visible verification information locations on the display are operable to provide the visible information through each well of each compartment pattern.

5. The pharmaceutical verification system of claim 1 wherein the visible verification information locations provide visible verification information on the display selected from the group consisting of light information and image information.

6. The pharmaceutical verification system of claim 1 wherein the display is selected from the group consisting of a light emitting diode (LED) display, an organic light emitting diode (OLED) display, a liquid crystal display (LCD) display, and a plasma display.

7. The pharmaceutical verification system of claim 3, wherein the container locator includes a fixture for locating the container, wherein the fixture has at least one tray-locating position overlying the display, and wherein the container locator further comprises at least one portable tray receivable at a single position in each tray-locating position to support the blister card thereon with the wells over known positions of the display such that the visible verification information is viewable through the wells.

8. The pharmaceutical verification system of claim 7 wherein each at least one tray-locating position is defined by a plurality of fixture walls and the tray is sized to fit within the walls in the single position.

9. The pharmaceutical verification system of claim 7 wherein the fixture defines a plurality of the tray-locating positions enabling plural trays to be simultaneously located over different portions of the display.

10. The pharmaceutical verification system of claim 7 wherein the fixture is a first fixture and the first fixture is interchangeable with a second fixture which has a number of tray-locating positions different from the first fixture.

11. The pharmaceutical verification system of claim 10 wherein the tray-locating positions of the first fixture are configured to hold trays of a first configuration and the tray-locating positions of the second fixture are configured to hold trays of a second configuration that is different than the first configuration.

12. The pharmaceutical verification system of claim 7 wherein the fixtures include stacking structure enabling each fixture to be loaded with at least one tray and stacked atop another fixture.

13. The pharmaceutical verification system of claim 7 wherein the tray comprises:

a top side supporting a blister card and defining well-receiving openings in a pattern matching the pattern of the wells and through which the wells are inserted; and an open bottom under each opening enabling the visible verification information to be viewed through the opening when the tray is over the display.

14. The pharmaceutical verification system of claim 7 wherein the tray includes handles.

15. The pharmaceutical verification system of claim 7 further including a removable temporary cover configured to overlie the tray and a blister card supported thereon.

16. The pharmaceutical verification system of claim 7 further including a unique machine-readable identification element associated with each of the fixtures and each tray such that association of a tray with the fixture enables the system to identify the known positions of the wells over the display.

17. The pharmaceutical verification system of claim 16 wherein the machine-readable identification elements are selected from the group consisting of a linear barcode, a 2-D barcode, and a radio frequency identification tag (RFID).

18. The pharmaceutical verification system of claim 3 further including a further video display operatively connected to the controller to display information indicating at least one of: each well to be verified; contents of each well; patient's name; and medicament type.

* * * * *